(12) United States Patent
Heim et al.

(10) Patent No.: US 7,971,850 B2
(45) Date of Patent: *Jul. 5, 2011

(54) ELECTROACTIVE POLYMER DEVICES FOR CONTROLLING FLUID FLOW

(75) Inventors: Jonathan R. Heim, Pacifica, CA (US); Ronald E. Pelrine, Louisville, CO (US); Roy David Kornbluh, Palo Alto, CA (US); Joseph S. Eckerle, Redwood City, CA (US); Marcus Rosenthal, Pacifica, CA (US); Richard P. Heydt, Palo Alto, CA (US)

(73) Assignee: SRI International, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/731,388

(22) Filed: Mar. 25, 2010

(65) Prior Publication Data

US 2010/0176322 A1 Jul. 15, 2010

Related U.S. Application Data

(63) Continuation of application No. 12/424,486, filed on Apr. 15, 2009, now Pat. No. 7,703,742, which is a continuation of application No. 11/829,920, filed on Jul. 29, 2007, now Pat. No. 7,537,197, which is a (Continued)

(51) Int. Cl.
*F16K 31/02* (2006.01)
(52) U.S. Cl. ............... 251/129.06; 251/129.01; 239/597
(58) Field of Classification Search .............. 251/129.01, 251/129.06; 239/597, 601, 602
See application file for complete search history.

(56) References Cited

U.S. PATENT DOCUMENTS 2,430,013 A 11/1947 Hansell
(Continued)

FOREIGN PATENT DOCUMENTS

DE 19952062 A1 5/2000
(Continued)

OTHER PUBLICATIONS

Ajluni, Cheryl, "Pressure Sensors Strive to Stay on Top, New Silicon Micromachining Techniques and Designs Promise Higher Performance", Electronic Design—advanced Technology Series, Oct. 3, 1994, pp. 67-74.

(Continued)

*Primary Examiner* — John K Fristoe, Jr.
(74) *Attorney, Agent, or Firm* — John E. Mrozinski, Jr.

(57) ABSTRACT

The invention describes devices for controlling fluid flow, such as valves. The devices may include one or more electroactive polymer transducers with an electroactive polymer that deflects in response to an application of an electric field. The electroactive polymer may be in contact with a fluid where the deflection of the electroactive polymer may be used to change a characteristic of the fluid. Some of the characteristic of the fluid that may be changed include but are not limited to 1) a flow rate, 2) a flow direction, 3) a flow vorticity, 4) a flow momentum, 5) a flow mixing rate, 6) a flow turbulence rate, 7) a flow energy, 8) a flow thermodynamic property. The electroactive polymer may be a portion of a surface of a structure that is immersed in an external fluid flow, such as the surface of an airplane wing or the electroactive polymer may be a portion of a surface of a structure used in an internal flow, such as a bounding surface of a fluid conduit.

36 Claims, 18 Drawing Sheets

Related U.S. Application Data continuation of application No. 10/383,005, filed on Mar. 5, 2003, now Pat. No. 7,320,457, which is a continuation-in-part of application No. 09/792,431, filed on Feb. 23, 2001, now Pat. No. 6,628,040, said application No. 10/383,005 is a continuation-in-part of application No. 10/154,449, filed on May 21, 2002, now Pat. No. 6,891,317, said application No. 10/383,005 is a continuation-in-part of application No. 10/053,511, filed on Jan. 16, 2002, now Pat. No. 6,882,086, said application No. 10/383,005 is a continuation-in-part of application No. 09/619,847, filed on Jul. 20, 2000, now Pat. No. 6,812,624, said application No. 10/383,005 is a continuation-in-part of application No. 10/007,705, filed on Dec. 6, 2001, now Pat. No. 6,809,462, said application No. 10/383,005 is a continuation-in-part of application No. 09/828,496, filed on Apr. 4, 2001, now Pat. No. 6,586,859, said application No. 10/383,005 is a continuation-in-part of application No. 10/066,407, filed on Jan. 31, 2002, now Pat. No. 7,052,594.

(60) Provisional application No. 60/362,560, filed on Mar. 5, 2002, provisional application No. 60/184,217, filed on Feb. 23, 2000, provisional application No. 60/190,713, filed on Mar. 17, 2000, provisional application No. 60/293,003, filed on May 22, 2001, provisional application No. 60/293,005, filed on May 22, 2001, provisional application No. 60/327,846, filed on Oct. 5, 2001, provisional application No. 60/144,556, filed on Jul. 20, 1999, provisional application No. 60/153,329, filed on Sep. 10, 1999, provisional application No. 60/161,325, filed on Oct. 25, 1999, provisional application No. 60/181,404, filed on Feb. 9, 2000, provisional application No. 60/187,809, filed on Mar. 8, 2000, provisional application No. 60/192,237, filed on Mar. 27, 2000, provisional application No. 60/184,217, filed on Feb. 23, 2000, provisional application No. 60/293,004, filed on May 22, 2001, provisional application No. 60/194,817, filed on Apr. 5, 2000.

(56) References Cited

U.S. PATENT DOCUMENTS

| | | |
|---|---|---|
| 3,050,034 A | 8/1962 | Benton |
| 3,303,750 A | 2/1967 | Powell |
| 3,403,234 A | 9/1968 | Barnes, Jr. |
| 3,832,580 A | 8/1974 | Yamamuro et al. |
| 4,283,461 A | 8/1981 | Wooden et al. |
| 4,284,921 A | 8/1981 | Lemonon et al. |
| 4,290,983 A | 9/1981 | Sasaki et al. |
| 4,297,394 A | 10/1981 | Wooden et al. |
| 4,342,936 A | 8/1982 | Marcus et al. |
| 4,344,743 A | 8/1982 | Bessman et al. |
| 4,384,394 A | 5/1983 | Lemonon et al. |
| 4,400,634 A | 8/1983 | Micheron |
| 4,401,911 A | 8/1983 | Ravinet et al. |
| 4,442,372 A | 4/1984 | Roberts |
| 4,518,555 A | 5/1985 | Ravinet et al. |
| 4,588,998 A | 5/1986 | Yamamuro et al. |
| 4,733,121 A | 3/1988 | Hebert |
| 4,843,275 A | 6/1989 | Radice |
| 4,877,988 A | 10/1989 | McGinniss et al. |
| 4,885,783 A | 12/1989 | Whitehead et al. |
| 4,885,830 A | 12/1989 | Ohtaka |
| 4,969,197 A | 11/1990 | Takaya |
| 5,024,872 A | 6/1991 | Wilson et al. |
| 5,119,840 A | 6/1992 | Shibata |
| 5,148,735 A | 9/1992 | Veletovac |
| 5,199,641 A | 4/1993 | Hohm et al. |
| 5,229,979 A | 7/1993 | Scheinbeim et al. |
| 5,250,784 A | 10/1993 | Muller et al. |
| 5,254,296 A | 10/1993 | Perlman |
| 5,356,500 A | 10/1994 | Scheinbeim et al. |
| 5,417,235 A | 5/1995 | Wise et al. |
| 5,430,565 A | 7/1995 | Yamanouchi et al. |
| 5,440,194 A | 8/1995 | Beurrier |
| 5,452,878 A | 9/1995 | Gravesen et al. |
| 5,481,152 A | 1/1996 | Buschulte |
| 5,509,888 A | 4/1996 | Miller |
| 5,642,015 A | 6/1997 | Whitehead et al. |
| 5,682,075 A | 10/1997 | Bolleman et al. |
| 5,751,090 A | 5/1998 | Henderson |
| 5,800,421 A | 9/1998 | Lemelson |
| 5,835,453 A | 11/1998 | Wynne et al. |
| 5,897,097 A | 4/1999 | Biegelsen et al. |
| 5,902,836 A | 5/1999 | Bennett et al. |
| 5,915,377 A | 6/1999 | Coffee |
| 5,933,170 A | 8/1999 | Takeuchi et al. |
| 5,971,355 A | 10/1999 | Biegelsen et al. |
| 5,977,685 A | 11/1999 | Kurita et al. |
| 6,048,622 A | 4/2000 | Hagood, IV et al. |
| 6,060,811 A | 5/2000 | Fox et al. |
| 6,084,321 A | 7/2000 | Hunter et al. |
| 6,093,995 A | 7/2000 | Lazarus et al. |
| 6,148,842 A | 11/2000 | Kappel et al. |
| 6,184,608 B1 | 2/2001 | Cabuz et al. |
| 6,184,609 B1 | 2/2001 | Johansson et al. |
| 6,198,203 B1 | 3/2001 | Hotomi |
| 6,249,076 B1 | 6/2001 | Madden et al. |
| 6,255,758 B1 | 7/2001 | Cabuz et al. |
| 6,321,428 B1 | 11/2001 | Toda et al. |
| 6,343,129 B1 | 1/2002 | Pelrine et al. |
| 6,345,840 B1 | 2/2002 | Meyer et al. |
| 6,376,971 B1 | 4/2002 | Pelrine et al. |
| 6,385,021 B1 | 5/2002 | Takeda et al. |
| 6,411,013 B1 | 6/2002 | Horning |
| 6,435,840 B1 | 8/2002 | Sharma et al. |
| 6,499,509 B2 | 12/2002 | Berger et al. |
| 6,543,110 B1 | 4/2003 | Pelrine et al. |
| 6,545,384 B1 | 4/2003 | Pelrine et al. |
| 6,586,859 B2 | 7/2003 | Kornbluh et al. |
| 6,617,765 B1 | 9/2003 | Lagier et al. |
| 6,628,040 B2 | 9/2003 | Pelrine et al. |
| 6,664,718 B2 | 12/2003 | Pelrine et al. |
| 6,682,500 B2 | 1/2004 | Soltanpour et al. |
| 6,720,710 B1 | 4/2004 | Wenzel et al. |
| 6,768,246 B2 | 7/2004 | Pelrine et al. |
| 6,781,284 B1 | 8/2004 | Pelrine et al. |
| 6,806,621 B2 | 10/2004 | Heim et al. |
| 6,809,462 B2 | 10/2004 | Pelrine et al. |
| 6,812,624 B1 | 11/2004 | Pei et al. |
| 6,882,086 B2 | 4/2005 | Kornbluh et al. |
| 6,891,317 B2 | 5/2005 | Pei et al. |
| 6,911,764 B2 | 6/2005 | Pelrine et al. |
| 7,034,432 B1 | 4/2006 | Pelrine et al. |
| 7,052,594 B2 | 5/2006 | Pelrine et al. |
| 7,064,472 B2 | 6/2006 | Pelrine et al. |
| 7,075,162 B2 | 7/2006 | Unger |
| 7,144,616 B1 | 12/2006 | Unger et al. |
| 7,291,512 B2 | 11/2007 | Unger |
| 7,320,457 B2 | 1/2008 | Heim et al. |
| 7,362,032 B2 | 4/2008 | Pelrine et al. |
| 7,537,197 B2 | 5/2009 | Heim et al. |
| 7,703,742 B2 * | 4/2010 | Heim et al. .............. 251/129.06 |
| 2002/0013545 A1 | 1/2002 | Soltanpour et al. |
| 2009/0200501 A1 | 8/2009 | Heim et al. |

FOREIGN PATENT DOCUMENTS

| | | |
|---|---|---|
| EP | 59-126689 | 7/1984 |
| EP | 07-111785 | 4/1995 |
| JP | 2001286162 A2 | 10/2001 |
| JP | 2004353279 A2 | 12/2004 |
| JP | 2005202707 A2 | 7/2005 |
| WO | WO 87/07218 | 12/1987 |
| WO | WO 89/02658 | 3/1989 |
| WO | WO 94/18433 | 8/1994 |

| WO | WO 95/08905 | 3/1995 |
| WO | WO 97/15876 | 5/1997 |
| WO | WO 98/35529 | 8/1998 |
| WO | WO 99/17929 | 4/1999 |
| WO | WO 99/23749 | 5/1999 |
| WO | WO 99/37921 | 7/1999 |
| WO | WO 01/06575 | 1/2001 |
| WO | WO 01/06579 | 1/2001 |
| WO | WO 01/59852 | 8/2001 |
| WO | WO 02/37660 | 5/2002 |
| WO | WO 02/37892 | 5/2002 |
| WO | WO 03/056274 | 7/2003 |
| WO | WO 03/056287 | 7/2003 |
| WO | WO 2004/027970 | 4/2004 |
| WO | WO 2004/053782 | 6/2004 |
| WO | WO 2004/074797 | 9/2004 |
| WO | WO 2004/093763 | 11/2004 |

OTHER PUBLICATIONS

Anderson, R. A., "Mechanical Stress in a Dielectric Solid From a Uniform Electric Field", The American Physical Society, 1986, pp. 1302-1307.

Aramaki, S., S. Kaneko, K. Arai, Y. Takahashi, H. Adachi, and K. Yanagisawa. 1995. "Tube Type Micro Manipulator Using Shape Memory Alloy (SMA)," Proceedings of the IEEE Sixth International Symposium on Micro Machine and Human Science, Nagoya, Japan, pp. 1.

Ashley, S., "Smart Skis and Other Adaptive Structures", Mechanical Engineering, Nov. 1995, pp. 77-81.

Bar-Cohen, Yoseph, JPL, WorldWide Electroactive Polymer Actuators Webhub webpages 1-7, http://ndeaa.jpl.nasa.gov/nasa-nde/lommas/eap/EAP-web.htm, downloaded Jul. 23, 2001.

Bar-Cohen, Yoseph, JPL, WorldWide ElectroActive Polymers, EAP (Artificial Muscles) Newsletter, vol. 1, No. 1, Jun. 1999.

Bar-Cohen, Yoseph, JPL, WorldWide ElectroActive Polymers, EAP (Artificial Muscles) Newsletter, vol. 1, No. 2, Dec. 1999.

Bar-Cohen, Yoseph, JPL, WorldWide ElectroActive Polymers, EAP (Artificial Muscles) Newsletter, vol. 2, No. 1, Jul. 2000.

Bar-Cohen, Yoseph, JPL, WorldWide ElectroActive Polymers, EAP (Artificial Muscles) Newsletter, vol. 2, No. 2, Dec. 2000.

Bar-Cohen, Yoseph, JPL, WorldWide ElectroActive Polymers, EAP (Artificial Muscles) Newsletter, vol. 3, No. 1, Jun. 2001.

Baughman, R., L. Shacklette, R. Elsenbaumer, E. Plichta, and C. Becht "Conducting Polymer Electromechanical Actuators," Conjugated Polymeric Materials: Opportunities in Electronics, Optoelectronics and Molecular Electronics, eds. J.L. Bredas and R.R. Chan, 1996.

Baughman, R.H., L.W. Shacklette, and R.L. Elsenbaumer, E.J. Plichta, and C. Becht, "Micro electromechanical actuators based on conducting polymers", in Molecular Electronics, Materials and Methods, P.I. Lazarev (ed.), Kluwer Academic Publishers, pp. 267-2, 1990.

Bharti, B., X.-Z. Zhao, Q. M. Zhang, T. Romotowski, F. Tito, and R. Ting, "Ultrahigh Field Induced Strain and Polarization Response in Electron Irradiated Poly(Vinylidene Fluoride-Trifluoroethylene) Copolymer," Mat. Res. Innovat. vol. 2, 57-63 (1998).

Bharti, V., H. S. Xu, G. Shanthi, and Q. M. Zhang, "Polarization and Structural Properties of High Energy Electron Irradiated Poly (vinylidene fluoride-trifluoroethylene) Copolymer Films," to be published in J. Appl. Phys. (2000).

Bharti, V., Y. Ye, T.-B. Xu and Q. M. Zhang, "Correlation Between Large Electrostrictive Strain and Relaxor Behavior with Structural Changes Induced in P(VDF-TrFE) Copolymer by electron Irradiation," Mat. Res. Soc. Symp. Proc. vol. 541, pp. 653-659 (1999).

Bharti, V., Z.-Y. Cheng, S. Gross, T.-B. Xu, and Q. M. Zhang, "High electrostrictive strain under high mechanical stress in electron-irradiated poly(vinylidene fluoride-trifluoroethylene) copolymer," Appl. Phys. Lett. vol. 75, 2653-2655 (Oct. 25, 1999).

Bobbio, S., M Kellam, B. Dudley, S. Goodwin Johansson, S. Jones, J. Jacobson, F. Tranjan, and T. DuBois, "Integrated Force Arrays," in Proc. IEEE Micro ElectroMechanical Systems Workshop, Fort Lauderdale, Florida Feb. 1993.

Bohon, K., and S. Krause, "An Electrorheological Fluid and Siloxane Gel Based Electromechanical Acuator: Working Toward an Artificial Muscle,"to be published in J. Polymer Sci., Part B. Polymer Phys. (2000).

Brock, D. L., "Review of Artificial Muscle based on Contractile Polymers," MIT Artificial Intelligence Laboratory, A.I. Memo No. 1330, Nov. 1991.

Caldwell, D., G. Medrano-Cerda, and M. Goodwin, "Characteristics and Adaptive Control of Pneumatic Muscle actuators for a Robotic Elbow," Proc. IEEE Int. Conference on Robotics and Automation, San Diego, California (May 8-13, 1994).

Calvert, P. and Z. Liu, "Electrically stimulated bilayer hydrogels as muscles," Proceedings of the SPIE International Symposium on Smart Structures and Materials: Electro-Active Polymer Actuators and Devices, Mar. 1-2, 1999, Newport Beach, California, USA.

Cheng, Z.-Y., H. S. Xu, J. Su, Q. M. Zhjang, P.-C. Wang, and A. G. MacDiarmid, "High performance of all-polymer electrostrictive systems," Proceedings of the SPIE International Symposium on Smart Structures and Materials: Electro-Active Polymer Actuators, 1999.

Cheng, Z.-Y., T.-B. Xu, V. Bharti, S. Wang, and Q. M. Zhang, "Transverse Strain Responses in the Electrostrictive Poly(Vinylidene Fluoride-Trifluorethylene) Copolymer," Appl. Phys. Lett. vol. 74, No. 13, pp. 1901-1903, Mar. 29, 1999.

Chiarelli, P., A. Della Santa, D. DeRossi, and A. Mazzoldi. 1995. "Actuation Properties of Electrochemically Driven Polypyrrole Freestanding Films," Journal of Intelligent Material Systems and Structures, vol. 6, pp. 32-37, Jan. 1995.

De Rossi, D., and P. Chiarelli. 1994. "Biomimetic Macromolecular Actuators," Macro-Ion Characterization, American Chemical Society Symposium Series, vol. 548, Ch. 40, pp. 517-530.

Dowling, K., Beyond Faraday—Non Traditional Actuation, available on the World Wide Web at http://www.frc.ri.cmu.edu/about.nivek/OTH/beyond-faraday/beyondfaraday.h-tml, 9 pages, 1994.

Egawa, S. and T. Higuchi, "Multi-Layered Electrostatic Film Actuator," Proc. IEEE Micro Electra Mechanical Systems, Napa Valley, California, pp. 166-171 (Feb. 11-14, 1990).

Elhami, K., and B. Gauthier-Manuel, "Electrostriction of the Copolymer of Vinylidene-Fluoride and Trifluoroethylene," J. Appl. Phys. vol. 77 (8), 3987-3990, Apr. 15, 1995.

European Patent Application No. 03719361.2 filed Mar. 5, 2003 in the name of Heim et al., Office Action mailed Sep. 20, 2007.

European Patent Application No. 03745165.5 filed Mar. 18, 2003 in the name of Pelrine et al., Supplementary European Search Report mailed Aug. 6, 2007.

Flynn, Anita M., L.S. Tavrow, S.F. Bart, R.A. Brooks, D.J. Ehrlich, K.R. Udayakumar, and L.E. Cross. 1992. "Piezoelectric Micromotors for Microrobots," IEEE Journal of Microelectromechanical Systems, vol. 1, No. 1, pp. 44-51 (Mar. 1992); also published as.

Full, R. J. and K. Meijer, "Artificial Muscles Versus Natural Actuators From Frogs to Flies," Proceedings of the 7th SPIE Symposium on Smart Structures and Materials-Electroactive Polymers and Devices (EAPAD) Conference, Mar. 6-8, 2000, Newport Beach, Cal.

Furuhata, T., T. Hirano, and H. Fujita, "Array-Driven Ultrasonic Microactuators," Solid State Sensors and Actuators, 1991, Digest of Tech. Papers, Transducers, pp. 1056-1059.

Furukawa, T., and N. Seo., "Electrostriction as the Origin of Piezoelectricity in Ferroelectric Polymers," Japanese J. Applied Physics, vol. 29, No. 4, pp. 675-680 (Apr. 1990).

Gilbertson, R.G., and J.D. Busch. 1994. "Survey of Micro-Actuator Technologies for Future Spacecraft Missions," presented at the conference entitled "Practical Robotic Interstellar Flight: Are We Ready?" New York University and The United Nations, New Yor.

Goldberg, Lee, Adaptive-Filtering Developments Extend Noise-Cancellation Applications, Electronic Design, Feb. 6, 1995, pp. 34 and 36.

Greene, M., Willett, J.A., and Kornbluh, R., "Robotic systems," in ONR Report 32198-2, Ocean Engineering and Marine Systems 1997 Program (Dec. 1997).

Greenland, P., Allegro Microsystems Inc., and Carlsen, B., Bruce Carsten Associates, "Stacked Flyback Converters Allow Lower Voltage MOSFETs for High AC Line Voltage Operation," Feature PCIM Article, PCIM, Mar. 2000.

Heydt, R., R. Kornbluh, R. Pelrine, and B. Mason, "Design and Performance of an Electrostrictive Polymer Film Accoustic Actuator", Journal of Sound and Vibration (1998)215(2), 297-311.

Heydt, R., R. Pelrine, J. Joseph, J. Eckerle, and R. Kornbluh. "Acoustical Performance of an Electrostrictive Polymer Film Loudspeaker", Journal of the Acoustical Society of America vol. 107, pp. 833-839 (Feb. 2000).

Hirano, M., K. Yanagisawa, H. Kuwano, and S. Nakano, "Microvalve with Ultra-low Leakage," Tenth Annual International Workshop on Micro Electromechanical Systems, Nagoya, Japan, IEEE Proceedings (Jan. 26-30, 1997), pp. 323-326.

Hirose, s., Biologically Inspired Robots: Snake-like Locomotors and Manipulators, "Development of the ACM as a Manipulator", Oxford University Press, New York, 1993, pp. 170-172.

Hunter, I., S. Lafontaine, J. Hollerbach, and P. Hunter, "Fast Reversible NiTi Fibers for Use in MicroRobotics," Proc. 1991 IEEE Micro Electro Mechanical Systems—MEMS '91, Nara, Japan, pp. 166-170.

Hunter, I.W., and S. Lafontaine, "A Comparison of Muscle with Artificial Actuators", Technical Digest of the IEEE Solid-state Sensor and Actuator Workshop, Hilton Head, South Carolina, Jun. 22-25, 1992, pp. 178-185.

Jacobsen, S., Price, R., Wood, J, Rytting, T., and Rafaelof, M., "A Design Overview of an Eccentric-Motion Electrostatic Microactuator (the Wobble Motor)", Sensors and Actuators, 20 (1989) pp. 1-16.

Japanese Patent Application No. 2003-579352 filed Mar. 18, 2003 in the name of Pelrine et al., Office Actio mailed Jun. 16, 2009.

Japanese Patent Application No. 2004-514208 filed Mar. 5, 2003 in the name of Heim et al., Office Action mailed Jul. 1, 2008.

Kaneto, K., M. Kaneko, Y. Min, and A.G. MacDiarmid. 1995. "Artificial Muscle: Electromechanical Actuators Using Polyaniline Films," Synthetic Metals 71, pp. 2211-2212, 1995.

Kawamura, S., K. Minani, and M. Esashi, "Fundamental Research of Distributed Electrostatic Micro Actuator," Technical Digest of the 11th Sensor Symposium, pp. 27-30(1992).

Kondoh Y., and T. Ono. 1991. "Bimorph Type Actuators using Lead Zinc Niobate-based Ceramics," Japanese Journal of Applied Physics, vol. 30, No. 9B, pp. 2260-2263, Sep. 1991.

Kornbluh, R. D and R. E. Pelrine., "Dexterous Multiarticulated Manipulator with Electrostrictive Polymer Artificial Muscle," ITAD-7247-QR-96-175, SRI Project No. 7247, Prepared for: Office of Naval Research Nov. 1996.

Kornbluh, R., G. Andeen, and J. Eckerle, "Artificial Muscle: The Next Generation of Robotic Actuators," presented at the Fourth World Conference on Robotics Research, *SME Paper M591-331*, Pittsburgh, PA, Sep. 17-19, 1991.

Kornbluh, R., Pelrine, R. Joseph, J., Pei, Q. and Chiba, S., "Ultra-High Strain Response of Elastomeric Polymer Dielectrics", Proc. Materials Res. Soc., Fall meeting, Boston, MA, pp. 1-12, Dec. 1999.

Kornbluh, R., Pelrine, R., Eckerie, J., Joseph, J., "Electrostrictive Polymer Artificial Muscle Actuators", IEEE International Conference on Robotics and Automation, Leuven, Belgium, May 16-20, 1998, pp. 2147-2154 XP-002115803.

Kornbluh, R., R. Pelrine, J. Joseph, "Elastomeric Dielectric Artificial Muscle Actuators for Small Robots," Proceedings of the Third IASTED International Conference on Robotics and Manufacturing, Jun. 14-16, 1995, Cancun, Mexico.

Kornbluh, R., R. Pelrine, Jose Joseph, Richard Heydt, Qibing Pei, Seiki Chiba, 1999. "High-Field Electrostriction of Elastomeric Polymer Dielectrics for Actuation", Proceedings of the SPIE International Symposium on Smart Structures and Materials: Electro.

Kornbluh, R., R. Pelrine, Q. Pei, S. Oh, and J. Joseph, "Ultrahigh Strain Response of Field-Actuated Elastomeric Polymers," Proceedings of the 7th SPIE Symposium on Smart Structures Materials-Electroactive Polymers and Devices (EAPAD) Conference, Mar. 1999.

Kornbluh, R., R. Pelrine, R. Heydt, and Q. Pei, "Acoustic Actuators Based on the Field-Activated Deformation of Dielectric Elastomers," (2000).

Ktech's PVDF Sensors, http://www.ktech.com/pvdf.htm, Jun. 6, 2001, pp. 1-5.

Lang, J, M. Schlect, and R. Howe, "Electric Micromotors: Electromechanical Characteristics," Proc. IEEE Micro Robots and Teleoperators Workshop, Hyannis, Massachusetts (Nov. 9-11, 1987).

Lawless, W. and R. Arenz, "Miniature Solid-state Gas Compressor," Rev. Sci Instrum., 58(8), pp. 1487-1493, Aug. 1987.

Liu, C., Y. Bar-Cohen, and S. Leary, "Electro-statically stricted polymers (ESSP)," Proceedings of the SPIE International Symposium on Smart Structures and Materials: Electro-Active Polymer Actuators and Devices, Mar. 1-2, 1999, Newport Beach, California.

Liu, Y., T. Zeng, Y.X. Wang, H. Yu, and R. Claus, "Self-Assembled Flexible Electrodes on Electroactive Polymer Actuators," Proceedings of the SPIE International Symposium on Smart Structures and Materials: Electro-Active Polymer Actuators and Devices, Mar 1999.

Martin, J. and R. Anderson, 1999. "Electrostriction in Field-Structured Composites: Basis for a Fast Artificial Muscle?", Journal of Chemical Physics, vol. 111, No. 9, pp. 4273-4280, Sep. 1, 1999.

Measurements Specialties, Inc.—Piezo Home, http://www.msiusa.com/piezo/index.htm, Jun. 6, 2001.

Nguyen, T. B., DeBolt, C. K., Shastri, S. V., and Mann, A., "Advanced Robotic Search," in ONR Ocean, Atmosphere, and Space Fiscal Year 1999 Annual Reports (Dec. 1999).

Nguyen, T., Green, M., and Kornbluh, R., "Robotic Systems," in ONR Ocean, Atmosphere, and Space Fiscal Year 1999 Annual Reports (Dec. 1999).

Nguyen, T., J. A. Willett and Kornbluh, R., "Robotic systems," in ONR Ocean, Atmosphere, and Space Fiscal Year 1998 Annual Reports (Dec. 1998).

Ohara, K., M. Hennecke, and J. Fuhrmann, "Electrostriction of polymethylmethacrylates," Colloid & Polymer Sci. vol. 280, 164-168 (1982).

Olsson, A., G. Stemme, and E. Stemme, "The First Valve-less Diffuser Gas Pump," Tenth Annual International Workshop on Micro Electromechanical Systems, Nagoya, Japan, IEEE Proceedings (Jan. 26-30, 1997), pp. 108-113.

Olsson, A., O. Larsson, J. Holm, L. Lundbladh, O. Ohinan, and G. Stemme. 1997. "Valve-less Diffuser Micropumps Fabricated using Thermoplastic Replication," Proc. IEEE Micro Electro Mechanical Systems, Nagoya, Japan, pp. 305-310 (Jan. 26-30, 1997).

Otero, T.F., J. Rodriguez, and C. Santamaria, "Smart Muscle Under Electrochemical Control of Molecular Movement in Polypyrrole Films," Materials Research Society Symposium Proceedings, vol. 330, pp. 333-338, 1994.

Otero, T.F., J. Rodriguez, E. Angulo and C. Santamaria, "Artificial Muscles from Bilayer Structures," Synthetic Metals, vol. 55-57, pp. 3713-3717 (1993).

Park, S.E., and T. Shrout., "Ultrahigh Strain and Piezoelectric Behavior in Relaxor Based Ferroelectric Single Crystals," J Applied Physics, vol. 82, pp. 1804-1811, Aug. 15, 1997.

PCT Patent Application No. PCT/US2003/007115 filed Mar. 5, 2003 in the name of Heim et al., International Search Report mailed May 29, 2003.

PCT Patent Application No. PCT/US2003/008703 filed Mar. 18, 2003 in the name of Pelrine et al., International Search Report mailed Jul. 1, 2003.

Pei, Q., O. Inganas, and I. Lundstrom, "Bending Bilayer Strips Built From Polyaniline for Artificial Electrochemical Muscles," Smart Materials and Structures, vol. 2, pp. 1-6., Jan. 22, 1993.

Pelrine R. E., et al.: "Electrostriction of Polymer Dielectrics with Compliant Electrodes as a Means of Actuation", Sensors and Actuators A., Elsevier Sequoia S.A., Lausanne, Ch, vol. 64, No. 1, 1998, pp. 77-85, XP004102141, ISSN: 0924-4247.

Pelrine, R, R. Kornbluh, J. Joseph, and S. Chiba, "Electrostriction of Polymer Films for Microactuators," Proc. IEEE Tenth Annual International Workshop on Micro Electro Mechanical Systems, Nagoya, Japan, Jan. 26-30, 1997, pp. 238-243.

Pelrine, R. and Kornbluh, R., and. 1995. "Dexterous Multiarticulated Manipulator with Electrostrictive Polymer Artificial Muscle Actuator," EMU 95-023, SRI International, Menlo Park, California, Apr. 28, 1995.

Pelrine, R., and J. Joseph, FY 1992 Final Report on Artificial Muscle for Small Robots, ITAD-3393-FR-93-063, SRI International, Menlo Park, California, Mar. 1993.

Pelrine, R., and J. Joseph. 1994. FY 1993 Final Report on Artificial Muscle for Small Robots, ITAD-4570-FR-94-076, SRI International, Menlo Park, California.

Pelrine, R., J. Eckerle, and S. Chiba, "Review of Artificial Muscle Approaches," invited paper, in Proc. Third International Symposium on Micro Machine and Human Science, Nagoya, Japan, Oct. 14-16, 1992.

Pelrine, R., R. Kornbluh, and G. Kofod, "High Strain Actuator Materials Based on Dielectric Elastomers," submitted to Advanced Materials (May 2000).

Pelrine, R., R. Kornbluh, and J. Joseph, "Electrostriction of Polymer Dielectrics with Compliant Electrodes as a Means of Actuation," Sensors and Actuators A: Physical, vol. 64, 1998, pp. 77-85.

Pelrine, R., R. Kornbluh, and J. Joseph, FY 1994 Final Report on Artificial Muscle for Small Robots, ITAD-5782-FR-95-050, SRI International, Menlo Park, California, 1995.

Pelrine, R., R. Kornbluh, and J. Joseph, FY 1995 Final Report on Artificial Muscle for Small Robots, ITAD-7071-FR-96-047, SRI International, Menlo Park, California, 1996.

Pelrine, R., R. Kornbluh, and J. Joseph, FY 1996 Final Report on Artificial Muscle for Small Robots, ITAD-7228-FR-97-058, SRI International, Menlo Park, California, 1997.

Pelrine, R., R. Kornbluh, and J. Joseph, FY 1997 Final Report on Artificial Muscle for Small Robots, ITAD-1612-FR-98-041, SRI International, Menlo Park, California, 1998.

Pelrine, R., R. Kornbluh, and J. Joseph, FY 1998 Final Report on Artificial Muscle for Small Robots, ITAD-3482-FR-99-36, SRI International, Menlo Park, California, 1999.

Pelrine, R., R. Kornbluh, and J. Joseph, FY 1999 Final Report on Artificial Muscle for Small Robots, ITAD-10162-FR-00-27, SRI International, Menlo Park, California, 2000.

Pelrine, R., R. Kornbluh, Q. Pei, and J. Joseph, "High Speed Electrically Actuated Elastomers with Over 100% Strain," Science, vol. 287, No. 5454, pp. 1-21, 2000.

Pelrine, R., R. Kornbluh, Q. Pei, and J. Joseph. "High-Speed Electrically Actuated Elastomers with Strain Greater Than 100%", Science, Reprint Series, Feb. 4, 2000, vol. 287, pp. 836-839.

Pelrine, R., Roy Kornbluh, Jose Joseph, Qibing Pei, Seiki Chiba "Recent Progress in Artificial Muscle Micro Actuators," SRI International, Tokyo, 1999 MITI/NEEDOIMNIC, 1999.

Piezoflex.TM. PVDF Polymer Sensors, http://www.airmar.com/piezo/pvdf.htm, Jun. 6, 2001.

Puers et al, "A Capacitive Pressure Sensor with Low Impedance Output and Active Suppression of Parasitic Effects," Sensors and Actuators, A21-A23 (1990) 108-114.

Puers, Robert, "Capacitive sensors: when and how to use them," Sensors and Actuators A, 37-38 (1993) 93-105.

Scheinbeim, J., B. Newman, Z. Ma, and J. Lee, "Electrostrictive Response of Elastomeric Polymers," ACS Polymer Preprints, 33(2), pp. 385-386, 1992.

Schlaberg, H. I., and J. S. Duffy, "Piezoelectric Polymer Composite Arrays for Ultrasonic Medical Imaging Applications," Sensors and Actuators, A 44, pp. 111-117, Feb. 22, 1994.

Shahinpoor, M., "Micro-electro-mechanics of Ionic Polymer Gels as Electrically Controllable Artificial Muscles," J. Intelligent Material Systems and Structures, vol. 6, pp. 307-314, May 1995.

Shkel, Y., and D. Klingenberg, "Material Parameters for Electrostriction," J Applied Physics, vol. 80(8), pp. 4566-4572, Oct. 15, 1996.

Smela, E., O. Inganas, and I. Lundstrom, "Controlled Folding of Micrometer-size Structures," Science, vol. 268, pp. 1735-1738 (Jun. 23, 1995).

Smela, E., O. Inganas, Q. Pei, and I. Lundstrom, "Electrochemical Muscles: Micromachining Fingers and Corkscrews," Advanced Materials, vol. 5, No. 9, pp. 630-632, Sep. 1993.

Su, J., Q. M. Zhang, C. H. Kim, R. Y. Ting, and R. Capps, "Effects of Transitional Phenomena on the Electric Field induced Strain-electrostrictive Response of a Segmented Polyurethane Elastomer," pp. 1363-1370, Jan. 20, 1997.

Su, J., Z. Ounaies, J. S. Harrison, Y. Bara-Cohen and S. Leary, "Electromechanically Active Polymer Blends for Actuation," Proceedings of the 7th SPIE Symposium on Smart Structures and Materials-Electroactive Polymers and Devices (EAPAD) Conference, Mar. 1999.

Technology, http://www.micromuscle.com/html/technology.html, Jun. 6, 2001.

Tobushi, H., S. Hayashi, and S. Kojima, "Mechanical Properties of Shape Memory Polymer of Polyurethane Series," in JSME International Journal, Series I, vol. 35, No. 3, 1992.

Treloar, L.R.G, "Mechanics of Rubber Elasticity," J Polymer Science, Polymer Symposium, No. 48, pp. 107-123, 1974.

U.S. Appl. No. 10/393,506, filed Mar. 18, 2003, in the name of Pelrine, Non-Final Rejection mailed Apr. 8, 2005.

U.S. Appl. No. 10/393,506, filed Mar. 18, 2003, in the name of Pelrine, Notice of Allowance mailed Dec. 23, 2005.

U.S. Appl. No. 11/375,930, filed Mar. 14, 2006, in the name of Pelrine, Final Rejection mailed Apr. 17, 2007.

U.S. Appl. No. 11/375,930, filed Mar. 14, 2006, in the name of Pelrine, Non-Final Rejection mailed Nov. 2, 2006.

U.S. Appl. No. 11/375,930, filed Mar. 14, 2006, in the name of Pelrine, Notice of Allowance mailed Jul. 10, 2007.

U.S. Appl. No. 11/375,930, filed Mar. 14, 2006, in the name of Pelrine, Notice of Allowance mailed Sep. 13, 2007.

U.S. Appl. No. 11/645,226, filed Dec. 21, 2006, in the name of Pelrine, Non-Final Rejection mailed Nov. 2, 2007.

U.S. Appl. No. 11/645,226, filed Dec. 21, 2006, in the name of Pelrine, Notice of Allowance mailed Apr. 14, 2008.

U.S. Appl. No. 12/424,486, filed Apr. 15, 2009, in the name of Heim et al, Notice of Allowance mailed Dec. 11, 2009.

U.S. Appl. No. 10/383,005, filed Mar. 5, 2003 in the name of Heim et al., Final Office Action mailed Apr. 24, 2007.

U.S. Appl. No. 10/383,005, filed Mar. 5, 2003 in the name of Heim et al., Non-final Office Action mailed May 3, 2006.

U.S. Appl. No. 10/383,005, filed Mar. 5, 2003 in the name of Heim et al., Non-final Office Action mailed Nov. 27, 2006.

U.S. Appl. No. 10/383,005, filed Mar. 5, 2003 in the name of Heim et al., Notice of Allowance mailed Aug. 14, 2006.

U.S. Appl. No. 10/383,005, filed Mar. 5, 2003 in the name of Heim et al., Notice of Allowance mailed Sep. 7, 2007.

U.S. Appl. No. 11/829,920, filed Jul. 29, 2007 in the name of Heim et al., Non-final Office Action mailed Sep. 15, 2008.

U.S. Appl. No. 11/829,920, filed Jul. 29, 2007 in the name of Heim et al., Notice of Allowance mailed Feb. 11, 2009.

U.S. Appl. No. 12/424,486, filed Apr. 15, 2009 in the name of Heim et al., Non-final Office Action mailed May 26, 2009.

Uchino, K. 1986. "Electrostrictive Actuators: Materials and Applications," Ceramic Bulletin, 65(4), pp. 647-652, 1986.

Wade, W. L., Jr., R. J. Mammone and M. Binder, "Increased Dielectric Breakdown Strengths of Melt-Extruded Polyporpylene Films," Polymer, vol. 34, No. 5, pp. 1093-1094 (1993).

Wax, S. G. and R. R. Sands, "Electroactive Polymer Actuators and Devices," Proceedings of the SPIE International Symposium on Smart Structures and Materials: Electro-Active Polymer Actuators and Devices, Mar. 1-2, 1999, Newport Beach, California, USA., pp.

Yam, P., "Plastics Get Wired", Scientific American, vol. 273, pp. 82-87, Jul. 1995.

Zhang, Q. M., V. Bharti, Z.-Y. Cheng, T.-B. Xu, S. Wang, T. S. Ramotowski, F. Tito, and R. Ting, "Electromechanical Behavior of Electroactive P(VDF-TrFE) Copolymers," Proceedings of the SPIE International Symposium on Smart Structures and Materials: Elect, 1999.

Zhang, Q. M., Z.-Y. Cheng, V. Bharti, T.-B. Xu, H. Xu, T. Mai, and S. J. Gross, "Piezoelectric and Electrostrictive Polymeric Actuator Materials," Proceedings of the 7th SPIE Symposium on Smart Structures and Materials—Electroactive Polymers and Devices, 2000.

Zhang, Q., V. Bharti, and X. Zhao, "Giant Electrostriction and Relaxor Ferroelectric Behavior in Electron-irradiated Poly(vinylidene fluoride-trifluoroethylene) Copolymer," Science, vol. 280, pp. 2101-2104 (Jun. 26, 1998).

Zhenyi, M., J.I. Scheinbeim, J.W. Lee, and B.A. Newman. 1994. "High Field Electrostrictive Response of Polymers," Journal of Polymer Sciences, Part B—Polymer Physics, vol. 32, pp. 2721-2731, 1994.

\* cited by examiner

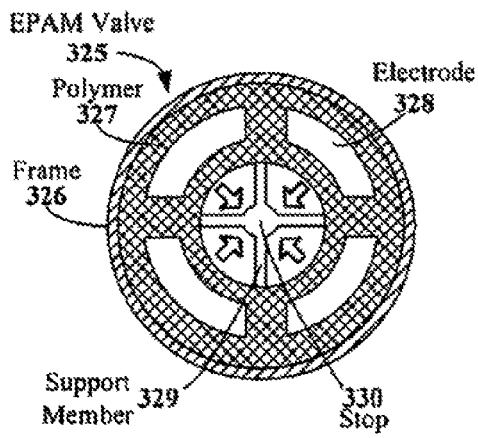
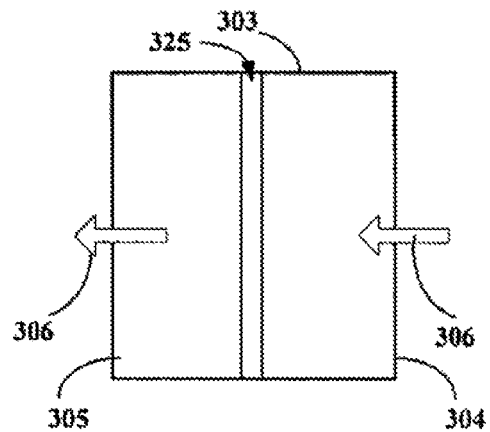
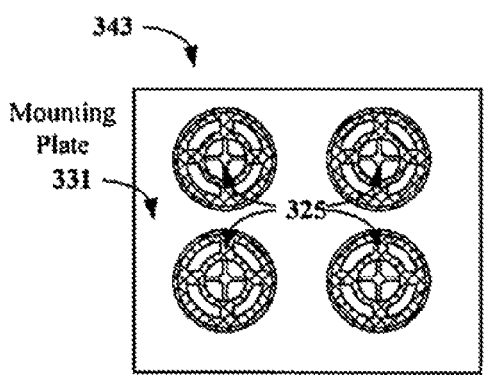
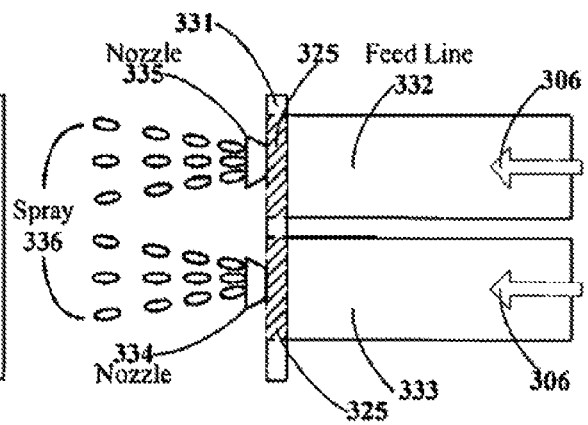
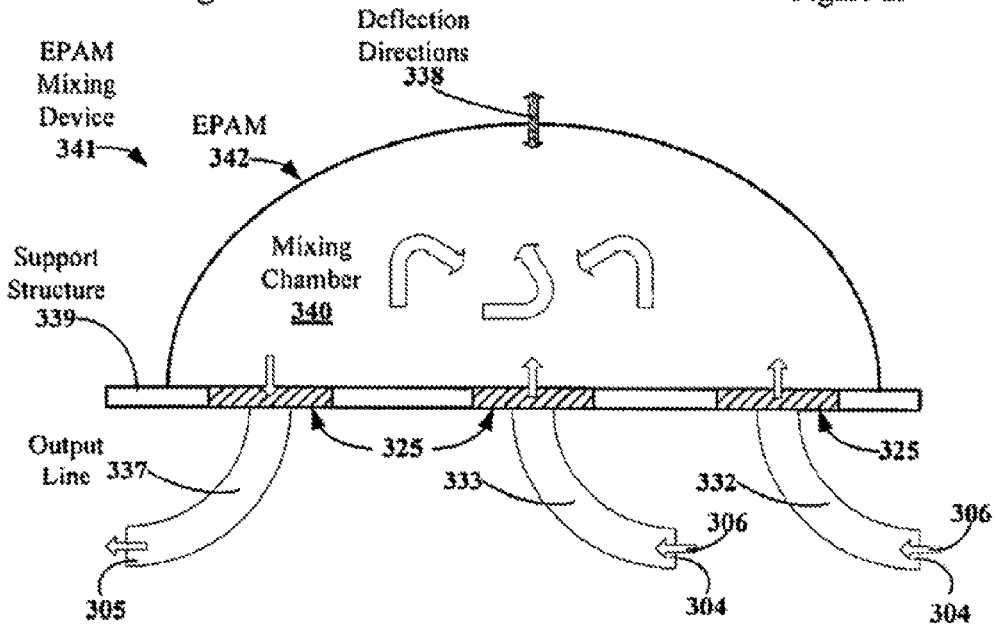

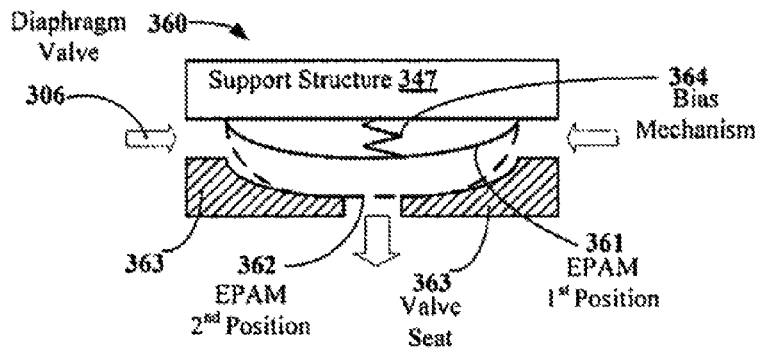
Figure 3A
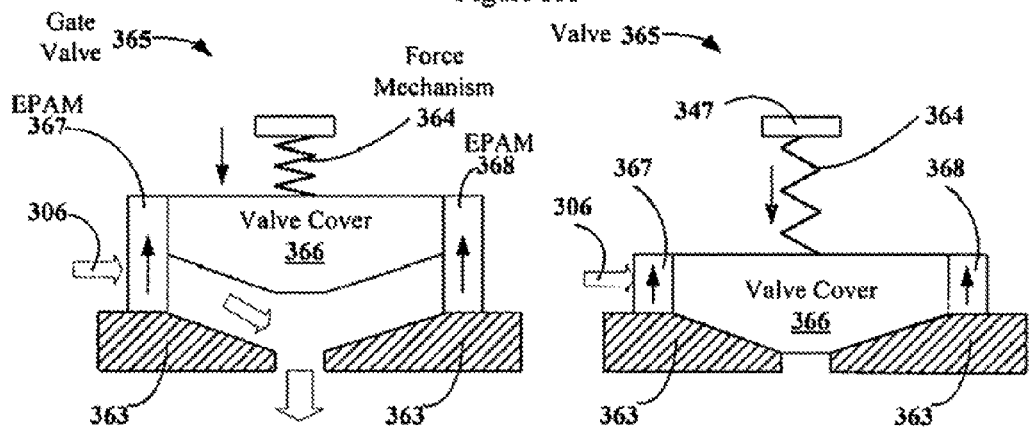
Figure 3B     Figure 3C
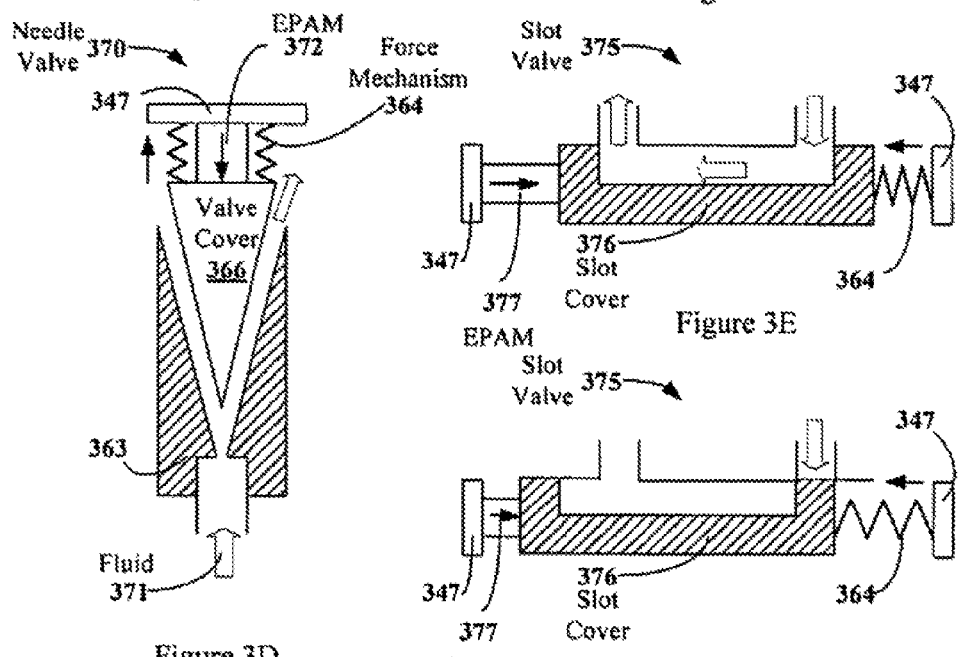
Figure 3D     Figure 3E
Figure 3F

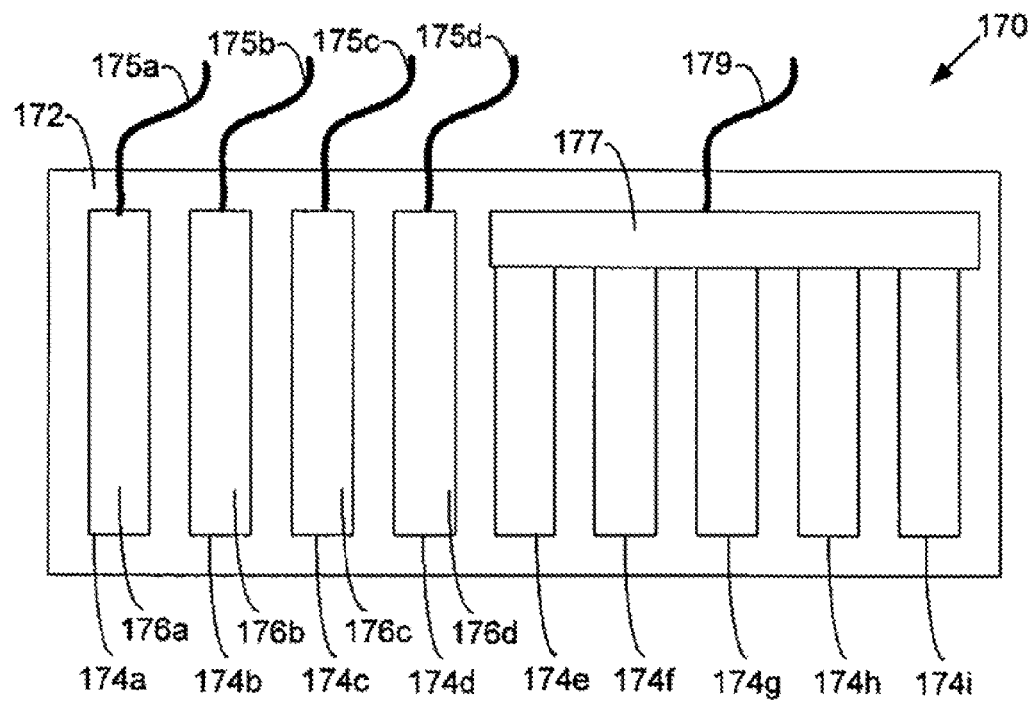
FIG. 4K
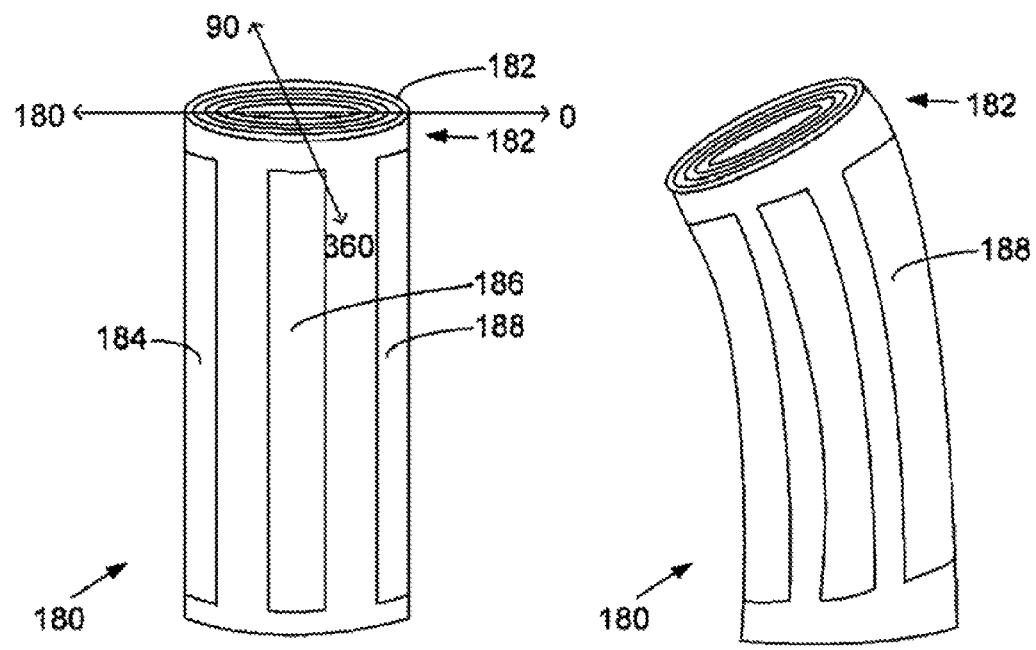
FIG. 4L
FIG. 4M

ELECTROACTIVE POLYMER DEVICES FOR CONTROLLING FLUID FLOW

CROSS-REFERENCE TO RELATED APPLICATIONS

This application is a continuation of U.S. patent application Ser. No. 12/424,486 filed Apr. 15, 2009 entitled "Electroactive Polymer Devices for Controlling Fluid Flow," which is a continuation of U.S. patent application Ser. No. 11/829,920, filed Jul. 29, 2007, issued as U.S. Pat. No. 7,537, 197 on May 26, 2009 and entitled, "Electroactive Polymer Devices for Controlling Fluid Flow," which is in turn a continuation of U.S. patent application Ser. No. 10/383,005, filed Mar. 5, 2003, issued as U.S. Pat. No. 7,320,457 on Jan. 22, 2008 entitled "Electroactive Polymer Devices for Controlling Fluid Flow"; the 10/383,005 application claims priority under 35 U.S.C. sctn.119(e) from U.S. Provisional Patent Application No. 60/362,560, filed on Mar. 5, 2002; and the 10/383, 005 application is also a continuation-in-part and claims priority from U.S. patent application Ser. No. 09/792,431, filed Feb. 23, 2001, issued as U.S. Pat. No. 6,628,040 on Sep. 30, 2003, which claims priority under 35 U.S.C. sctn. 119(e) from a) U.S. Provisional Patent Application No. 60/184,217 filed Feb. 23, 2000, and b) U.S. Provisional Patent Application No. 60/190,713, filed Mar. 17, 2000; and the 10/383,005 application is a continuation-in-part and claims priority from U.S. patent application Ser. No. 10/154,449, filed May 21, 2002, issued as U.S. Pat. No. 6,891,317 on May 10, 2005, which claims priority under 35 U.S.C. sctn. 119(e) from U.S. Provisional Patent Application No. 60/293,003, filed on May 22, 2001; and the 10/383,005 application is a continuation-in-part and claims priority from U.S. patent application Ser. No. 10/053,511, filed Jan. 16, 2002, issued as U.S. Pat. No. 6,882,086 on Apr. 19, 2005, which claims priority under 35 U.S.C. sctn. 119(e) from a) U.S. Provisional Patent Application No. 60/293,005 filed May 22, 2001, and b) U.S. Provisional Patent Application No. 60/327,846, filed Oct. 5, 2001; and the 10/383,005 application is also a continuation-in-part and claims priority from U.S. patent application Ser. No. 09/619,847, filed Jul. 20, 2000, issued as U.S. Pat. No. 6,812, 624 on Feb. 27, 2007, which claims priority under 35 U.S.C. sctn. 119(e) from a) U.S. Provisional Patent Application No. 60/144,556 filed Jul. 20, 1999, b) U.S. Provisional Patent Application No. 60/153,329 filed Sep. 10, 1999, c) U.S. Provisional Patent Application No. 60/161,325 filed Oct. 25, 1999, d) U.S. Provisional Patent Application No. 60/181,404 filed Feb. 9, 2000, e) U.S. Provisional Patent Application No. 60/187,809 filed Mar. 8, 2000, f) U.S. Provisional Patent Application No. 60/192,237 filed Mar. 27, 2000, g) U.S. Provisional Patent Application No. 60/184,217 filed Feb. 23, 2000; and the 10/383,005 application is a continuation-in-part and claims priority from U.S. patent application Ser. No. 10/007,705 filed on Dec. 6, 2001, issued as U.S. Pat. No. 6,809,462 on Oct. 26, 2004, which claims priority under 35 U.S.C. sctn.119(e) from U.S. Provisional Patent Application No. 60/293,004 filed May 22, 2001, and which is also a continuation in part of U.S. patent application Ser. No. 09/828,496, filed on Apr. 4, 2004, issued as U.S. Pat. No. 6,586,859 on Jul. 1, 2003, which claims priority from U.S. Provisional Application No. 60/194,817 filed Apr. 5, 2000; and the 10/383,005 application is a continuation-in-part and claims priority from U.S. patent application Ser. No. 10/066, 407, filed on Jan. 31, 2002 and issued as U.S. Pat. No. 7,052, 594 on May 30, 2006; each of the patent applications listed above is incorporated by reference herein in its entirety for all purposes.

STATEMENT REGARDING FEDERALLY SPONSORED RESEARCH OR DEVELOPMENT

This application was made in part with government support under contract number N00014-00-C-0497 awarded by the Office of Naval Research. The government has certain rights in the invention.

BACKGROUND OF THE INVENTION

The present invention relates generally to electroactive polymer devices that convert between electrical energy and mechanical energy. More particularly, the present invention relates to fluidic communication control devices and systems comprising one or more electroactive polymer transducers.

Fluid systems are ubiquitous. The automotive industry, the plumbing industry, chemical processing industry and the aerospace industry are a few examples where fluid systems are of critical importance. In fluid systems, it is often desirable to control properties of a fluid flow in the fluid system to improve a performance or efficiency of the fluid system or to control the fluid in the fluid system in manner that allows the fluid system to operate properly.

As an example, in the automotive industry, the demand for higher power, better fuel economy, and reduced emissions from automobiles calls for continued improvement of automobile components, in particular, the need for reduced size, weight, and costs of automotive components "under the hood." additionally, the demand for power, fuel economy and reduced emissions often results in conflicting requirements for engine performance. For example, higher power usually comes at the expense of fuel economy and/or emissions. Therefore, engine components must also have flexible operating characteristics to achieve performance at different speed ranges.

A significant number of components under the hood of an automobile serve the function of controlling fluid flow in a manner that relates to engine performance and emissions. Flow control devices are found in different parts of the engine and various engine subsystems including the fuel injection system, the air intake system, the cooling system, and the exhaust system.

For instance, the operating characteristics of the intake and exhaust valves for the combustion chamber are important to engine performance. The intake valve opens at proper times to let air/fuel mixture into the combustion chamber and the exhaust valve opens at proper times to let out the exhaust. The valve timing and lift (amount of valve opening) characteristics of an engine has a major influence on engine performance at different speed ranges. Current engines have fixed valve timing and lift so performance is a compromise between power and fuel economy. The engine performance at different speeds can be optimized by employing variable timing and valve lift. However, conventional actuator technology, such as solenoids and hydraulics, are expensive, heavy, and complex at the power levels required to actuate intake and exhaust valves. Thus, variable timing and valve lift has not been heavily utilized in the automotive industry. The limitations of conventional actuator technology, such as cost and weight, are important in many fluid control applications besides the automotive industry. For instance, weight and cost are usually critical considerations in aerospace applications.

New high-performance polymers capable of converting electrical energy to mechanical energy, and vice versa, are now available for a wide range of energy conversion applications. One class of these polymers, electroactive elastomers (also called dielectric elastomers, electroelastomers, or epam), is gaining wider attention. Electroactive elastomers may exhibit high energy density, stress, and electromechanical coupling efficiency. The performance of these polymers is notably increased when the polymers are prestrained in area. For example, a 10-fold to 25-fold increase in area significantly improves performance of many electroactive elastomers. Actuators and transducers produced using these materials can be significantly cheaper, lighter and have a greater operation range as compared to conventional technologies used in fluid control applications.

Thus, improved techniques for implementing these high-performance polymers in fluid control applications would be desirable.

BRIEF SUMMARY OF THE INVENTION

The invention describes devices for controlling fluid flow, such as valves. The devices may include one or more electroactive polymer transducers with an electroactive polymer that deflects in response to an application of an electric field. The electroactive polymer may be in contact with a fluid where the deflection of the electroactive polymer may be used to change a characteristic of the fluid. Some of the characteristic of the fluid that may be changed include but are not limited to 1) a fluid flow rate, 2) a fluid flow direction, 3) a fluid flow vorticity, 4) a fluid flow momentum, 5) a fluid flow mixing rate, 6) a fluid flow turbulence rate, 7) a fluid flow energy, 8) a fluid flow thermodynamic property. The electroactive polymer may be a portion of a surface of a structure that is immersed in an external fluid flow, such as the surface of an airplane wing or the electroactive polymer may be a portion of a surface of a structure used in an internal flow, such as a bounding surface of a fluid conduit.

One aspect of the present invention provides device for controlling a fluid. The device may be generally characterized as comprising: 1) one or more transducers, each transducer comprising at least two electrodes and a electroactive polymer in electrical communication with the at least two electrodes wherein a portion of the electroactive polymer is arranged to deflect from a first position with a first area to a second position with a second area in response to a change in electric field; 2) at least one surface in contact with a fluid and operatively coupled to the one or more transducers wherein the deflection of the portion of the electroactive polymer causes a change in a characteristic of the fluid that is transmitted to the fluid via the one surface. The characteristic of the fluid that may be changed includes but is not limited to a fluid flow rate, 2) a fluid flow direction, 3) a fluid flow vorticity, 4) a fluid flow momentum, 5) a fluid flow mixing rate, 6) a fluid flow turbulence rate, 7) a fluid flow energy, 8) a fluid flow thermodynamic property.

In particular embodiments, the deflection of the portion of the electroactive polymer may change the one surface from a first shape to a second shape. For instance, the one surface may expand to form one of a balloon-like shape, a hemispherical shape, a cylinder shape, or a half-cylinder shape. The one surface may be operatively coupled to the one or more transducers via a mechanical linkage. Further, the one surface may be an outer surface of the portion of the electroactive polymer.

The fluid may be compressible, incompressible or combinations thereof. The fluid may also be one of homogeneous or heterogeneous. Further, the fluid may behave as a Newtonian fluid or a non-Newtonian fluid. The fluid is selected from the group consisting of a mixture, a slurry, a suspension, a mixture of two or more immiscible liquids and combinations thereof. The fluid may include one or constituents in a state selected from the group consisting of a liquid, a gas, a plasma, a solid, a phase change and combinations thereof.

In a particular embodiment, the fluid may flow over the one surface. The deflection of the portion of the electroactive polymer may change the shape of the one surface to alter a property of a viscous flow layer of the fluid flow or to alter a property of an inviscid flow layer of the fluid flow. Further, the deflection of the portion of the electroactive polymer may change the shape of the one surface to promote mixing of constituents in the fluid or to block the fluid flow. In addition, the deflection of the portion of the electroactive polymer may cause a change in temperature of the one surface or a change in a surface roughness of the one surface. For example, the one surface may further comprise an array of microscopic electroactive polymer elements where a deflection of the microscopic electroactive polymer elements from a first position to a second position changes a surface roughness of the one surface. Yet further, the deflection of the portion of the electroactive polymer may cause the one surface to stretch or contract to alter a relative smoothness of the one surface where the relative smoothness of the one surfaces affects a drag on a fluid flowing over the one surface.

In other embodiment, the device may further comprise a fluid conduit configured to allow fluid to flow from an inlet of the fluid conduit to an exit of the fluid conduit and pass over the one surface between the inlet and the exit and wherein a bounding surface of the fluid conduit separates the fluid from an outer environment. In this case, the one surface may be an outer surface of the portion of the electroactive polymer and also a portion of the bounding surface of the fluid conduit. The deflection of the portion of the electroactive polymer may cause a shape of the bounding surface of the fluid conduit to change. For instance, the shape of the fluid conduit may be changed to increase the distance the fluid travels from the inlet to the exit. Further, the shape of the fluid conduit may change dynamically as a function of time. For example, the shape of the fluid conduit may be changed to increase or decrease a cross-sectional area of a section of the fluid conduit where the shape of the cross-sectional area is selected from the group consisting of circular, ovular, rectangular and polygonal. The shapes of two or more portions the bounding surface of the fluid conduit may be changed independently in response to the deflection of the portion of the polymer in the one or more transducers. Also, the deflection of the portion of the polymer causes a bounding surface of the polymer to rotate torsionally.

In yet other embodiments, the bounding surface of the fluid conduit may be comprised of a rolled electroactive polymer transducer with a hollow center. Further, one or more transducers may be arranged to deflect in a manner that pinches a portion of an outer perimeter of a section of the fluid conduit to block the fluid flow in the conduit where the one or more transducers may be configured in a sleeve designed to fit over the outer perimeter of a section of the fluid conduit. In another embodiment, the deflection in the portion of the electroactive polymer may cause the one surface to expand to block the flow in the fluid conduit, to expand to increase or decrease the flow in the fluid conduit, to expand to divert flow in the fluid conduit from a first channel to a second channel connected to the fluid conduit.

In a particular embodiment, a portion of the fluid conduit is a nozzle body for expanding the fluid from a throat area in the fluid conduit to an exit of the nozzle body. The deflection in the portion of the electroactive polymer may cause the nozzle body to expand or contract to change an expansion rate of the fluid in the nozzle body and a velocity profile of the fluid at the exit of the nozzle body. Further, the deflection of the portion of the electroactive polymer causes a cross sectional shape of the nozzle body to change from a first shape to a second shape. In addition, the deflection of the portion of the electroactive polymer causes a cross section shape of the throat area to change from a first shape to a second shape. Yet further, the deflection of the portion of the electroactive polymer causes the nozzle body to bend to change a direction of the fluid exiting the nozzle.

The device may also comprise one or more sensors connected to the device for detecting a property of the fluid where the property of the fluid is selected from the group consisting of a temperature, a pressure, a concentration of a constituent of the fluid, a velocity of the fluid, a density of the fluid and flow rate of the fluid. Further, the device may also include one or mores sensors connected to the device for monitoring one or more of a temperature, a pressure, the deflection of the portion of the polymer, a charge on the portion of the polymer, a voltage on the portion of the polymer. In addition, the device may comprise a logic device for at least one of: 1) controlling operation of the transducer, 2) monitoring one or more sensors, 3) communicating with other devices, and 4) combinations thereof. Also, the device may comprise conditioning electronics designed or configured to perform one or more of the following functions for the electroactive polymer: voltage step-up, voltage step-down and charge control.

In other embodiments, the polymer may comprise a material selected from the group consisting of a silicone elastomer, an acrylic elastomer, a polyurethane, a copolymer comprising PVDF, and combinations thereof. The device may include an insulation barrier designed or configured to protect the one surface from constituents of the fluid in contact with the one surface or one or more support structures designed or configured to attach to the one or more transducers. The electroactive polymer may be elastically pre-strained at the first position to improve a mechanical response of the electroactive polymer between the first position and second position, may an elastic modulus below about 100 MPa and may have an elastic area strain of at least about 10 percent between the first position and the second position.

The polymer may comprise a multilayer structure where the multilayer structure comprises two or more layers of electroactive polymers. The device may be fabricated on a semiconductor substrate. The device may be a valve. Further, the one surface is part of a surface of vane for controlling a direction of a flow of the fluid where the deflection of the portion of the polymer changes an orientation of the vane in the fluid flow.

Another aspect of the present invention provides a valve. The valve may be generally characterized as comprising 1) one or more transducers, each transducer comprising at least two electrodes and a electroactive polymer in electrical communication with the at least two electrodes wherein a portion of the electroactive polymer is arranged to deflect from a first position with a first area to a second position with a second area in response to a change in electric field; 2) an inlet and an exit for allowing a fluid to enter the valve and exit the valve; 3) a flow path between the inlet and exit that allows a fluid to pass through the valve; 4) a structure operatively coupled to the one or more transducers wherein the deflection of the portion of the electroactive polymer causes an operating position of the structure to change and wherein a change in the operating position of the structure changes the flow path. The structure may be designed to have two operating positions where when structure is in the first operating position, the flow path is closed and where when the structure is in the second operating position, the flow path is open. Also, the structure may be designed to have a plurality of operating positions. The deflection of the portion of the electroactive polymer may change the structure from a first shape to a second shape.

In particular embodiments, the change in the operating position of the structure may change a cross-sectional area of the flow path for at least one location along the flow path. The valve may also comprise a valve seat wherein the deflection of the portion of the polymer causes the structure to contact the valve seat. The valve may be a diaphragm valve and the structure may be a diaphragm. When the valve is a diaphragm valve, the structure may be the electroactive polymer in a shape of a diaphragm. In general, the electroactive polymer may be a part of the structure. The valve may also be a needle valve where the structure is a conical in shape. The valve may be a ball valve where the structure is spherical in shape or a plug valve where the structure is plug-shaped. In general, the valve may be one of a check valve, a buttery fly valve, a pressure relief valve, a needle valve, a control valve, a slot valve, a rotary valve, engine in-take valve and an engine exhaust valve.

In other embodiments, the structure may further include a fluid conduit that is a section of the flow path. The deflection of the portion of the polymer causes the structure to rotate from a first operating position to a second operating position where in the first operating position the fluid conduit in the structure is aligned with the flow path outside of the structure and the flow path through the valve is open. In the second operating position, the fluid conduit may not be aligned with the flow path outside of the structure and the flow path through the valve is blocked. In addition, the deflection of the portion of the polymer may cause the structure to move linearly from a first operating position to a second operating position. When the structure is in the first operating position, the fluid conduit in the structure may be aligned with the flow path outside of the structure and the flow path through the valve is open. When the structure is in the second operating position, the fluid conduit is not aligned with the flow path outside of the structure and the flow path through the valve is blocked. The valve may be a slot valve and the fluid conduit is a slot.

In yet other embodiments, the structure is an electroactive polymer roll where a section of the flow path is through the center of the polymer roll. Further, the portion of the electroactive polymer may be a bounding surface in the flow path. The valve may comprise one or more sensors where an input signal from the one or more sensors is used to determine the operating position of the structure. The valve may be a multi-port valve and the operating position of the structure allows the flow path to align with one of a plurality of ports. The valve may further comprise a logic device for at least one of: 1) controlling operation of the valve, 2) monitoring one or more sensors, 3) communicating with other devices, and 4) combinations thereof or conditioning electronics designed or configured to perform one or more of the following functions for the electroactive polymer: voltage step-up, voltage step-down and charge control. The valve may include a force mechanism, which provides a force in a direction opposite to a direction of a second force applied to the structure by the deflection of the portion of the electroactive polymer. The force mechanism may be a spring.

These and other features and advantages of the present invention will be described in the following description of the invention and associated figures.

BRIEF DESCRIPTION OF THE SEVERAL VIEWS OF THE DRAWINGS

FIGS. 2G-2J illustrate EPAM flow control devices where the EPAM device is used to control a flow rate in a fluid conduit.

FIG. 2K illustrates an EPAM flow control device for mixing and dispensing of a fluid.

FIGS. 3A-3M illustrate an EPAM flow control devices used in a variety of different valve applications.

FIG. 4K illustrates a monolithic transducer comprising a plurality of active areas on a single polymer, before rolling, in accordance with one embodiment of the present invention.

FIG. 4L illustrates a rolled transducer that produces two-dimensional output in accordance with one environment of the present invention.

FIG. 4M illustrates the rolled transducer of FIG. 4L with actuation for one set of radially aligned active areas.

DETAILED DESCRIPTION OF THE INVENTION

The present invention is described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Electroactive Polymers

Figure 1A:
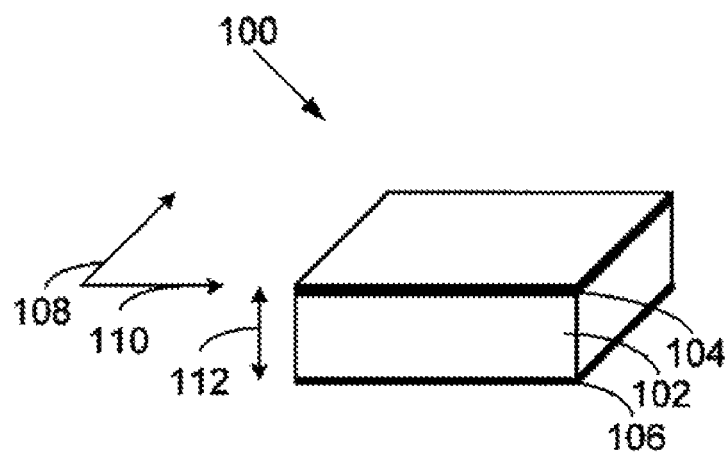
FIGS. 1A and 1B illustrate a top view of a transducer portion before and after application of a voltage, respectively, in accordance with one embodiment of the present invention.
Figure 1B:
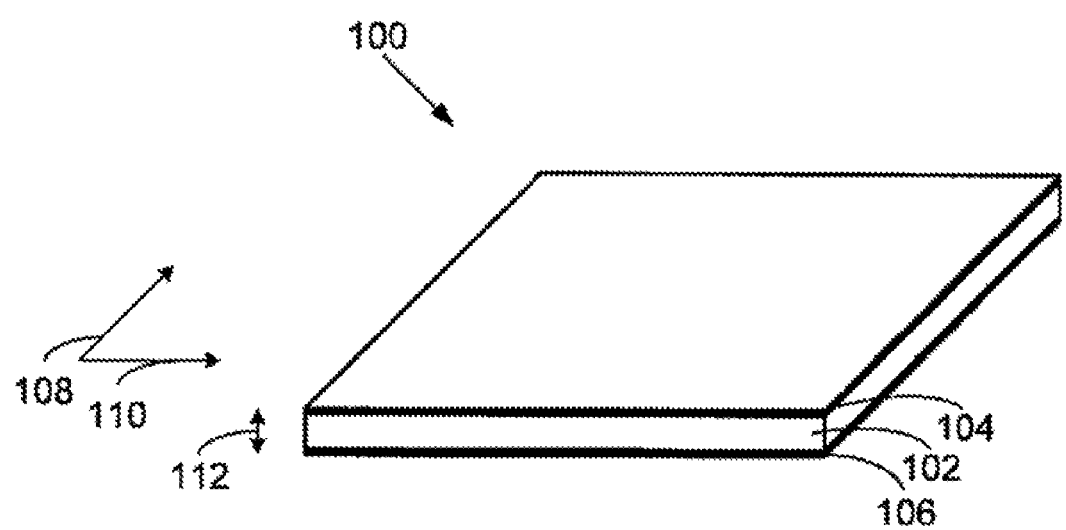

Before describing electroactive polymer (EPAM) flow control devices of the present invention, the basic principles of electroactive polymer construction and operation will first be illuminated in regards to FIG. 1A and FIG. 1B. Embodiments of flow control devices and systems of the present invention are described with respect to FIGS. 2A-2M and 3A-3M in the following section. The transformation between electrical and mechanical energy in devices of the present invention is based on energy conversion of one or more active areas of an electroactive polymer. Electroactive polymers are capable of converting between mechanical energy and electrical energy. In some cases, an electroactive polymer may change electrical properties (for example, capacitance and resistance) with changing mechanical strain.

To help illustrate the performance of an electroactive polymer in converting between electrical energy and mechanical energy, FIG. 1A illustrates a top perspective view of a transducer portion 10 in accordance with one embodiment of the present invention. The transducer portion 10 comprises a portion of an electroactive polymer 12 for converting between electrical energy and mechanical energy. In one embodiment, an electroactive polymer refers to a polymer that acts as an insulating dielectric between two electrodes and may deflect upon application of a voltage difference between the two electrodes (a 'dielectric elastomer'). Top and bottom electrodes 14 and 16 are attached to the electroactive polymer 12 on its top and bottom surfaces, respectively, to provide a voltage difference across polymer 12, or to receive electrical energy from the polymer 12. Polymer 12 may deflect with a change in electric field provided by the top and bottom electrodes 14 and 16. Deflection of the transducer portion 10 in response to a change in electric field provided by the electrodes 14 and 16 is referred to as 'actuation'. Actuation typically involves the conversion of electrical energy to mechanical energy. As polymer 12 changes in size, the deflection may be used to produce mechanical work.

Without wishing to be bound by any particular theory, in some embodiments, the polymer 12 may be considered to behave in an electrostrictive manner. The term electrostrictive is used here in a generic sense to describe the stress and strain response of a material to the square of an electric field. The term is often reserved to refer to the strain response of a material in an electric field that arises from field induced intra-molecular forces but we are using the term more generally to refer to other mechanisms that may result in a response to the square of the field. Electrostriction is distinguished from piezoelectric behavior in that the response is proportional to the square of the electric field, rather than proportional to the field. The electrostriction of a polymer with compliant electrodes may result from electrostatic forces generated between free charges on the electrodes (sometimes referred to as "Maxwell stress") and is proportional to the square of the electric field. The actual strain response in this case may be quite complicated depending on the internal and external forces on the polymer, but the electrostatic pressure and stresses are proportional to the square of the field.

FIG. 1B illustrates a top perspective view of the transducer portion 10 including deflection. In general, deflection refers to any displacement, expansion, contraction, torsion, linear or area strain, or any other deformation of a portion of the polymer 12. For actuation, a change in electric field corresponding to the voltage difference applied to or by the electrodes 14 and 16 produces mechanical pressure within polymer 12. In this case, the unlike electrical charges produced by electrodes 14 and 16 attract each other and provide a compressive force between electrodes 14 and 16 and an expansion force on polymer 12 in planar directions 18 and 20, causing polymer 12 to compress between electrodes 14 and 16 and stretch in the planar directions 18 and 20.

Electrodes 14 and 16 are compliant and change shape with polymer 12. The configuration of polymer 12 and electrodes 14 and 16 provides for increasing polymer 12 response with deflection. More specifically, as the transducer portion 10 deflects, compression of polymer 12 brings the opposite charges of electrodes 14 and 16 closer and the stretching of polymer 12 separates similar charges in each electrode. In one embodiment, one of the electrodes 14 and 16 is ground. For actuation, the transducer portion 10 generally continues to deflect until mechanical forces balance the electrostatic forces driving the deflection. The mechanical forces include elastic restoring forces of the polymer 12 material, the compliance of electrodes 14 and 16, and any external resistance provided by a device and/or load coupled to the transducer portion 10, etc. The deflection of the transducer portion 10 as a result of an applied voltage may also depend on a number of other factors such as the polymer 12 dielectric constant and the size of polymer 12.

Electroactive polymers in accordance with the present invention are capable of deflection in any direction. After application of a voltage between the electrodes 14 and 16, the electroactive polymer 12 increases in size in both planar directions 18 and 20. In some cases, the electroactive polymer 12 is incompressible, e.g. has a substantially constant volume under stress. In this case, the polymer 12 decreases in thickness as a result of the expansion in the planar directions 18 and 20. It should be noted that the present invention is not limited to incompressible polymers and deflection of the polymer 12 may not conform to such a simple relationship.

Application of a relatively large voltage difference between electrodes 14 and 16 on the transducer portion 10 shown in FIG. 1A will cause transducer portion 10 to change to a thinner, larger area shape as shown in FIG. 1B. In this manner, the transducer portion 10 converts electrical energy to mechanical energy. The transducer portion 10 may also be used to convert mechanical energy to electrical energy.

For actuation, the transducer portion 10 generally continues to deflect until mechanical forces balance the electrostatic forces driving the deflection. The mechanical forces include elastic restoring forces of the polymer 12 material, the compliance of electrodes 14 and 16, and any external resistance provided by a device and/or load coupled to the transducer portion 10, etc. The deflection of the transducer portion 10 as a result of an applied voltage may also depend on a number of other factors such as the polymer 12 dielectric constant and the size of polymer 12.

In one embodiment, electroactive polymer 12 is pre-strained. Pre-strain of a polymer may be described, in one or more directions, as the change in dimension in a direction after pre-straining relative to the dimension in that direction before pre-straining. The pre-strain may comprise elastic deformation of polymer 12 and be formed, for example, by stretching the polymer in tension and fixing one or more of the edges while stretched. Alternatively, as will be described in greater detail below, a mechanism such as a spring may be coupled to different portions of an electroactive polymer and provide a force that strains a portion of the polymer. For many polymers, pre-strain improves conversion between electrical and mechanical energy. The improved mechanical response enables greater mechanical work for an electroactive polymer, e.g., larger deflections and actuation pressures. In one embodiment, prestrain improves the dielectric strength of the polymer. In another embodiment, the prestrain is elastic. After actuation, an elastically pre-strained polymer could, in principle, be unfixed and return to its original state.

In one embodiment, pre-strain is applied uniformly over a portion of polymer 12 to produce an isotropic pre-strained polymer. By way of example, an acrylic elastomeric polymer may be stretched by 200 to 400 percent in both planar directions. In another embodiment, pre-strain is applied unequally in different directions for a portion of polymer 12 to produce an anisotropic pre-strained polymer. In this case, polymer 12 may deflect greater in one direction than another when actuated. While not wishing to be bound by theory, it is believed that pre-straining a polymer in one direction may increase the stiffness of the polymer in the pre-strain direction. Correspondingly, the polymer is relatively stiffer in the high pre-strain direction and more compliant in the low pre-strain direction and, upon actuation, more deflection occurs in the low pre-strain direction. in one embodiment, the deflection in direction 18 of transducer portion 10 can be enhanced by exploiting large pre-strain in the perpendicular direction 20. For example, an acrylic elastomeric polymer used as the transducer portion 10 may be stretched by 10 percent in direction 18 and by 500 percent in the perpendicular direction 20. The quantity of pre-strain for a polymer may be based on the polymer material and the desired performance of the polymer in an application. Pre-strain suitable for use with the present invention is further described in commonly owned, U.S. Pat. No. 6,812,624, which is incorporated by reference for all purposes.

Generally, after the polymer is pre-strained, it may be fixed to one or more objects or mechanisms. For a rigid object, the object is preferably suitably stiff to maintain the level of pre-strain desired in the polymer. A spring or other suitable mechanism that provides a force to strain the polymer may add to any prestrain previously established in the polymer before attachment to the spring or mechanisms, or may be responsible for all the prestrain in the polymer. The polymer may be fixed to the one or more objects or mechanisms according to any conventional method known in the art such as a chemical adhesive, an adhesive layer or material, mechanical attachment, etc.

Transducers and pre-strained polymers of the present invention are not limited to any particular rolled geometry or type of deflection. For example, the polymer and electrodes may be formed into any geometry or shape including tubes and multi-layer rolls, rolled polymers attached between multiple rigid structures, rolled polymers attached across a frame of any geometry—including curved or complex geometries, across a frame having one or more joints, etc. Similar structures may be used with polymers in flat sheets. Deflection of a transducer according to the present invention includes linear expansion and compression in one or more directions, bending, axial deflection when the polymer is rolled, deflection out of a hole provided on an outer cylindrical around the polymer, etc. Deflection of a transducer may be affected by how the polymer is constrained by a frame or rigid structures attached to the polymer.

Materials suitable for use as an electroactive polymer with the present invention may include any substantially insulating polymer or rubber (or combination thereof) that deforms in response to an electrostatic force or whose deformation results in a change in electric field. One suitable material is NuSil CF19-2186 as provided by NuSil Technology of Carpenteria, Calif. Other exemplary materials suitable for use as a pre-strained polymer include silicone elastomers, acrylic elastomers such as VHB 4910 acrylic elastomer as produced by 3M Corporation of St. Paul, Minn., polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example. Combinations of some of these materials may also be used as the electroactive polymer in transducers of this invention.

Materials used as an electroactive polymer may be selected based on one or more material properties such as a high electrical breakdown strength, a low modulus of elasticity—(for large or small deformations), a high dielectric constant, etc. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12.

An electroactive polymer layer in transducers of the present invention may have a wide range of thicknesses. In one embodiment, polymer thickness may range between about 1 micrometer and 2 millimeters. Polymer thickness may be reduced by stretching the film in one or both planar directions. In many cases, electroactive polymers of the present invention may be fabricated and implemented as thin films. Thicknesses suitable for these thin films may be below 50 micrometers.

As electroactive polymers of the present invention may deflect at high strains, electrodes attached to the polymers should also deflect without compromising mechanical or electrical performance. Generally, electrodes suitable for use with the present invention may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present invention may include compliant electrodes that conform to the shape of an electroactive polymer to which they are attached. The electrodes may be only applied to a portion of an electroactive polymer and define an active area according to their geometry. Several examples of electrodes that only cover a portion of an electroactive polymer will be described in further detail below.

Various types of electrodes suitable for use with the present invention are described in commonly owned, U.S. Pat. No. 6,812,624, which was previously incorporated by reference above. Electrodes described therein and suitable for use with the present invention include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present invention may vary. Suitable materials used in an electrode may include graphite, carbon black, colloidal suspensions, thin metals including silver and gold, silver filled and carbon filled gels and polymers, and ionically or electronically conductive polymers. In a specific embodiment, an electrode suitable for use with the present invention comprises 80 percent carbon grease and 20 percent carbon black in a silicone rubber binder such as Stockwell RTV60-CON as produced by Stockwell Rubber Co. Inc. of Philadelphia, Pa. The carbon grease is of the type such as NyoGel 756G as provided by Nye Lubricant Inc. of Fairhaven, Mass. The conductive grease may also be mixed with an elastomer, such as silicon elastomer RTV 118 as produced by General Electric of Waterford, N.Y., to provide a gel-like conductive grease.

It is understood that certain electrode materials may work well with particular polymers and may not work as well for others. By way of example, carbon fibrils work well with acrylic elastomer polymers while not as well with silicone polymers. For most transducers, desirable properties for the compliant electrode may include one or more of the following: low modulus of elasticity, low mechanical damping, low surface resistivity, uniform resistivity, chemical and environmental stability, chemical compatibility with the electroactive polymer, good adherence to the electroactive polymer, and the ability to form smooth surfaces. In some cases, a transducer of the present invention may implement two different types of electrodes, e.g. a different electrode type for each active area or different electrode types on opposing sides of a polymer.

2. EPAM Flow Control Devices

In the present, EPAM flow control devices may be used to alter one or more characteristics of an internal flow, such as the flow of a fluid as it moves through a conduit or an external flow, such as the flow over an airplane wing. An EPAM flow control device, refers to a device that regulates, affects or controls fluidic communication of gases, liquids and/or loose particles through or around one or more structures and includes one or more EPAM transducers. The characteristics of the flow may be altered by changing the properties of one or more surfaces in contact with the fluid via operation of the one or more EPAM transducers. Some characteristics of a fluid that may be altered include but are not limited to 1) a flow rate, 2) a flow direction, 3) a flow vorticity, 4) a flow momentum or velocity, 5) a flow mixing rate, 6) a flow turbulence rate, 7) a flow energy and 8) a flow thermodynamic property. Typically, the EPAM flow control devices described in the present invention do not provide a driving force, such as a pressure gradient, that moves the bulk fluid between locations. However, the present invention is not so limited and may also be used to provide a driving force to the fluid.

The fluids of the present invention may include materials in states of a liquid, a gas, a plasma, a phase change, a solid or combinations thereof. The fluid may behave as a non-Newtonian fluid or a Newtonian fluid. Further, the fluid may be homogenous or heterogeneous. Also, the fluid may be incompressible or compressible. Examples of fluids in the present invention include but are not limited to 1) mixtures, 2) slurries, 3) suspensions and 4) flows of two or more immiscible liquids.

FIGS. 2A-2F illustrate EPAM flow control devices where the EPAM comprise a portion of the bounding surface of surface of a fluid conduit used in an internal flow system. The fluid conduit separates the fluid in the conduit from an external environment. Although not shown, when the EPAM flow control devices may be used in an external flow where the EPAM comprises a bounding surface of a structure in the external flow.

Figure 2A:
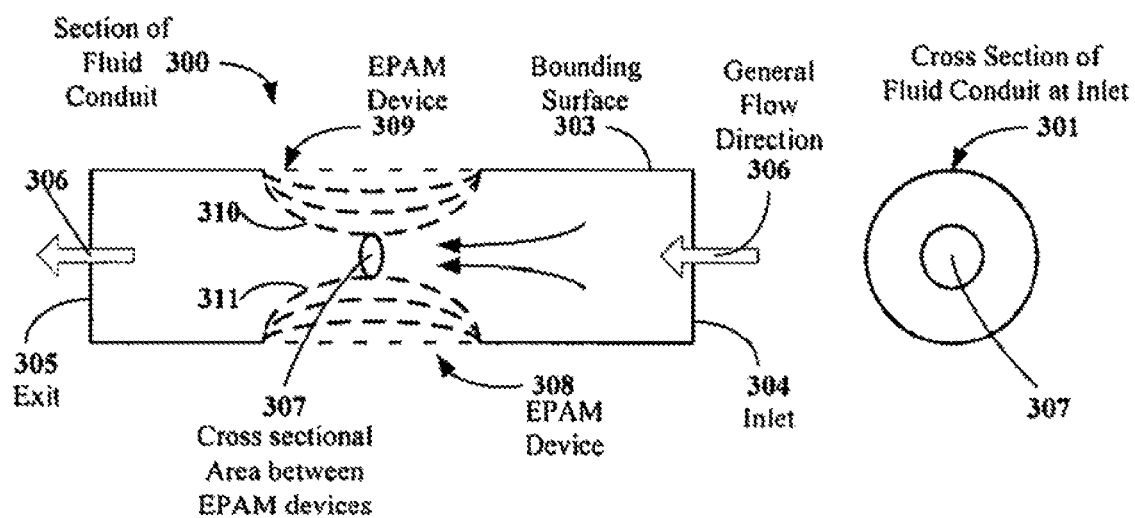
FIGS. 2A-2F illustrate Electroactive Polymer (EPAM) flow control devices where the EPAM devices comprise a portion of the bounding surface of surface of a fluid conduit.

In FIG. 2A, a section of a fluid conduit 300 is shown. The fluid conduit 300 includes an inlet 304 and an exit 305. A general direction of a flow of a fluid inside the conduit is indicate by the arrows 306. The fluid conduit 300 may be a component in a larger fluid system. The fluid conduit is comprised of a bounding surface 303 that separates fluid flowing in the conduit 300 from an external environment. A cross section 301 of the fluid conduit at the inlet is circular. However, in general, the cross section does not have to be circular and may be a polygon or other general shape with sides of varying length. In addition, the cross sectional shape may vary as a function of position in the fluid conduit 300. Further, the bounding surface 303 does not necessarily have to be closed. For instance, a trough may be used as a fluid conduit wherein portions of the conduit are open to an external environment.

One or more portions of the bounding surface 303 may be configured with EPAM devices. Portions of the EPAM devices serve as part of the bounding surface 303 of the fluid conduit 300. In one embodiment, the entire bounding surface 303 may comprise an EPAM material. In another embodiment, EPAM material is integrated with one or more other materials to form the bounding surface 303. The EPAM material may include one or more layers or surface coatings depending on a compatibility of the EPAM material with the fluid flowing in the conduit or a compatibility of the EPAM material with the external environment. The fluid conduit 300 may include interfaces that allow it to attach to other fluid conduits or components in a fluid system in which it is applied. The EPAM devices of the present invention may be applied in fluid applications that vary in size from microscales, such as moving fluid on a silicon chip, to macroscales, such as moving fluid in a large chemical plant.

Portions of the EPAM materials forming the bounding surface 303 may be configured with electrodes to allow the portions of the EPAM material to act as an EPAM transducer. In response to an electric field applied to the EPAM material, such as a polymer, the EPAM material may be deflected. Each EPAM transducer device may be independently controlled in its deflection. Thus, the bounding surface 303 may change shape as a function of time to alter one or more of the characteristics flow in the fluid conduit 300.

In the Figure, two EPAM flow control devices, 308 and 309 are shown. The EPAM flow control devices include one or more EPAM transducers. Various deflection positions denoted by the dashed lines, such as 310 and 311, of the EPAM flow control devices are shown. At rest, the active EPAM areas may be nearly tangential with the surrounding surfaces. When a voltage is applied, the EPAM areas expand inward. The inward expansion (as opposed to outward expansion when voltage is applied to EPAM) may be assured by having the outer pressure higher than the internal pressure. Alternately, one may use springs, foam, laminates of other polymers, or other techniques known in the prior art for biasing the EPAM to expand inward when a voltage is applied. For instance, when the flow control devices 308 and 309 are at rest a cross sectional area 307 of the conduit between the EPAM flow control devices may be the same as the cross sectional area 301 of the inlet. Alternately, one may design an EPAM annulus that is normally contracted, and when voltage is applied it expands outward to allow an increased flow. The outward expansion would be assured in this case if the internal flow pressure is higher than the pressure of the outer environment, a common situation for pumped flows.

As the devices 308 and 309 deflect, for instance from an initial position to positions 310 and 311, a circular cross-sectional area 307 between the EPAM flow control devices may decrease. The cross section 307 does not have to remain circular and may be of any shape depending on the configuration of the EPAM flow control devices on the bounding surface 303. After deflection of the devices 308 and 309 and depending on the driving force in the flow, the constriction of the conduit 300 between the EPAM flow control devices 308 may reduce the flow rate in the conduit at the exit. For instance, the flow may become choked at 307. The driving force for the flow may also be reduced in conjunction with the constriction to control the flow rate in the conduit. In some embodiments, the devices, 308 and 309, may sufficiently contract together to stop the flow in the conduction 300.

In another embodiment, the EPAM flow control devices, 308 and 309, may deflect one at a time at some defined interval. The alternate deflections of the EPAM devices may direct the flow near the deflected surface upward like a ramp into the main stream to promote mixing in the fluid in the conduit 300 if mixing is desirable. As another example, vibrations of the EPAM flow control devices, 308 and 309, at particular frequencies may be used to increase the amount of turbulence in the flow if turbulence is desirable. Increased turbulence may change the velocity profile in the fluid conduit and provide turbulent mixing.

In yet another embodiment, one or more EPAM flow control devices, such as 308 or 309, on the bounding surface 303 may act as a heat exchanger to add or remove energy from the flow in the conduit 300. For instance, when it desired to cool the flow in the conduit 300 and the outer environment surrounding the conduit 300 is cooler than flow in the conduit, the EPAM flow control devices may include a heat exchanger allowing energy to be removed from the fluid in the fluid conduit 300. Adding or removing energy from the flow can change the thermodynamic properties of the fluid flow, such as the pressure and temperature. As an example, the deflections of the EPAM flow control devices, 308 and 309, may circulate fluid in a second closed fluid system used in conjunction with the fluid conduit to add or remove energy from the fluid conduit 300. Some examples of heat exchangers that may be used with the present invention are described in commonly owned U.S. Pat. No. 6,628,040, by Pelrine, et al., and entitled "Electroactive Polymer Thermal Generators," which is incorporated herein in its entirety and for all purposes.

Figure 2B:
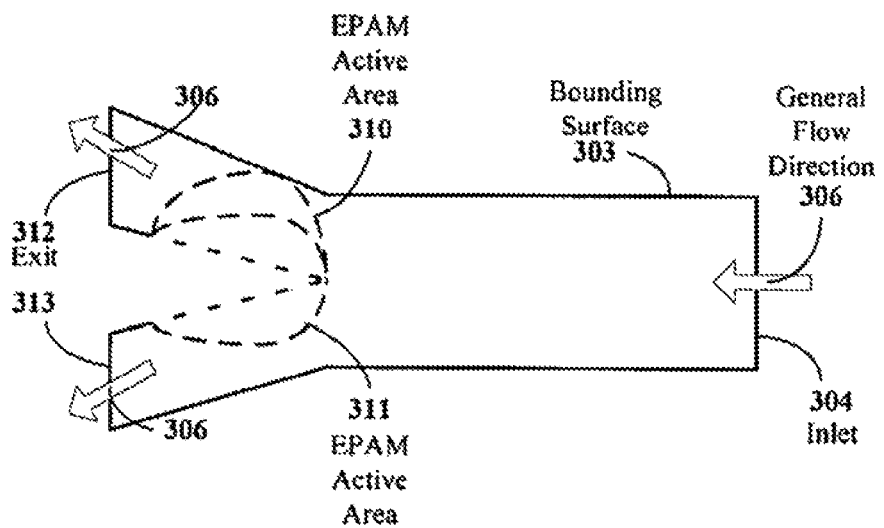

In FIG. 2B, a fluid conduit with one inlet 304 and two exits 312 and 313 are shown. The fluid conduit is shaped like a "Y." At the point in the conduit where it splits from a single channel to two channels, two EPAM active areas, 310 and 311, are shown. The EPAM areas, 310 and 311, are part of the bounding surface 303 of the fluid conduit. Deflections of the EPAM active areas, 310 and 311, are denoted by the dashed line. The deflections of the EPAM active areas, 310 and 311, may be used to 1) control the flow rate in each of the two channels, 2) divert the flow in the conduit from one of the section to the other section or 3) block both channels. The flow diversion from one channel to other may be performed by deflecting either active area, 310 or 311, to block one of the channels. The other channel may remain open with its EPAM active area undeflected or partially deflected to allow the flow in conduit to travel through the open conduit. The partially deflected EPAM active area may be used to control the flow rate in the unblocked channel.

Figure 2C:
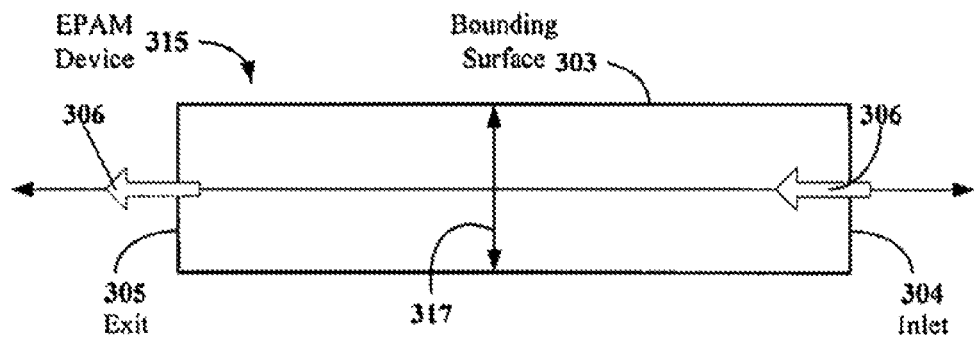
Figure 2D:
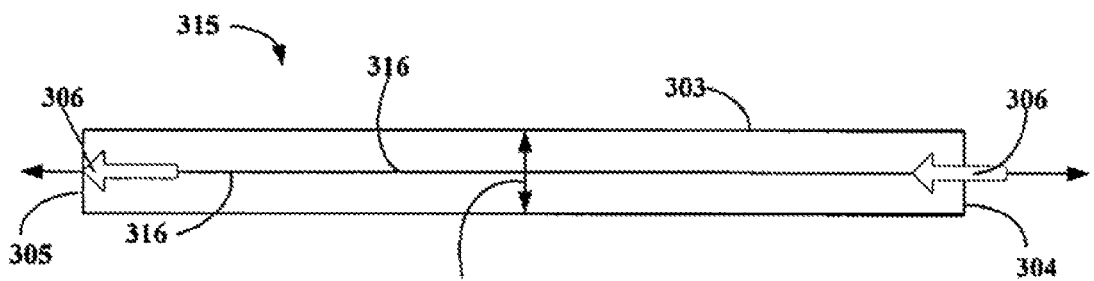

FIGS. 2C-2F show a hollow EPAM flow control device 315 used as a bounding surface 303 of a fluid conduit. In FIGS. 2C and 2D, the EPAM flow control device 315 has a diameter 317, an inlet 304, an exit 305 and a fluid moving in a flow direction 306 from the inlet 304 to the exit 305. In one embodiment, the EPAM flow control device 315 may be deflected to lengthen and decrease the diameter of the fluid conduit. In FIG. 2D, the EPAM flow control device 315 lengthens in a straight line along the axis 316. The lengthening of the fluid conduit may change characteristics of the conduit, such as viscous dissipative forces like frictional forces that depend on the length of the conduit, the flow rate in the conduit that depends on the cross-sectional area, and acoustic and vibration properties of the conduit that may depend on the length of the pipe.

In regards to the acoustic properties of the EPAM flow control device 315, a fluid conduit of a particular length may accommodate pressure waves of particular frequencies. For instance, a sound generated by a pipe in a pipe organ is proportional to the length of the pipe. By increasing or decreasing the length of the conduit by deflecting the EPAM material in the EPAM flow control device 315, acoustically properties of a flow traveling through the fluid conduit may be altered. For instance, an EPAM flow control device 315 may be used in an automotive context such as in tail pipe used to channel exhaust gasses from an engine. By changing a actively the length of tail pipe using the EPAM flow control device, the acoustic properties of the EPAM tail pipe may be altered. In one embodiment, the EPAM tail pipe may be lengthened or shortened according to the pressure of the exhaust gases being emitted from the engine, which may vary depending on the operating conditions of the engine.

In some embodiments, the EPAM flow control devices of the present invention, such as 315, may include one or more sensors that are used to measure flow conditions in the conduit, such as but not limited to flow rate sensors to measure the flow rate in the conduit, temperature sensors to measure the temperature of the flow, concentration sensors to measure one or more constituents of the flow, pressure sensors to measure the total pressure of the flow or the partial pressures of one or more constituents in the flow, acoustic sensors to measure acoustic waves in the flow and vibrational sensors to measure vibrations in the fluid conduit. The output obtained from the sensors may be used in a control algorithm to control the operation of the EPAM flow control device (e.g., the deflection of the active areas of the EPAM flow device 315 as a function of time). The EPAM flow device 315 may include a logic device such as a microcontroller or a microprocessor for controlling operation of the device.

The flow sensors used to control the operation of the flow device 315 may be used to measure flow properties outside of the EPAM flow control device, such as upstream or downstream of the EPAM flow device 315 used in a fluid system. Further, the operation of the EPAM flow control device, such as its length as a function of time, may be influenced by sensor inputs unrelated to flow properties. For instance, the length of an EPAM tail pipe may be correlated to an RPM rate of an engine exhausting gasses through the tail pipe.

In particular embodiments, the EPAM flow control devices of the present invention, such as 315, may be designed to lengthen without significantly changing the diameter 317 or cross-sectional area for non-circular cross sections. In another embodiment, the diameter 317 of the EPAM flow control device 315 may be increased or decreased along its length without significantly changing the length of the flow device 315.

Lengthening without a diameter change may be performed using a spring roll as described in the Pei citation below (U.S. Pat. No. 6,891,317). A simple tube of EPAM without the spring and the circumferential prestrain may naturally lengthen and increase its diameter. To lengthen and simultaneously decrease diameter, one might have a free elastomer tube inside a spring roll actuator—when the spring roll lengthens, the inner elastomer tube will lengthen and contract in diameter—but the spring roll just lengthens. In yet another embodiment, a plurality of EPAM flow control devices, such as 315, may be linked together via an interface mechanism of some type, to generate a fluid conduit with a plurality of sections that may be independently lengthened or shortened. Further, the diameter of the each of the linked sections may be independently increased or decreased. A rolled EPAM transducer may be suitable to be used as these links. Details of the roll-type transducer, such as the spring roll, have been disclosed in commonly owned U.S. Pat. No. 6,891,317, by Pei et al. and entitled, "Rolled Electroactive Polymers," which is incorporated herein by reference in its entirety and for all purposes.

Figure 2E:
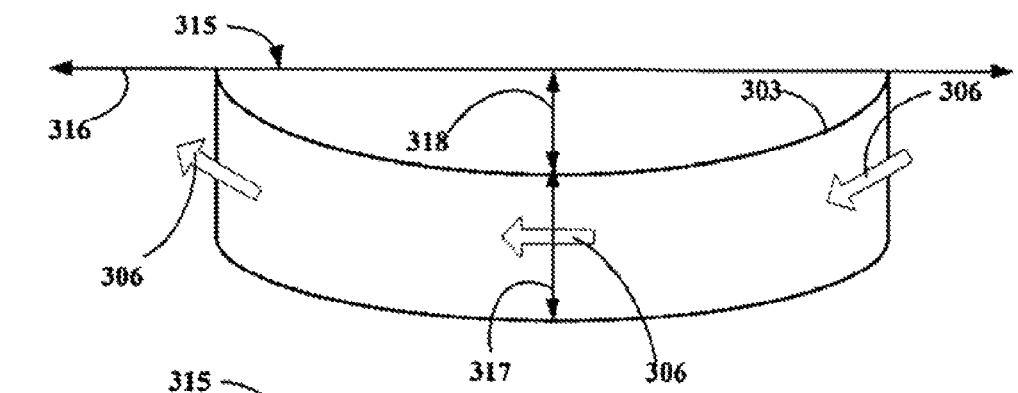
Figure 2F:
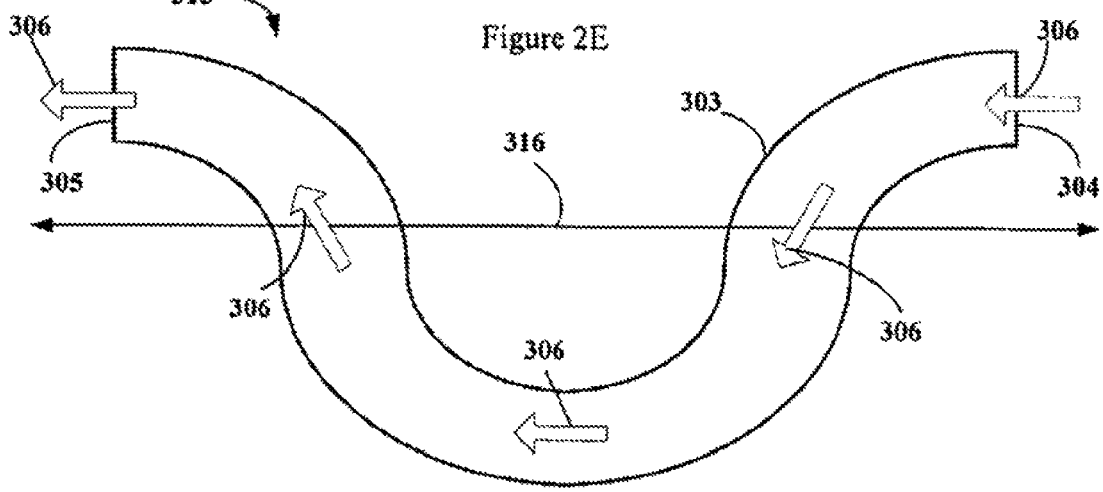

In yet other embodiments, the EPAM flow control device 315 is not limited to lengthening in a straight line, such as along its axis 316 in FIG. 2D. In FIGS. 2E-2F, the EPAM flow control device 315 may be lengthened by deflecting it above and below the axis 316. For instance, in FIG. 2E, the EPAM flow control device 315 is deflected downward by a distance 318 from the axis 316. When the ends of the EPAM flow control device 315 are fixed and the EPAM flow control device 315 is lengthened in deflection, the EPAM flow control device may deflect downwards or upwards. The deflection of the EPAM flow control device lengthens the fluid conduits, which may affect viscous dissipation forces and acoustic properties that are proportional to length. The deflection downwards or upwards may change the direction of flow, which may cause a loss of momentum within the flow as it turns. Dynamically deflecting the EPAM flow control device 315 upwards and downwards may provide mixing of the flow in the fluid conduit.

The shape of the EPAM fluid conduit may be complex. In FIG. 2F, a fluid conduit is shown with deflections above and below the axis 316. The flow direction 306 starts parallel to the axis at the inlet 304 moves downward below the axis and then turns upwards and finishes parallel to the axis at the exit 305. The shape of the conduit, its length and the cross sectional area of the EPAM flow control device may change dynamically as function of time. As previously described above, flow and other sensors and an active control algorithms using input from the flow sensors may be used to control the shape, length and cross sectional area of area of the EPAM flow control device 315 as a function of time.

In one embodiment, one or more surfaces in the fluid conduit may be ribbed or ridged in some manner. When the fluid conduit is lengthened or contracted, the one or more surfaces may be stretched or shrunk to change the rib or ridge height. The increase or decrease of the rib or ridge height by the stretching may change the relative smoothness or roughness of the surface. The change in smoothness or roughness may alter viscous properties of a boundary layer near the surface to increase or decrease the drag on the fluid as it flows over the surface.

FIGS. 2G-2N show examples EPAM flow control devices that may be inserted into a fluid conduit to alter one or more flow properties of the fluid. In these examples, the EPAM flow control devices are not primarily used as part of the bounding surface of the fluid conduit. FIG. 2G shows one example of EPAM valve 325 of the present invention. In FIGS. 3A-3M more examples of EPAM valves of the present invention are described.

The EPAM valve 325 may comprise a frame 326 supporting a stretched EPAM polymer 327. The EPAM polymer may be sufficiently pre-strained such that deflection of the polymer 327 results primarily in an in-plane movement toward the center of the circular frame 326 indicated by the arrows, which decreases the diameter of the circle at the center of the valve. In another embodiment, the polymer may be deflected both outwards and towards the center of the circle to increase or decrease the diameter of the circle at the center of the valve. The four electrodes 328 may control the deflection of the polymer 327. In one embodiment, the four electrodes 328 may be used to deflect four active portions of the polymer independently to provide non-circular shapes at the center of the valve with different areas.

A stop 330, which may be shaped as a sphere or a cylinder for instance, may be located in the center of the EPAM valve 325. The stop 330 may be supported by support members 329 connected to the polymer 327, frame 326 or both. The EPAM valve 325 may be designed to deflect the polymer 327 towards the center of the device and close around the stop 330.

In FIG. 2H, the EPAM valve 325 is shown inserted in a fluid conduit. The fluid conduit has an inlet 304 and an exit 305 with a flow direction 306 moving from the inlet to the exit. The frame of the EPAM valve may make up a small portion of the bounding surface 303 or the EPAM valve may be inserted within the bounding surface 303. In FIG. 2H, the valve is shown inserted perpendicular to the flow although the present invention is not limited to a valve orientated perpendicular to the flow.

By increasing or decreasing the area of the EPAM valve 325, the flow rate in the fluid conduit may be controlled. When closed around the stop 330, the flow rate may be reduced to zero. In some embodiments, the EPAM valve 325 may not include a stop 330 or support structure in its center. In this embodiment, the cross sectional area at the center of the valve may vary between a maximum and a minimum allowing a maximum and minimum flow rate to be specified. The amount of deflection of the polymer 327, which is a function of a strength of an electric field applied to the polymer, may be used to determine the cross sectional area of the valve and hence the flow rate through the valve.

FIG. 2I shows an array 343 four EPAM valves 325 in a square mounting plate 331. The four valves 325 may be independently controlled. In one embodiment, the mounting plate 331 may be used in a square duct to control flow rate in the duct. In another embodiment, the four valves 325 may be connected to four different feed lines to independently control flow in each of the lines such an embodiment is shown in FIG. 2J. The frame 326 and mounting plate 331 may be rigid or themselves flexible, and if many EPAM valves 325 are incorporated the effective porosity of the frame and mounting plate structure can be varied electronically using the EPAM elements.

In FIG. 2J, two feed lines, 332 and 333, are shown connected to the valves 325 in mounting plate 331. The valves are connected to two nozzles 334 and 335. The valves 325 may be used to control a flow rate in the nozzles 334 and 335 to produce an amount of spray from each nozzle or a size of a droplet from each nozzle. For instance, EPAM valves 325 may be used in an inkjet printer head to control droplet size in the head. In one embodiment, the nozzles, 335 and 336, may also be comprised of an EPAM polymer. A length of the nozzle and its cross sectional area may be altered by deflecting the EPAM polymer in the nozzles. Changing the length of the nozzle and its cross sectional area may be used to change the properties of the flow as it exits the nozzle, such as its velocity as it exits the nozzle or a resultant flow pattern. Further, by deflecting the polymer, a direction of the nozzle and hence the flow direction of the fluid exiting the nozzle may also be changed. Details of EPAM nozzles are described in more detail with respect to FIGS. 2O-2R.

The EPAM flow control devices of the present invention may be used for mixing and dispensing of a fluid. In FIG. 2K, an EPAM mixing device 341 is shown. The EPAM mixing device 341 comprises an EPAM diaphragm 342 connected to a support structure 339 to create a mixing chamber 340. Two feed lines 332 and 333 provide fluid inputs for the chamber 340 and an output line 337 provides an outlet to the chamber 340 for a mixture. EPAM valves 325 are used to control the input and output of fluid to and from the chamber 340.

In one embodiment, the EPAM valves to each of the feed lines, 332 and 333 may be opened to allow different fluids in each of the feed lines to enter the mixing chamber. The output feed line may be closed. A ratio of the fluids in each feed line may be varied by changing a valve diameter to increase or decrease a flow rate in each feed line and/or by a length of time each valve 325 to the feed lines are open. In one embodiment, the EPAM diaphragm 342 may expand to help draw fluid into the mixing chamber 340. In another embodiment, the fluid in the feed lines is under pressure and enters the mixing chamber via this pressure. The present invention is not limited two feed lines and a plurality of lines may be connected to the mixing chamber 340. For instance, for a paint mixer, three feed lines, each providing one of the primary colors, may be used After the fluids from the feed lines are in the mixing chamber 341, the EPAM diaphragm may deflect up and down at varying frequencies to mix the fluid in the chamber. The deflection pattern applied to the diaphragm 342 may be quite complex. For instance, portions of the diaphragm may deflect at different rates to promote mixing. After a predetermined interval of mixing, the valve 325 to the output feed line 337 may open and the diaphragm may deflect to dispense the mixed fluid from the mixing chamber 341. In one embodiment, the mixing device 341 may include a purge fluid feed line and a purge fluid output line. The purge fluid may be used to clean out fluid residues remaining in the mixing chamber 340.

In one embodiment, the mixing device 341 may not include input feed lines. The mixing chamber may include a pre-mixed fluid that is simply dispensed from the device. For instance, antibiotics in an IV line. Using the device 341 as an IV dispenser, the fluid in the chamber may be dispensed in a controlled manner without having to rely on gravity to dispense the fluid from the chamber and eliminating the requirement of having to hold the IV bag in a raised position above a patient. In another embodiment, the mixing device may include a number of fluid constituents that remain un-mixed or tend to separate. As an example, the mixing chamber 341 may include a number of fluid and solid constituents that are sealed in packets, such as medicine. When the mixing device 341 is activated, the sealed packets are broken and are mixed together in the mixing chamber. The mixture is then dispensed via the output line 337.

Figure 2L:
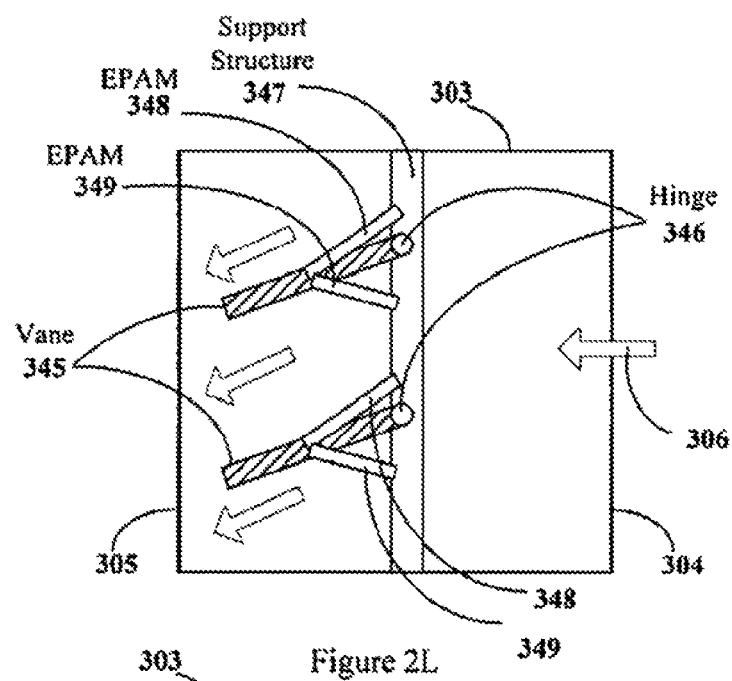
FIGS. 2L and 2M illustrate an EPAM flow control device used to control a direction of a fluid traveling through a conduit.
Figure 2M:
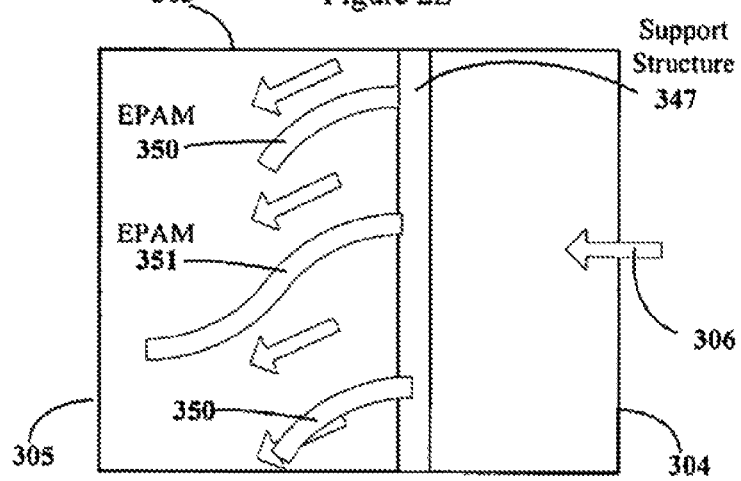

In FIGS. 2L and 2M, EPAM flow control devices used to change the direction of a fluid in a flow are shown. In FIG. 2L, EPAM devices, 348 and 349 are attached to vanes 345 mounted to a support structure 347 in a fluid conduit. When one of the pair of EPAM devices, 348 or 349 lengthens, the other EPAM device contracts. The vanes 345 are deflected upwards or downwards by the lengthening of one of the EPAM devices. The position of the vanes 345 in the fluid flow may be used to change the direction of the fluid flowing over the vanes. The EPAM devices, 348 and 349, and hence the direction of each of the vanes 345, may be controlled independently. EPAM devices that bend in one or two planes where the bending is independently controlled in each plane are referred as unimorph and bimorph EPAM transducers. However, the present invention is not limited to unimorph and bimorph EPAM transducers.

In 2L, EPAM devices, 350 are 351, are connected to a support structure 347 and inserted into a fluid. The EPAM devices, 350 and 351, may be relatively flat and comprised of one or more EPAM polymer layers. The EPAM polymers in the EPAM devices may be designed to deform (e.g., bend, twist and lengthen) in one or more directions in response to an applied electric field. The shape of the deflected EPAM devices and their orientation relative to the flow may be used to alter the flow direction. For instance, as shown in the FIG. 2M, the EPAM devices, 350 and 351, may each deflect downwards to turn the flow in the conduit downwards. In another embodiment, the EPAM devices, 350 and 351, may deflect in opposite directions at some frequency to promote mixing and/or turbulence in the flow. In yet another embodiment, the EPAM devices, 350 and 351, may deflect at some determined frequency to quiet and dampen oscillations in the flow.

Figure 2N:
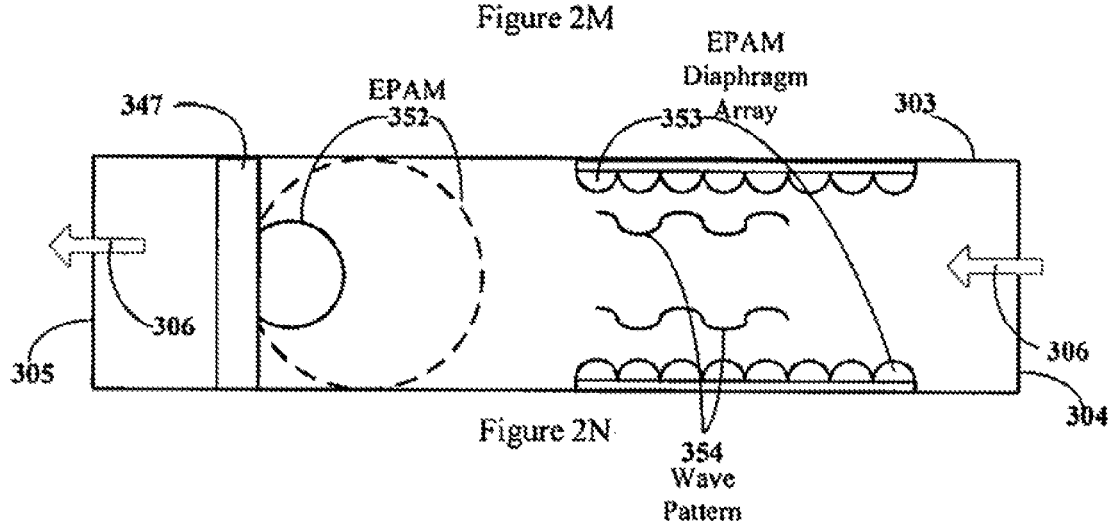
FIG. 2N illustrates an EPAM flow control devices used to change a surface roughness of a fluid conduit, impress wave patterns in a flow in a fluid conduit or block a fluid conduit.

In FIG. 2N, a diaphragm array 353 for use as an EPAM flow control device is arranged around one or more portions or an entire circumference of a fluid conduit. By deflecting the diaphragms in the diaphragm array 353 in different patterns and with different frequencies, different wave patterns may be introduced into the flow field. For instance, when the diaphragms are deflected parallel to the flow, transverse wave patterns, such as 354, may be added to the flow. As another example, when the diaphragms 353 are deflected in a pattern in a plane perpendicular to the direction of the flow 306, such as around a circumference of a circular duct, vorticity in the fluid may be increased. By deflecting one diaphragm and letting it return and then repeating with an adjacent diaphragm and so on around the circumference of the conduit, angular momentum may be introduced into the flow.

The diaphragms may vary in height. At microscopic scales, an array of diaphragms may be used to alter surface roughness of a fluid conduit or a structure in an external flow. The properties of a flow boundary layer near a surface may be altered by changing the surface roughness via deflections in a diaphragm array, such as 353. At larger scales, properties of an inviscid flow layer over a surface may be alter by deflecting diaphragms to a height that is a significant fraction of the boundary layer height or greater than the boundary layer height at the location of each diaphragm.

In the present invention, a deflected height of the diaphragms may be greater than a height of a hemisphere. As an example, another device, an EPAM balloon valve 352 is shown in FIG. 2N. The EPAM balloon valve is attached to a support structure 347. The balloon valve may be deflected so that it expands to block the fluid conduit. The expanded shape of the EPAM balloon valve 352 is nearly spherical and is indicated by the dashed lines.

Figure 2O:
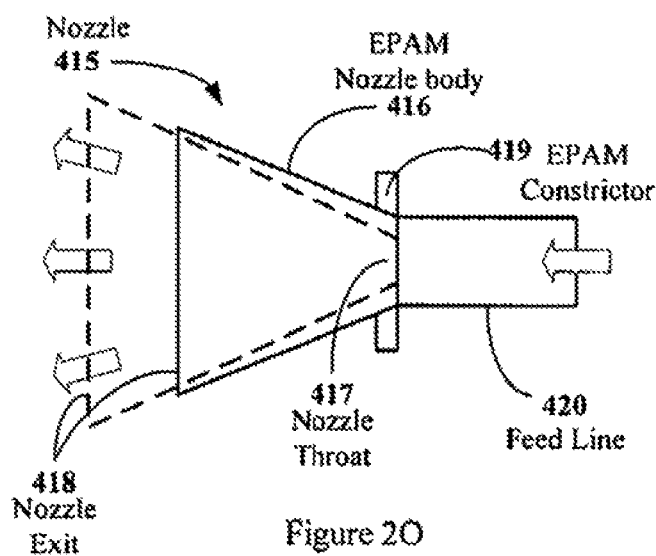
FIGS. 2O-2R illustrate an EPAM flow control devices used in a nozzle application.

FIGS. 2O-2R show example of a nozzle 415 with an EPAM nozzle body and a variable throat area controlled by an EPAM constrictor 419. Flow enters the nozzle throat 417 via a feed line 420. The flow expands in the EPAM nozzle body 416 and exits the nozzle body 416 via a nozzle exit 418. The EPAM nozzle body 416 may be designed to extend to lengthen the nozzle body 416 by placing an electric field on an EPAM material comprising the nozzle body 416. The increased length of the nozzle body 416 may change an amount of expansion that occurs in the fluid as it travels in the nozzle body 416 to the exit 418. An increased expansion may reduce a velocity of the fluid as it exits the nozzle. In FIG. 2O, one example of a deflected nozzle body is indicated by the dashed lines and another is indicated by the solid lines.

The EPAM constrictor 419 may be used to vary a throat area of the nozzle 415 which may also change the expansion of the fluid in the nozzle. A change in throat area of the nozzle may change fluid velocity profile at the exit 418. In one embodiment, the EPAM valve 325 in FIG. 2G (without the stop) may be used as a constrictor 419 to vary the throat area of the nozzle. Other types of constrictors may also be used (see FIGS. 3K and 3L). For nozzles generating thrust, an optimum expansion for maximum thrust is related to the pressure at the nozzle exit. If the pressure at the nozzle exit varies, then the nozzle geometry may be varied using the EPAM nozzle body 416 and EPAM constrictor 419 to optimize the nozzle 415 to generate maximum thrust that corresponds to the pressure at the nozzle exit.

Figure 2P:
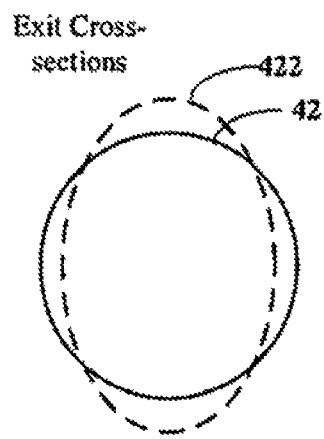

IN FIG. 2P, exit cross sections are shown for the two nozzle body geometries represented by the solid and dashed lines in FIG. 2O. The first embodiment at a first deflected position has a circular cross section 421. The second embodiment at a second deflected position has an ovular cross section. When the nozzle is lengthened, the cross sectional profile may remain circular or change shapes. Many cross section shapes are possible and are not limited to an ovular cross section.

Figure 2Q:
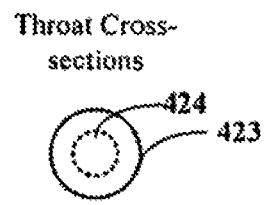

FIG. 2Q shows two cross sections, 423 and 424, for two deflected positions of the throat. The throat area 424 is smaller at the second deflected position than the throat area 423 at the first deflected position. The change in throat area is provided for illustrative purposes only. In some embodiments (see FIG. 2R), the EPAM nozzle body 416 may be deflected without a change in the throat area. The present invention is not limited to circular throat cross section. In some embodiments, the EPAM constrictor device may be unevenly constricted to produce non-circular cross section at the nozzle throat 417.

Figure 2R:
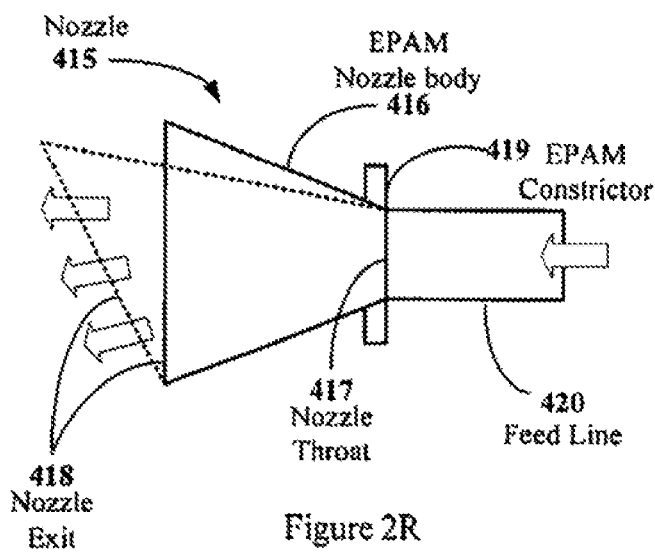

In FIG. 2R, an embodiment is shown where the EPAM nozzle body 416 is deflected to alter a direction of the flow as it exits the nozzle body. At its first deflection position (indicated by the solid lines), the flow exits the nozzle aligned in an axial direction through the center of the nozzle. At its second deflection position (indicated by the dashed lines), the EPAM nozzle body is turned downwards to direct the flow exiting the nozzle in a downward direction. To turn the nozzle body downward, a greater electric field may be applied to the EPAM polymer on top of the EPAM nozzle body versus on the bottom of the EPAM nozzle body. The additional electric field may cause the top of the nozzle body to lengthen more than the bottom of the nozzle body and hence turn the nozzle body downwards.

This capability may provide an additional degree of control for an EPAM nozzle that is not easily obtained with a conventional nozzle. A conventional nozzle would require an additional mechanism to deflect the nozzle. An EPAM nozzle only requires a compatible electrode pattern and charge control mechanism which are already components of an EPAM device.

Figure 3G:
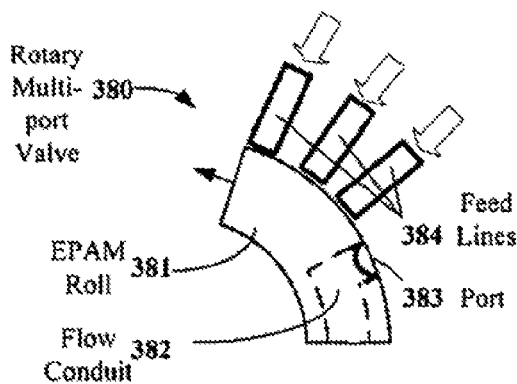

In FIGS. 3A-M a number of valve designs employing EPAM polymer elements are shown. Examples of valve designs shown in the figures include a diaphragm valve (FIG. 3A), a gate valve (FIGS. 3B and 3C), a needle valve (FIG. 3D), a slot valve (FIGS. 3F and 3G), rotary valves with multiple ports (FIGS. 3G-3J), a pinch valve (FIGS. 3K and 3M) and input/exhaust valves for a combustion chamber (FIG. 3M). The present invention is not limited to these types of valves as the EPAM polymers of the present invention may be applied to many other types of valve designs not shown.

As the term is used herein, a "valve" is one embodiment of a flow control device. A valve, as well as a flow control device, refers to a device that regulates, affects or controls fluidic communication of gases, liquids and/or loose particles through one or more structures. For example, a valve may control the flow of gases into a chamber, such as the combustion chamber of an internal combustion engine; or from a conduit, such as an air inlet port leading to the combustion chamber. One or more exhaust valves actuated by an EP transducer may also be disposed on the outlet of the chamber. Alternately, a valve may be disposed in a conduit (e.g., a pipe) to regulate pressure between opposite sides of the valve and thereby regulate pressure downstream from the valve.

Valves and flow control devices as described herein comprise one or more electroactive polymer (EPAM) transducers. In one embodiment, the EPAM transducer is used as to actuate the valve, or provide mechanical energy to regulate fluidic communication of gases, liquids and/or loose particles through the valve. Linear EPAM transducers are particularly well suited to provide on/off control of a valve as well as incremental and precise levels of control (proportional control). Given the fast response time of an EPAM transducer, valves of the present invention are thus well suited for applications requiring time sensitive fluidic regulation. In some cases, the EPAM transducer may not directly contact the fluid (e.g., see FIG. 3M). For example, a linear EPAM transducer may be coupled to a sealed fluid interface that acts upon the fluid, such as a gate within a conduit having one or more moving parts affected by actuation of the EPAM transducer (see FIGS. 3B and 3C). In this case, the EPAM transducer actuates the valve using the fluid interface. In other embodiments, the EPAM transducer may include a surface that contacts the fluid, such as a diaphragm EPAM transducer disposed in a conduit to regulate the flow of a fluid over a surface of the diaphragm (see FIG. 3A). Actuation of the diaphragm EPAM transducer may decrease the cross sectional area of the conduit to reduce a fluid flow rate, or close the conduit completely, to block fluid flow in the conduit.

In FIG. 3A, a diaphragm valve design is shown. A traditional diaphragm valve closes by using a flexible diaphragm attached to a compressor. The compressor may be used to press the diaphragm against a weir, which is a raised flat surface in a flow stream, or into a valve seat. When the diaphragm is pressed into the weir or the valve seat, a seal is formed and the flow is cut off.

In FIG. 3A, a design of a EPAM diaphragm valve 360 is shown. An EPAM diaphragm 360 is attached to a support structure 347. A bias mechanism 364, such as a spring, a foam cut-off or gas pressure, may be used to provide the diaphragm with an outward deflection. The support structure itself may be permeable to the flow, and if the pressure of the pumped fluid is higher on the valve side than on the exit side (common in pumped fluid applications where pressure is higher upstream than down stream), then the pressure differential of the pumped flow itself may serve as a bias mechanism. In a first deflected position (indicated by the solid line), a fluid may flow through the valve 360 and through the valve seat 363, which may include an orifice. An electric field may be applied to EPAM polymer in the diaphragm 363 to deflect the diaphragm to a second position in contact with the valve seat 363 and covering the orifice. In the second position, flow through the valve is blocked.

In another embodiment, the EPAM diaphragm 363 may be deflected to press against a weir in a fluid conduit. To improve sealing, the EPAM diaphragm may have additional layers of material on the side of the diaphragm in contact with the valve seat 363. An advantage of the valve 360 is that the functions of the compressor and diaphragm are combined. In a traditional diaphragm valve, a separate compressor element is typically required.

In FIGS. 3B and 3C, a gate valve 365 with EPAM actuators used to control a valve cover 366 (i.e., gate) are shown. In a gate valve, the flow may be controlled by a flat face, vertical disc or gate that slides down through the valve to block the flow. In FIG. 3B, the gate valve 365 is shown in an open position. Two EPAM actuators, 367 and 368, are shown attached to a valve cover 366. Alternately, 367 and 368 may be two sides (in cross section) of a single EPAM actuator such as a rolled EPAM actuator. The EPAM actuators are configured such that applying an electric field causes an EPAM polymer in the actuators to lengthen and push the valve cover 366 away from the valve seat 363. A force mechanism, such as a spring or a magnetic device, is configured to push the valve cover 366 towards the valve seating and against the valve seat 363. When the electric field to the EPAM actuators is reduced or turned off, a length of the EPAM polymers is shortened and the valve cover 366 closes over the valve seat to block the flow.

The valve 365 may be capable of being calibrated. In the calibration procedure, the electric field applied to EPAM polymers in the actuators 367 and 368 may be adjusted according to a force applied by the force mechanism 364 to ensure a proper closure of the valve 365 is obtained. The calibration process may be useful when the force applied by the force mechanism changes with time. For instance, a force applied by a spring may change with time after repeated stretching and contracting of the spring.

The diaphragm valve 360 and gate valve in 365 may also be used as control valves. A control valve is designed to ensure accurate proportioning control of fluid through the valve. The control valve may automatically vary the rate of flow through the valve based upon signals it receives from sensing devices in a continuous process. Most types of valves, using either linear or rotary motion, may be used as control valves by the addition of power actuators, positioners, sensors and other accessories. As an example, in FIG. 3A, to control the flow in valve 360, a flow rate sensor and/or a sensor for detecting the position of the diaphragm 364 may be used. The EPAM itself can be used as a sensor which is described below in the section titled sensing. The diaphragm may be deflected to different positions depending on the determined and desired flow rate through the valve.

In FIG. 3D, an example of a needle valve 370 is shown. Needle valves are volume control valves that are often used to restrict the flow of a fluid in a small line. The fluid 371 passes through an orifice that is a seat 363 for the valve cover 366. In an in-line valve, the fluid may be passed through a 90 degree turn that includes the needle valve. The valve cover 366 is typically conically shaped. By positioning the valve cover 366 relative to the seat 363, the size of the orifice may be changed.

In FIG. 3D, an EPAM actuator 372 is attached to a support structure 347. When an electric field is applied to the EPAM polymer in the actuator, the EPAM polymer lengthens and the valve cover is pushed towards the valve seat 363 to change the size of the orifice allowing fluid flow. Two forces mechanisms, which may be springs, apply a force in the opposite direction of the force transferred to the valve seat 363 by the EPAM polymer. When the electric field on the EPAM polymer is reduced, the force mechanisms may pull the valve cover 366 away from the seat 363.

In FIGS. 3E and 3F an example of a slot valve 375 is shown. The slot valve includes a channel that is designed to be aligned or unaligned with an input port and an output port. When the slot valve is aligned with the input port and the output port, fluid may move through the channel in a slot cover from the input port to the output port. When the slot valve is unaligned, the input port is blocked and the fluid flow through the slot is blocked.

In FIG. 3E, the slot valve is shown in the aligned position. An EPAM actuator 377 anchored to a support structure is actuated to push the slot cover 376 into alignment with the input and output ports. The slot cover 376 may reside in a slot, which guides its motion. The slot cover is attached to a force mechanism 364 that is attached to a support structure 347. The force mechanism 364 provides a force in the direction opposite to the force applied by the EPAM actuator 377 when it is actuated. When the electric field applied to the EPAM polymer in the actuator 377 is reduced or turned off, the force mechanism 364 pushes the slot cover into an unaligned position blocking the input port and the flow through the channel in the slot cover 376. The unaligned position of the slot valve 375 is shown in FIG. 3F.

In FIGS. 3G-3J, some examples of rotary valves are shown. The valves include multiple ports. Traditional examples of rotary valves include plug valves or ball valves. In these types of valves, a plug or ball with a channel is rotated to line up in a flow path or line up to block the flow path. Typically, a rotation in the valve, such as a 90 degree turn is required to align or unalign the channel with a flow path. Because of the required rotation to turn the valves on and off, these valves are referred to as rotary valves.

Figure 3H:
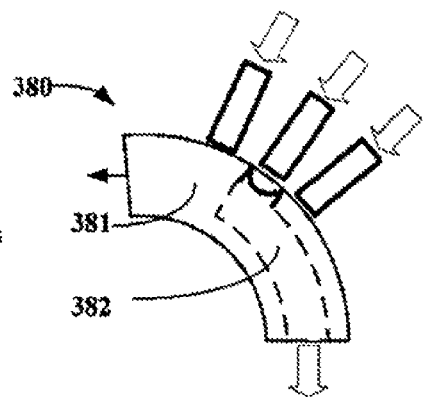
Figure 3I:
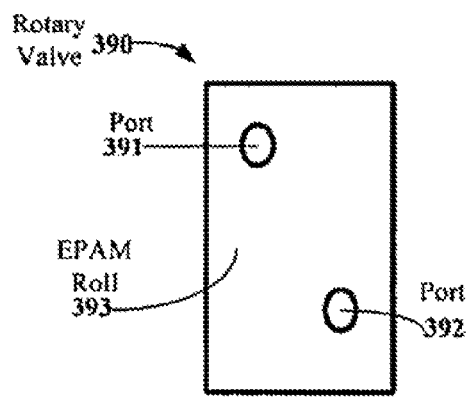

In FIGS. 3H and 3I, one embodiment of a rotary multi-port valve 380 is shown. The multi-port rotary valve comprises a partially hollow EPAM roll actuator 381 with a fluid conduit 382 that runs through the center. A port 383 through the side of the EPAM 381 connects to the fluid conduit 382. The port is designed to connect to one of a plurality of feed lines 384.

The EPAM roll 381 is designed to actuate along a curved path. The valve 380 may include guides that help to guide the EPAM roll along a set path as it actuates. In FIG. 3G, when the EPAM roll is not actuated to lengthen the roll, the port 383 does not align with any of the feed lines 384. For instance, the EPAM roll 381 may be deflected to expand in diameter and block the feed lines. Further, the side of the EPAM roll 381 may be used to block the feed lines 384. In other embodiment, the port 383 may include a mechanism that opens and mates with a valve on the feed line. In 3H, when the EPAM roll 381 is actuated to lengthen along a curved path, the port 383 rotates along the path to align with a middle of three feed lines. In this position, fluid may enter the conduit from the middle feed line and flow through the fluid conduit 382 in the center of the EPAM roll. In this deflected position, the opening to the other two feed lines may be blocked by the side of the EPAM roll or may be closed using another mechanism, such as a valve.

Figure 3J:
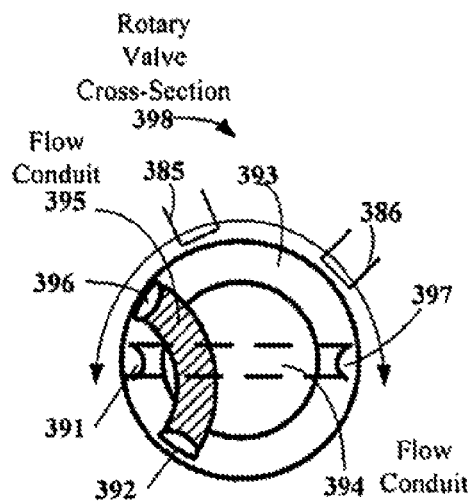

In FIGS. 3I and 3J, another embodiment of an EPAM multi-port valve 390 is shown. In this embodiment, two fluid conduits run through an EPAM roll 393. Two ports, 391 and 392, each respectively on a front end of the two fluid conduits, are designed for connection to two feed lines at a fixed position. A view of the multi-port rotary valve 390 from the side with the two ports, 391 and 392, is shown in FIG. 3I.

A cross-section of the EPAM roll 393 is show in FIG. 3J. The EPAM roll 393 is designed to rotate torsionally to align ports 396 and 397 opposite to ports 391 and 392 with two feed lines 385 and 386. When port 396 is aligned with port 385, a fluid may travel through a first fluid conduit in the EPAM roll 393 to port 392. Similarly, when port 397 is aligned with port 386, fluid may flow through a second conduit in the EPAM roll 383 to port 391. The first and the second fluid conduits are at different heights in the EPAM roll. The EPAM roll may be designed such that an upper portion of the roll rotates torsionally independently of a lower portion of the EPAM roll. Thus, ports 396 and 397 may be connected or disconnected from ports 385 and 386 independently.

Figure 3K:
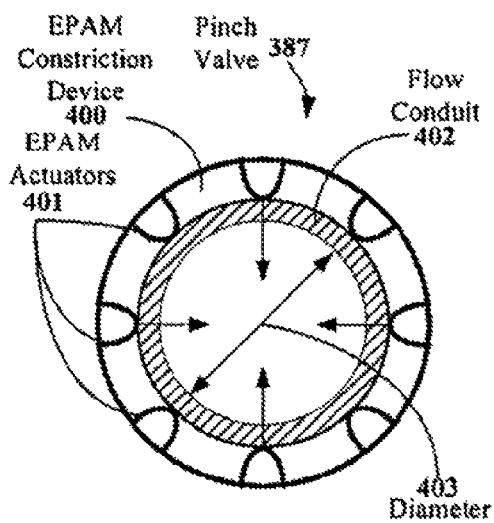
Figure 3L:
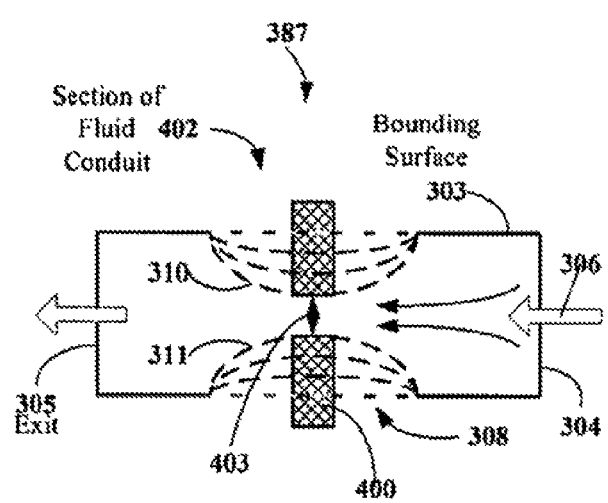
Figure 3M:
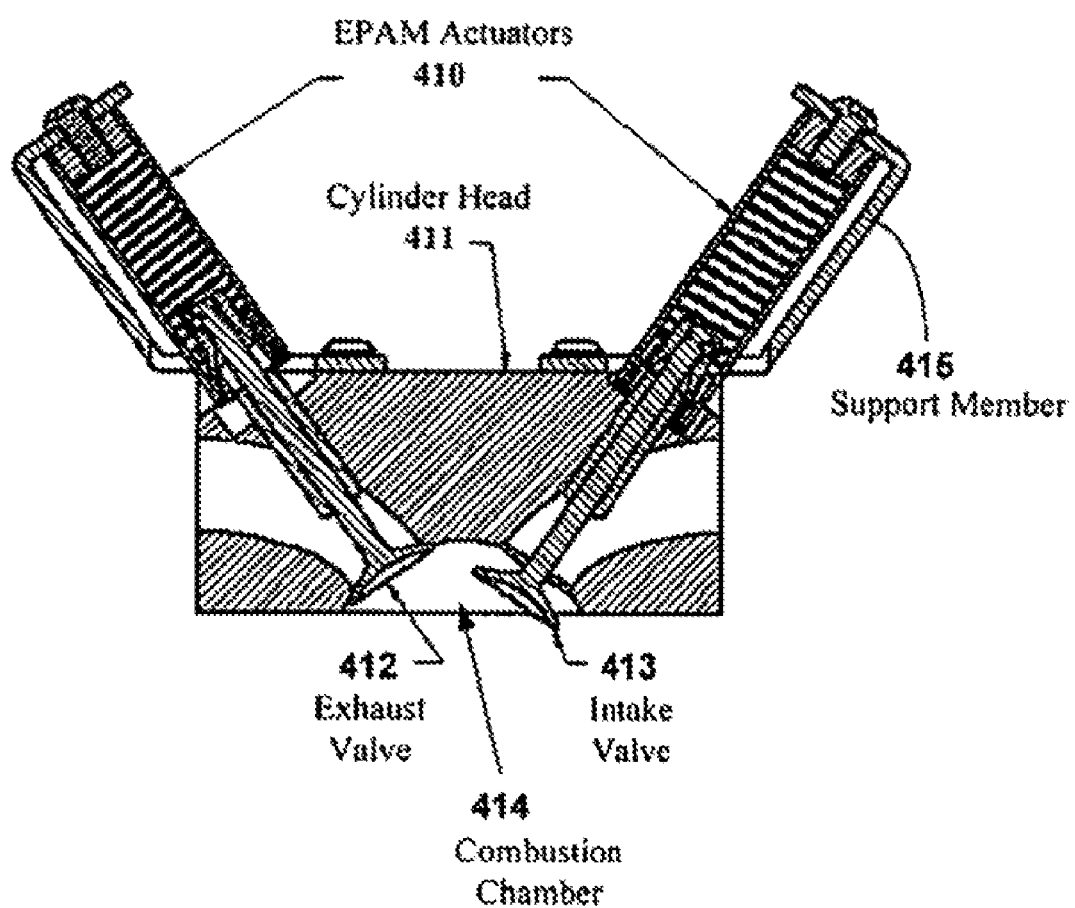

In FIGS. 3K and 3L, an embodiment of a pinch valve is shown. A pinch valve seals by squeezing on a flexible conduit, such as a rubber tube, that can be pinched to shut off the fluid flow in the conduit. Pinch valves are often used for slurries or liquids with large amounts of suspended solids. In FIG. 3K, a cross section of an EPAM constrictor device 400 around a flexible fluid conduit 402 is shown. The EPAM constrictor device includes a plurality of EPAM actuators 401. The EPAM actuators include an EPAM polymer that is designed to deflect toward a center of the fluid under application of an electric field.

The EPAM actuators push towards the center of the fluid conduit to pinch it off and decrease a diameter 303. In FIG. 3L, a section of the fluid conduit 402 from the side is shown. The dashed lines indicate deflected positions of both the constrictor device 400 and the fluid conduit 402. As the deflection of the constrictor device increases, the diameter 403 in the conduit 402 decreases. In one embodiment, the constrictor device 400 may be used as a cuff or sleeve around a human limb, such as an arm or a leg, to pinch off a blood flow in vessels in the arm or the leg when the constrictor is deflected. In another example, the cuff or sleeve may be used around a human organ to constrict blood flow in the human organ. A few other types of valves not shown that may be used as flow EPAM flow control devices include but are not limited to 1) check valves designed to prevent backflow, 2) pressure relief valves designed to provide protection from over-pressure and 3) buttery fly valves that control the flow by using a circular disc or vane with its pivot axis at right angles to the direction of the flow.

A simple diaphragm by itself may function as a flow control devices using variable permeability (configuration not shown). For example, if fluid under pressure is on one side of an EPAM diaphragm, and the EPAM diaphragm is permeable to the fluid, then actuating the EPAM diaphragm to make it expand in area and contract in thickness will increase its permeability and allow the pressurized fluid to diffuse through the EPAM diaphragm at greater rates. Many fluids such as gasses and smaller liquid molecules under pressure can diffuse through EPAM elastomers and EPAM electrodes.

In one embodiment, an EPAM actuator is used to actuate the intake 413 and exhaust valves 412 to the combustion chamber 414 in an internal combustion engine using a roll-type electroactive polymer transducer 410. This embodiment is shown in FIG. 3M. The EPAM actuators are mounted to the cylinder head 411 via support members 415 bolted to the cylinder head. The EPAM actuators 410 may control the opening and closing of the intake and exhaust valves.

EPAM transducers overcome many of the limitations of conventional actuation technologies and enable the actuation of engine valves individually for variable timing and lift. EPAM transducers have linear force characteristics, inherent proportional control (for variable lift), high efficiency, low noise, good packaging flexibility, and the "soft landing" ability. For example, solenoids tend to snap shut at the end of their travel, resulting in noise and accelerated valve wear; EPAM transducers can provide "soft landing" to reduce noise and wear. EPAM transducers also provide higher power-to-weight ratio than solenoids or hydraulics.

By using EPAM transducers to actuate the intake/exhaust valves, valve timing and lift can be better matched to the engine requirements at different speeds, and a broader range of power and economy can be achieved from the engine. The use of EPAM transducers eliminates the need for the camshaft and related drive hardware, and enables infinite variable valving for camless engines. Furthermore, EPAM transducers can be used to achieve individual cylinder control in an internal combustion engine which is not possible today. Individual cylinders can be enabled or disabled on demand by either actuating or not actuating the intake/exhaust valves. For example, an eight-cylinder engine can run as a four-or six-cylinder as needed. This greatly increase the flexibility of engine power output and fuel economy.

The control of an EPAM actuated valves of the present invention may be pulse-width modulated (PWM), where the valve is open for a certain percentage of each cycle of a high frequency signal. The open percentage (or duty cycle) is varied with the flow requirement. The valve can also be proportionally controlled where the position of the valve is controlled and varied according to the flow requirements. This proportional control is difficult with the conventional solenoids currently used. The EPAM actuated valve can also be frequency modulated (FM). The frequency of actuation and spring rates can be designed to operate at resonance, which can reduce the power requirements of the actuator. Flow control would be done by varying the frequency away from the resonance frequency.

There are a wide variety of applications of an EPAM actuated valve for controlling fluid flow and/or regulating pressure. EPAM transducers have the advantages of reduced weight, costs, and complexity and increased operating flexibility compared to conventional flow control systems. In an automobile, an EPAM actuated valve can be used for fuel injection control, air intake control (throttle position), cooling system and emission control. For example, the EPAM actuated valve described herein can be used as the canister purge valve (CPV) in internal combustion engines. The CPV controls flow between a fuel vapor canister at atmospheric pressure and the air intake system of an internal combustion engine at partial vacuum. The EP actuated valve enables proportional control of fuel vapor flow, which is difficult to achieve with solenoid types of valves. As another example, the EPAM actuated valve can replace the conventional pneumatically actuated valve system for controlling flow of exhaust to the muffler. In the embodiments described herein and in many other applications, the EPAM actuated valve can be readily integrated into their surrounding structures.

Electroactive Polymer Devices
Transducers

Figure 4A:
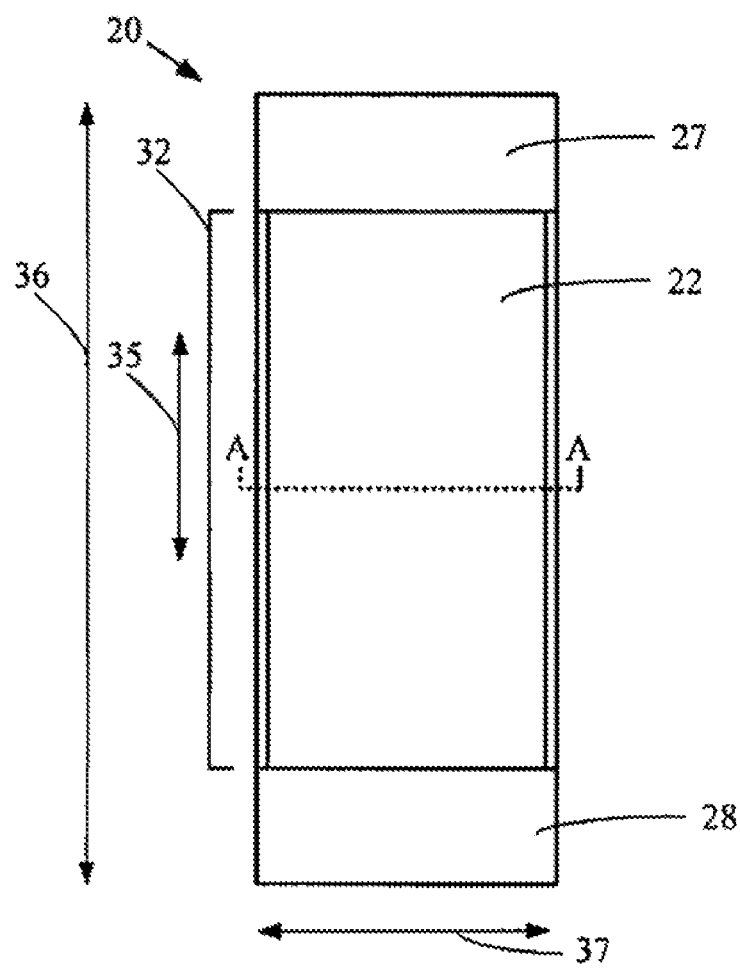
FIGS. 4A-4D illustrate a rolled electroactive polymer device in accordance with one embodiment of the present invention.
Figure 4B:
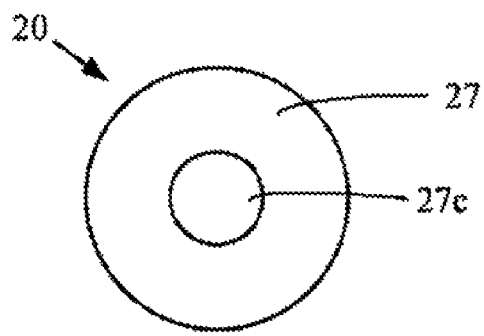
Figure 4C:
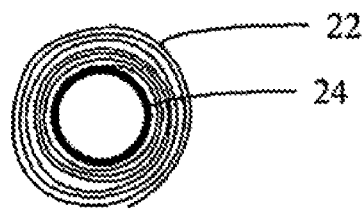
Figure 4D:
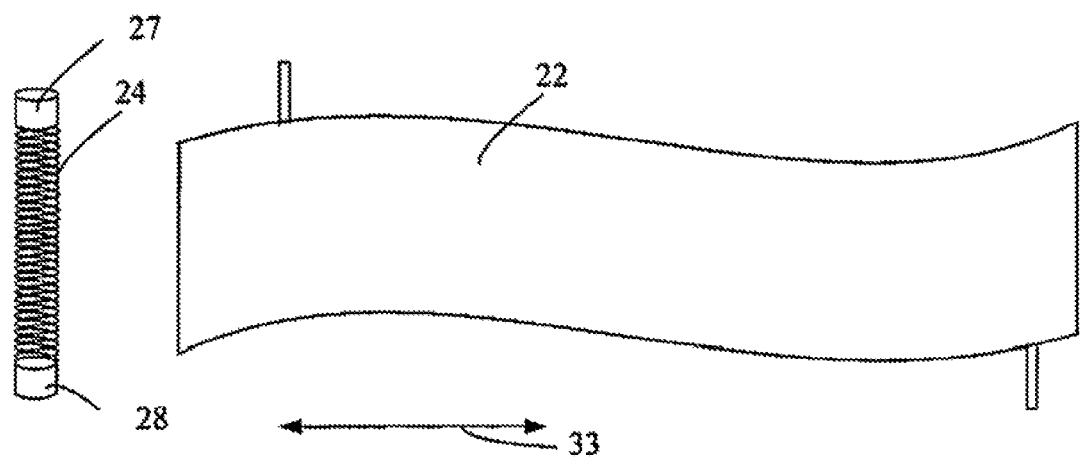

FIGS. 4A-2E show a rolled electroactive polymer device 20 in accordance with one embodiment of the present invention. The rolled electroactive polymer device may be used for actuation of an EPAM flow control device (e.g., see FIGS. 2C-2F, 2L or 3G-3I) and may also act as part of a fluid conduit or other types of structures immersed in an external or internal flowfield. The rolled electroactive polymer devices may provide linear and/or rotational/torsional motion for operating the EPAM flow control device. FIG. 4A illustrates a side view of device 20. FIG. 4B illustrates an axial view of device 20 from the top end. FIG. 4C illustrates an axial view of device 20 taken through cross section A-A. FIG. 4D illustrates components of device 20 before rolling. Device 20 comprises a rolled electroactive polymer 22, spring 24, end pieces 27 and 28, and various fabrication components used to hold device 20 together.

As illustrated in FIG. 4C, electroactive polymer 22 is rolled. In one embodiment, a rolled electroactive polymer refers to an electroactive polymer with, or without electrodes, wrapped round and round onto itself (e.g., like a poster) or wrapped around another object (e.g., spring 24). The polymer may be wound repeatedly and at the very least comprises an outer layer portion of the polymer overlapping at least an inner layer portion of the polymer. In one embodiment, a rolled electroactive polymer refers to a spirally wound electroactive polymer wrapped around an object or center. As the term is used herein, rolled is independent of how the polymer achieves its rolled configuration.

As illustrated by FIGS. 4C and 4D, electroactive polymer 22 is rolled around the outside of spring 24. Spring 24 provides a force that strains at least a portion of polymer 22. The top end 24a of spring 24 is attached to rigid endpiece 27. Likewise, the bottom end 24b of spring 24 is attached to rigid endpiece 28. The top edge 22a of polymer 22 (FIG. 4D) is wound about endpiece 27 and attached thereto using a suitable adhesive. The bottom edge 22b of polymer 22 is wound about endpiece 28 and attached thereto using an adhesive. Thus, the top end 24a of spring 24 is operably coupled to the top edge 22a of polymer 22 in that deflection of top end 24a corresponds to deflection of the top edge 22a of polymer 22. Likewise, the bottom end 24b of spring 24 is operably coupled to the bottom edge 22b of polymer 22 and deflection bottom end 24b corresponds to deflection of the bottom edge 22b of polymer 22. Polymer 22 and spring 24 are capable of deflection between their respective bottom top portions.

As mentioned above, many electroactive polymers perform better when prestrained. For example, some polymers exhibit a higher breakdown electric field strength, electrically actuated strain, and energy density when prestrained. Spring 24 of device 20 provides forces that result in both circumferential and axial prestrain onto polymer 22.

Spring 24 is a compression spring that provides an outward force in opposing axial directions (FIG. 4A) that axially stretches polymer 22 and strains polymer 22 in an axial direction. Thus, spring 24 holds polymer 22 in tension in axial direction 35. In one embodiment, polymer 22 has an axial prestrain in direction 35 from about 50 to about 300 percent. As will be described in further detail below for fabrication, device 20 may be fabricated by rolling a prestrained electroactive polymer film around spring 24 while it the spring is compressed. Once released, spring 24 holds the polymer 22 in tensile strain to achieve axial prestrain.

Spring 24 also maintains circumferential prestrain on polymer 22. The prestrain may be established in polymer 22 longitudinally in direction 33 (FIG. 4D) before the polymer is rolled about spring 24. Techniques to establish prestrain in this direction during fabrication will be described in greater detail below. Fixing or securing the polymer after rolling, along with the substantially constant outer dimensions for spring 24, maintains the circumferential prestrain about spring 24. In one embodiment, polymer 22 has a circumferential prestrain from about 100 to about 500 percent. In many cases, spring 24 provides forces that result in anisotropic prestrain on polymer 22.

Figure 4E:
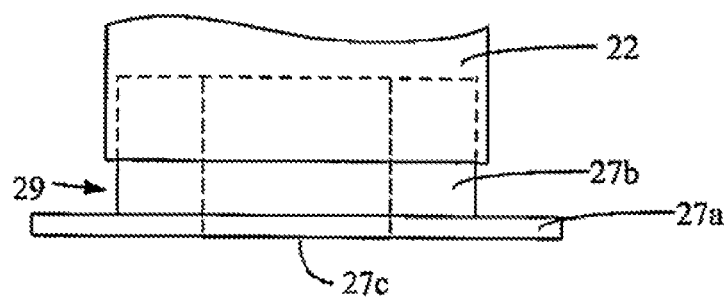
FIG. 4E illustrates an end piece for the rolled electroactive polymer device of FIG. 2A in accordance with one embodiment of the present invention.

End pieces 27 and 28 are attached to opposite ends of rolled electroactive polymer 22 and spring 24. FIG. 4E illustrates a side view of end piece 27 in accordance with one embodiment of the present invention. Endpiece 27 is a circular structure that comprises an outer flange 27a, an interface portion 27b, and an inner hole 27c. Interface portion 27b preferably has the same outer diameter as spring 24. The edges of interface portion 27b may also be rounded to prevent polymer damage. Inner hole 27c is circular and passes through the center of endpiece 27, from the top end to the bottom outer end that includes outer flange 27a. In a specific embodiment, endpiece 27 comprises aluminum, magnesium or another machine metal. Inner hole 27c is defined by a hole machined or similarly fabricated within endpiece 27. In a specific embodiment, endpiece 27 comprises ½ inch end caps with a ⅜ inch inner hole 27c.

In one embodiment, polymer 22 does not extend all the way to outer flange 27a and a gap 29 is left between the outer portion edge of polymer 22 and the inside surface of outer flange 27a. As will be described in further detail below, an adhesive or glue may be added to the rolled electroactive polymer device to maintain its rolled configuration. Gap 29 provides a dedicated space on endpiece 27 for an adhesive or glue than the buildup to the outer diameter of the rolled device and fix to all polymer layers in the roll to endpiece 27. In a specific embodiment, gap 29 is between about 0 mm and about 5 mm.

The portions of electroactive polymer 22 and spring 24 between end pieces 27 and 28 may be considered active to their functional purposes. Thus, end pieces 27 and 28 define an active region 32 of device 20 (FIG. 4A). End pieces 27 and 28 provide a common structure for attachment with spring 24 and with polymer 22. In addition, each end piece 27 and 28 permits external mechanical and detachable coupling to device 20. For example, device 20 may be employed in a robotic application where endpiece 27 is attached to an upstream link in a robot and endpiece 28 is attached to a downstream link in the robot. Actuation of electroactive polymer 22 then moves the downstream link relative to the upstream link as determined by the degree of freedom between the two links (e.g., rotation of link 2 about a pin joint on link 1).

In a specific embodiment, inner hole 27c comprises an internal thread capable of threaded interface with a threaded member, such as a screw or threaded bolt. The internal thread permits detachable mechanical attachment to one end of device 20. For example, a screw may be threaded into the internal thread within end piece 27 for external attachment to a robotic element. For detachable mechanical attachment internal to device 20, a nut or bolt to be threaded into each end piece 27 and 28 and pass through the axial core of spring 24, thereby fixing the two end pieces 27 and 28 to each other. This allows device 20 to be held in any state of deflection, such as a fully compressed state useful during rolling. This may also be useful during storage of device 20 so that polymer 22 is not strained in storage.

In one embodiment, a stiff member or linear guide 30 is disposed within the spring core of spring 24. Since the polymer 22 in spring 24 is substantially compliant between end pieces 27 and 28, device 20 allows for both axial deflection along direction 35 and bending of polymer 22 and spring 24 away from its linear axis (the axis passing through the center of spring 24). In some embodiments, only axial deflection is desired. Linear guide 30 prevents bending of device 20 between end pieces 27 and 28 about the linear axis. Preferably, linear guide 30 does not interfere with the axial deflection of device 20. For example, linear guide 30 preferably does not introduce frictional resistance between itself and any portion of spring 24. With linear guide 30, or any other suitable constraint that prevents motion outside of axial direction 35, device 20 may act as a linear actuator or generator with output strictly in direction 35. Linear guide 30 may be comprised of any suitably stiff material such as wood, plastic, metal, etc.

Polymer 22 is wound repeatedly about spring 22. For single electroactive polymer layer construction, a rolled electroactive polymer of the present invention may comprise between about 2 and about 200 layers. In this case, a layer refers to the number of polymer films or sheets encountered in a radial cross-section of a rolled polymer. In some cases, a rolled polymer comprises between about 5 and about 100 layers. In a specific embodiment, a rolled electroactive polymer comprises between about 15 and about 50 layers.

In another embodiment, a rolled electroactive polymer employs a multilayer structure. The multilayer structure comprises multiple polymer layers disposed on each other before rolling or winding. For example, a second electroactive polymer layer, without electrodes patterned thereon, may be disposed on an electroactive polymer having electrodes patterned on both sides. The electrode immediately between the two polymers services both polymer surfaces in immediate contact. After rolling, the electrode on the bottom side of the electroded polymer then contacts the top side of the non-electroded polymer. In this manner, the second electroactive polymer with no electrodes patterned thereon uses the two electrodes on the first electroded polymer.

Other multilayer constructions are possible. For example, a multilayer construction may comprise any even number of polymer layers in which the odd number polymer layers are electroded and the even number polymer layers are not. The upper surface of the top non-electroded polymer then relies on the electrode on the bottom of the stack after rolling. Multilayer constructions having 2, 4, 6, 8, etc., are possible this technique. In some cases, the number of layers used in a multilayer construction may be limited by the dimensions of the roll and thickness of polymer layers. As the roll radius decreases, the number of permissible layers typically decrease is well. Regardless of the number of layers used, the rolled transducer is configured such that a given polarity electrode does not touch an electrode of opposite polarity. In one embodiment, multiple layers are each individually electroded and every other polymer layer is flipped before rolling such that electrodes in contact each other after rolling are of a similar voltage or polarity.

The multilayer polymer stack may also comprise more than one type of polymer For example, one or more layers of a second polymer may be used to modify the elasticity or stiffness of the rolled electroactive polymer layers. This polymer may or may not be active in the charging/discharging during the actuation. When a non-active polymer layer is employed, the number of polymer layers may be odd. The second polymer may also be another type of electroactive polymer that varies the performance of the rolled product.

In one embodiment, the outermost layer of a rolled electroactive polymer does not comprise an electrode disposed thereon. This may be done to provide a layer of mechanical protection, or to electrically isolate electrodes on the next inner layer. For example, inner and outer layers and surface coating may be selected to provide fluid compatibility as previously described. The multiple layer characteristics described above may also be applied non-rolled electroactive polymers, such as EPAM diaphragms previously described.

Device 20 provides a compact electroactive polymer device structure and improves overall electroactive polymer device performance over conventional electroactive polymer devices. For example, the multilayer structure of device 20 modulates the overall spring constant of the device relative to each of the individual polymer layers. In addition, the increased stiffness of the device achieved via spring 24 increases the stiffness of device 20 and allows for faster response in actuation, if desired.

In a specific embodiment, spring 24 is a compression spring such as catalog number 11422 as provided by Century Spring of Los Angeles, Calif. This spring is characterized by a spring force of 0.91 lb/inch and dimensions of 4.38 inch free length, 1.17 inch solid length, 0.360 inch outside diameter, 0.3 inch inside diameter. In this case, rolled electroactive polymer device 20 has a height 36 from about 5 to about 7 cm, a diameter 37 of about 0.8 to about 1.2 cm, and an active region between end pieces of about 4 to about 5 cm. The polymer is characterized by a circumferential prestrain from about 300 to about 500 percent and axial prestrain (including force contributions by spring 24) from about 150 to about 250 percent.

Although device 20 is illustrated with a single spring 24 disposed internal to the rolled polymer, it is understood that additional structures such as another spring external to the polymer may also be used to provide strain and prestrain forces. These external structures may be attached to device 20 using end pieces 27 and 28 for example.

Figure 4F:
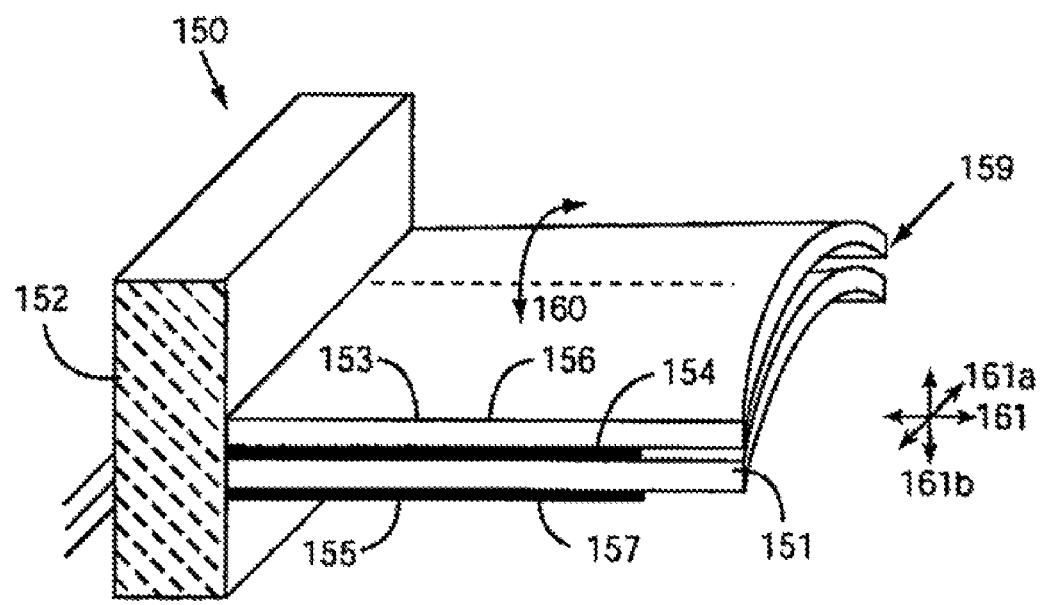
FIG. 4F illustrates a bending transducer for providing variable stiffness based on structural changes related to polymer deflection in accordance with one embodiment of the present invention.

FIG. 4F illustrates a bending transducer 150 for providing variable stiffness based on structural changes in accordance with one embodiment of the present invention. In this case, transducer 150 varies and controls stiffness in one direction using polymer deflection in another direction. In one embodiment, this device may be used a vane in a fluid flow as described with respect to FIGS. 2K and 2L. Transducer 150 includes a polymer 151 fixed at one end by a rigid support 152: Attached to polymer 151 is a flexible thin material 153 such as polyimide or mylar using an adhesive layer, for example. The flexible thin material 153 has a modulus of elasticity greater than polymer 151. The difference in modulus of elasticity for the top and bottom sides 156 and 157 of transducer 150 causes the transducer to bend upon actuation. Electrodes 154 and 155 are attached to the opposite sides of the polymer 151 to provide electrical communication between polymer 151 and control electronics used to control transducer 150 deflection. Transducer 150 is not planar but rather has a slight curvature about axis 160 as shown. Direction 160 is defined as rotation or bending about a line extending axially from rigid support 152 through polymer 151. This curvature makes transducer 150 stiff in response to forces applied to the tip along any of the directions indicated by the arrows 161. In place of, or in addiction to forces, torques may be applied to the transducer. These torques may be applied about the axis indicated by the arrows of directions 161a and 161b.

Figure 4G:
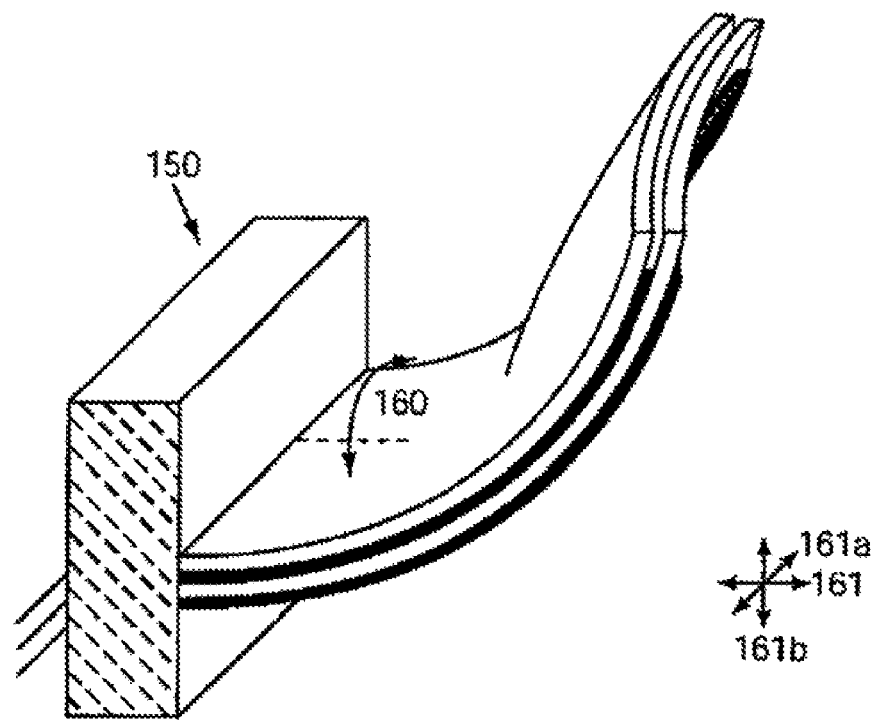
FIG. 4G illustrates the transducer of FIG. 4A with a 90 degree bending angle.

FIG. 4G illustrates transducer 150 with a deflection in direction 161b that is caused by the application of a voltage to he electrodes 154 and 155. The voltage is applied to allow the bending forces to overcome the resistance presented by the curvature in the unactuated state. Effectively, the transducer 152 bends with a kink caused by the initial curvature. In this state, the stiffness in response to the forces or torques indicated by directions 161 is much less.

A mechanical interface may be attached to the distal portion 159 of transducer 150. Alternately, mechanical attachment may be made to the flexible thin material 153 to allow transducer 150 implementation in a mechanical device. For example, transducer 150 is well suited for use in applications such as lightweight space structures where folding of the structure, so that it can be stowed and deployed, is useful. In this example, the stiff condition of individual transducers (which form ribs in the structure) occurs when the structure is deployed. To allow for stowing, the transducers are actuated and the ribs may be bent. In another application, the transducers form ribs in the sidewall of pneumatic tires. In this application, the change in the stiffness of the ribs can affect the stiffness of the tires and thus the resultant handling of the vehicle that uses the tires. Similarly, the device may be implemented in a shoe and the change in stiffness of the ribs can affect the stiffness of the shoe.

Transducer 150 provides one example where actuation of an electroactive polymer causes low-energy changes in configuration or shape that affects stiffness of a device. Using this technique, it is indeed possible to vary stiffness using transducer 150 at greater levels than direct mechanical or electrical energy control. In another embodiment, deflection of an electroactive polymer transducer directly contributes to the changing stiffness of a device that the transducer is configured within.

Figure 4H:
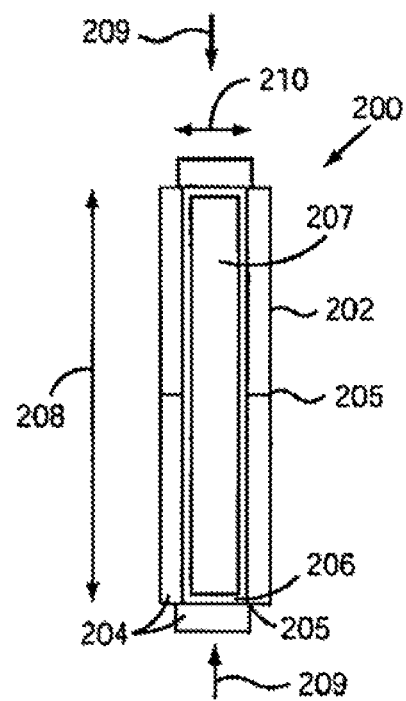
FIG. 4H illustrates a bow device suitable for providing variable stiffness in accordance with another embodiment of the present invention.
Figure 4I:
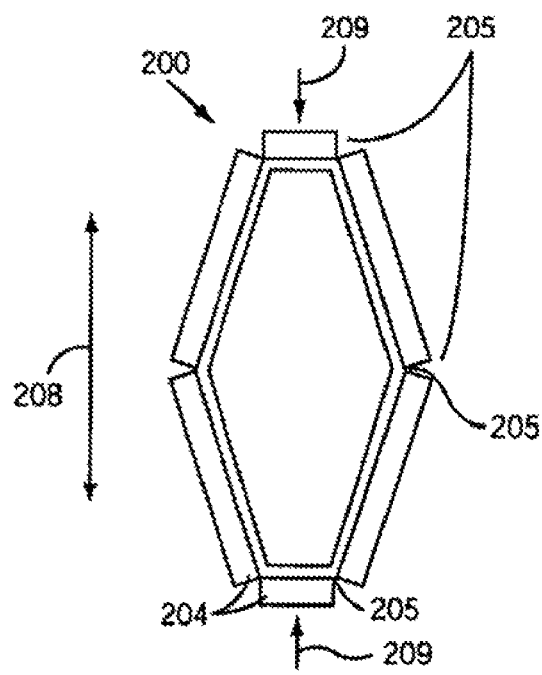
FIG. 4I illustrates the bow device of FIG. 4C after actuation.

FIG. 4H illustrates a bow device 200 suitable for providing variable stiffness in accordance with another embodiment of the present invention. Bow device 200 is a planar mechanism comprising a flexible frame 202 attached to a polymer 206. The frame 202 includes six rigid members 204 pivotally connected at joints 205. The members 204 and joints 205 couple polymer deflection in a planar direction 208 into mechanical output in a perpendicular planar direction 210. Bow device 200 is in a resting position as shown in FIG. 4H. Attached to opposite (top and bottom) surfaces of the polymer 206 are electrodes 207 (bottom electrode on bottom side of polymer 206 not shown) to provide electrical communication with polymer 206. FIG. 4I illustrates bow device 200 after actuation.

In the resting position of FIG. 4H, rigid members 204 provide a large stiffness to forces 209 in direction 208, according to their material stiffness. However, for the position of bow device 200 as shown in FIG. 4I, the stiffness in direction 208 is based on the compliance of polymer 202 and any rotational elastic resistance provided by joints 205. Thus, control electronics in electrical communication with electrodes 207 may be used to apply an electrical state that produces deflection for polymer 206 as shown in FIG. 4H, and its corresponding high stiffness, and an electrical state that produces deflection for polymer 206 as shown in FIG. 4I, and its corresponding low stiffness. In this, simple on/off control may be used to provide a large stiffness change using device 200.

In addition to stiffness variation achieved by varying the configuration of rigid members in device 200, stiffness for the position of FIG. 4I may additionally be varied using one of the open or closed loop stiffness techniques described in detail in commonly owned U.S. Pat. No. 6,882,086, by Kornbluh et al and titled "Variable Stiffness Electroactive Polymers," which is incorporated herein in its entirety and for all purposes.

Multiple Active Areas

In some cases, electrodes cover a limited portion of an electroactive polymer relative to the total area of the polymer. This may be done to prevent electrical breakdown around the edge of a polymer, to allow for polymer portions to facilitate a rolled construction (e.g., an outside polymer barrier layer), to provide multifunctionality, or to achieve customized deflections for one or more portions of the polymer. As the term is used herein, an active area is defined as a portion of a transducer comprising a portion of an electroactive polymer and one or more electrodes that provide or receive electrical energy to or from the portion. The active area may be used for any of the functions described below. For actuation, the active area includes a portion of polymer having sufficient electrostatic force to enable deflection of the portion. For generation or sensing, the active area includes a portion of polymer having sufficient deflection to enable a change in electrostatic energy. A polymer of the present invention may have multiple active areas.

Figure 4J:
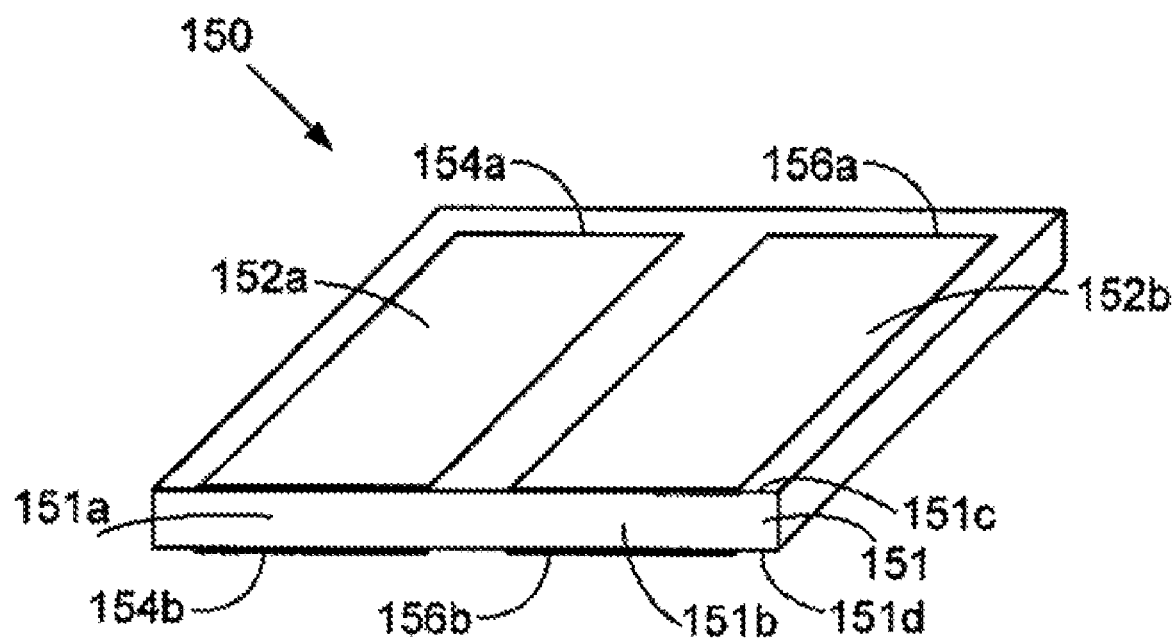
FIG. 4J illustrates a monolithic transducer comprising a plurality of active areas on a single polymer in accordance with one embodiment of the present invention.

In accordance with the present invention, the term "monolithic" is used herein to refer to electroactive polymers and transducers comprising a plurality of active areas on a single polymer. FIG. 4J illustrates a monolithic transducer 150 comprising a plurality of active areas on a single polymer 151 in accordance with one embodiment of the present invention. The monolithic transducer 150 converts between electrical energy and mechanical energy. The monolithic transducer 150 comprises an electroactive polymer 151 having two active areas 152a and 152b. Polymer 151 may be held in place using, for example, a rigid frame (not shown) attached at the edges of the polymer. Coupled to active areas 152a and 152b are wires 153 that allow electrical communication between active areas 152a and 152b and allow electrical communication with communication electronics 155.

Active area 152a has top and bottom electrodes 154a and 154b that are attached to polymer 151 on its top and bottom surfaces 151c and 151d, respectively. Electrodes 154a and 154b provide or receive electrical energy across a portion 151a of the polymer 151. Portion 151a may deflect with a change in electric field provided by the electrodes 154a and 154b. For actuation, portion 151a comprises the polymer 151 between the electrodes 154a and 154b and any other portions of the polymer 151 having sufficient electrostatic force to enable deflection upon application of voltages using the electrodes 154a and 154b. When active area 152a is used as a generator to convert from electrical energy to mechanical energy, deflection of the portion 151a causes a change in electric field in the portion 151a that is received as a change in voltage difference by the electrodes 154a and 154b.

Active area 152b has top and bottom electrodes 156a and 156b that are attached to the polymer 151 on its top and bottom surfaces 151c and 151d, respectively. Electrodes 156a and 156b provide or receive electrical energy across a portion 151b of the polymer 151. Portion 151b may deflect with a change in electric field provided by the electrodes 156a and 156b. For actuation, portion 151b comprises the polymer 151 between the electrodes 156a and 156b and any other portions of the polymer 151 having sufficient stress induced by the electrostatic force to enable deflection upon application of voltages using the electrodes 156a and 156b. When active area 152b is used as a generator to convert from electrical energy to mechanical energy, deflection of the portion 151b causes a change in electric field in the portion 151b that is received as a change in voltage difference by the electrodes 156a and 156b.

Active areas for an electroactive polymer may be easily patterned and configured using conventional electroactive polymer electrode fabrication techniques. Multiple active area polymers and transducers are further described in Ser. No. 09/779,203, which is incorporated herein by reference for all purposes. Given the ability to pattern and independently control multiple active areas allows rolled transducers of the present invention to be employed in many new applications; as well as employed in existing applications in new ways.

FIG. 4K illustrates a monolithic transducer 170 comprising a plurality of active areas on a single polymer 172, before rolling, in accordance with one embodiment of the present invention. In present invention, the monolithic transducer 170 may be utilized in a rolled or unrolled configuration. Transducer 170 comprises individual electrodes 174 on the facing polymer side 177. The opposite side of polymer 172 (not shown) may include individual electrodes that correspond in location to electrodes 174, or may include a common electrode that spans in area and services multiple or all electrodes 174 and simplifies electrical communication. Active areas 176 then comprise portions of polymer 172 between each individual electrode 174 and the electrode on the opposite side of polymer 172, as determined by the mode of operation of the active area. For actuation for example, active area 176a for electrode 174a includes a portion of polymer 172 having sufficient electrostatic force to enable deflection of the portion, as described above.

Active areas 176 on transducer 170 may be configured for one or more functions. In one embodiment, all active areas 176 are all configured for actuation. In another embodiment suitable for use with robotic applications, one or two active areas 176 are configured for sensing while the remaining active areas 176 are configured for actuation. In this manner, a rolled electroactive polymer device using transducer 170 is capable of both actuation and sensing. Any active areas designated for sensing may each include dedicated wiring to sensing electronics, as described below.

At shown, electrodes 174a-d each include a wire 175a-d attached thereto that provides dedicated external electrical communication and permits individual control for each active area 176a-d. Electrodes 174e-i are all electrical communication with common electrode 177 and wire 179 that provides common electrical communication with active areas 176e-i. Common electrode 177 simplifies electrical communication with multiple active areas of a rolled electroactive polymer that are employed to operate in a similar manner. In one embodiment, common electrode 177 comprises aluminum foil disposed on polymer 172 before rolling. In one embodiment, common electrode 177 is a patterned electrode of similar material to that used for electrodes 174a-i, e.g., carbon grease.

For example, a set of active areas may be employed for one or more of actuation, generation, sensing, changing the stiffness and/or damping, or a combination thereof. Suitable electrical control also allows a single active area to be used for more than one function. For example, active area 174a may be used for actuation and variable stiffness control of a fluid conduit. The same active area may also be used for generation to produce electrical energy based on motion of the fluid conduit. Suitable electronics for each of these functions are described in further detail below. Active area 174b may also be flexibly used for actuation, generation, sensing, changing stiffness, or a combination thereof. Energy generated by one active area may be provided to another active area, if desired by an application. Thus, rolled polymers and transducers of the present invention may include active areas used as an actuator to convert from electrical to mechanical energy, a generator to convert from mechanical to electrical energy, a sensor that detects a parameter, or a variable stiffness and/or damping device that is used to control stiffness and/or damping, or combinations thereof.

In one embodiment, multiple active areas employed for actuation are wired in groups to provide graduated electrical control of force and/or deflection output from a rolled electroactive polymer device. For example, a rolled electroactive polymer transducer many have 50 active areas in which 20 active areas are coupled to one common electrode, 10 active areas to a second common electrode, another 10 active areas to a third common electrode, 5 active areas to a fourth common electrode in the remaining five individually wired. Suitable computer management and on-off control for each common electrode then allows graduated force and deflection control for the rolled transducer using only binary on/off switching. The biological analogy of this system is motor units found in many mammalian muscular control systems. Obviously, any number of active areas and common electrodes may be implemented in this manner to provide a suitable mechanical output or graduated control system.

Multiple Degree of Freedom Devices

In another embodiment, multiple active areas on an electroactive polymer are disposed such subsets of the active areas radially align after roiling. For example, the multiple the active areas may be disposed such that, after rolling, active areas are disposed every 90 degrees in the roll. These radially aligned electrodes may then be actuated in unity to allow multiple degree of freedom motion for a rolled electroactive polymer device. Similarly, multiple degrees of freedom may be obtained for unrolled electroactive polymer devices, such as those described with respect to FIGS. 4F and 4G. Thus, the rolled polymer devices are one embodiment of multi degrees of freedom that may be obtained with transducer configuration of the present invention.

FIG. 4L illustrates a rolled transducer 180 capable of two-dimensional output in accordance with one environment of the present invention. Transducer 180 comprises an electroactive polymer 182 rolled to provide ten layers. Each layer comprises four radially aligned active areas. The center of each active area is disposed at a 90 degree increment relative to its neighbor. FIG. 4L shows the outermost layer of polymer 182 and radially aligned active areas 184, 186, and 188, which are disposed such that their centers mark 90 degree increments relative to each other. A fourth radially aligned active area (not shown) on the backside of polymer 182 has a center approximately situated 180 degrees from radially aligned active area 186.

Radially aligned active area 184 may include common electrical communication with active areas on inner polymer layers having the same radial alignment. Likewise, the other three radially aligned outer active areas 182, 186, and the back active area not shown, may include common electrical communication with their inner layer counterparts. In one embodiment, transducer 180 comprises four leads that provide common actuation for each of the four radially aligned active area sets.

FIG. 4M illustrates transducer 180 with radially aligned active area 188, and its corresponding radially aligned inner layer active areas, actuated. Actuation of active area 188, and corresponding inner layer active areas, results in axial expansion of transducer 188 on the opposite side of polymer 182. The result is lateral bending of transducer 180, approximately 180 degrees from the center point of active area 188. The effect may also be measured by the deflection of a top portion 189 of transducer 180, which traces a radial arc from the resting position shown in FIG. 4L to his position at shown in FIG. 4M. Varying the amount of electrical energy provided to active area 188, and corresponding inner layer active areas, controls the deflection of the top portion 189 along this arc. Thus, top portion 189 of transducer 180 may have a deflection as shown in FIG. 4L, or greater, or a deflection minimally away from the position shown in FIG. 4L. Similar bending in an another direction may be achieved by actuating any one of the other radially aligned active area sets.

Combining actuation of the radially aligned active area sets produces a two-dimensional space for deflection of top portion 189. For example, radially aligned active area sets 186 and 184 may be actuated simultaneously to produce deflection for the top portion in a 45 degree angle corresponding to the coordinate system shown in FIG. 4L. Decreasing the amount of electrical energy provided to radially aligned active area set 186 and increasing the amount of electrical energy provided to radially aligned active area set 184 moves top portion 189 closer to the zero degree mark. Suitable electrical control then allows top portion 189 to trace a path for any angle from 0 to 360 degrees, or follow variable paths in this two dimensional space.

Transducer 180 is also capable of three-dimensional deflection. Simultaneous actuation of active areas on all four sides of transducer 180 will move top portion 189 upward. In other words, transducer 180 is also a linear actuator capable of axial deflection based on simultaneous actuation of active areas on all sides of transducer 180. Coupling this linear actuation with the differential actuation of radially aligned active areas and their resulting two-dimensional deflection as just described above, results in a three dimensional deflection space for the top portion of transducer 180. Thus, suitable electrical control allows top portion 189 to move both up and down as well as trace two-dimensional paths along this linear axis.

Although transducer 180 is shown for simplicity with four radially aligned active area sets disposed at 90 degree increments, it is understood that transducers of the present invention capable of two-and three-dimensional motion may comprise more complex or alternate designs. For example, eight radially aligned active area sets disposed at 45 degree increments. Alternatively, three radially aligned active area sets disposed at 120 degree increments may be suitable for 2D and 3-D motion.

In addition, although transducer 180 is shown with only one set of axial active areas, the structure of FIG. 4L is modular. In other words, the four radially aligned active area sets disposed at 90 degree increments may occur multiple times in an axial direction. For example, radially aligned active area sets that allow two-and three-dimensional motion may be repeated ten times to provide a wave pattern that may be impressed on a fluid flow.

Sensing

Electroactive polymers of the present invention may also be configured as a sensor. Generally, electroactive polymer sensors of this invention detect a "parameter" and/or changes in the parameter. The parameter is usually a physical property of an object such as its temperature, density, strain, deformation, velocity, location, contact, acceleration, vibration, volume, pressure, mass, opacity, concentration, chemical state, conductivity, magnetization, dielectric constant, size, etc. In some cases, the parameter being sensed is associated with a physical "event". The physical event that is detected may be the attainment of a particular value or state of a physical or chemical property.

An electroactive polymer sensor is configured such that a portion of the electroactive polymer deflects in response to the change in a parameter being sensed. The electrical energy state and deflection state of the polymer are related. The change in electrical energy or a change in the electrical impedance of an active area resulting from the deflection may then be detected by sensing electronics in electrical communication with the active area electrodes. This change may comprise a capacitance change of the polymer, a resistance change of the polymer, and/or resistance change of the electrodes, or a combination thereof. Electronic circuits in electrical communication with electrodes detect the electrical property change. If a change in capacitance or resistance of the transducer is being measured for example, one applies electrical energy to electrodes included in the transducer and observes a change in the electrical parameters.

In one embodiment, deflection is input into an active area sensor in some manner via one or more coupling mechanisms. In one embodiment, the changing property or parameter being measured by the sensor corresponds to a changing property of the electroactive polymer, e.g. displacement or size changes in the polymer, and no coupling mechanism is used. Sensing electronics in electrical communication with the electrodes detect change output by the active area. In some cases, a logic device in electrical communication with sensing electronics of sensor quantifies the electrical change to provide a digital or other measure of the changing parameter being sensed. For example, the logic device may be a single chip computer or microprocessor that processes information produced by sensing electronics. Electroactive polymer sensors are further described in Ser. No. 10/007,705, which is incorporated herein by reference for all purposes.

An active area may be configured such that sensing is performed simultaneously with actuation of the active area. For a monolithic transducer, one active area may be responsible for actuation and another for sensing. Alternatively, the same active area of a polymer may be responsible for actuation and sensing. In this case, a low amplitude, high frequency AC (sensing) signal may be superimposed on the driving (actuation) signal. For example, a 1000 Hz sensing signal may be superimposed on a 10 Hz actuation signal. The driving signal will depend on the application, or how fast the actuator is moving, but driving signals in the range from less than 0.1 Hz to about 1 million Hz are suitable for many applications. In one embodiment, the sensing signal is at least about 10 times faster than the motion being measured. Sensing electronics may then detect and measure the high frequency response of the polymer to allow sensor performance that does not interfere with polymer actuation. Similarly, if impedance changes are detected and measured while the electroactive polymer transducer is being used as a generator, a small, high-frequency AC signal may be superimposed on the lower-frequency generation voltage signal. Filtering techniques may then separate the measurement and power signals.

Active areas of the present invention may also be configured to provide variable stiffness and damping functions. In one embodiment, open loop techniques are used to control stiffness and/or damping of a device employing an electroactive polymer transducer; thereby providing simple designs that deliver a desired stiffness and/or damping performance without sensor feedback. For example, control electronics in electrical communication with electrodes of the transducer may supply a substantially constant charge to the electrodes. Alternately, the control electronics may supply a substantially constant voltage to the electrodes. Systems employing an electroactive polymer transducer offer several techniques for providing stiffness and/or damping control. An exemplary circuit providing stiffness/damping control is provided below.

While not described in detail, it is important to note that active areas and transducers in all the figures and discussions for the present invention may convert between electrical energy and mechanical energy bi-directionally (with suitable electronics). Thus, any of the rolled polymers, active areas, polymer configurations, transducers, and devices described herein may be a transducer for converting mechanical energy to electrical energy (generation, variable stiffness or damping, or sensing) and for converting electrical energy to mechanical energy (actuation, variable stiffness or damping, or sensing). Typically, a generator or sensor active area of the present invention comprises a polymer arranged in a manner that causes a change in electric field in response to deflection of a portion of the polymer. The change in electric field, along with changes in the polymer dimension in the direction of the field, produces a change in voltage, and hence a change in electrical energy.

Often the transducer is employed within a device that comprises other structural and/or functional elements. For example, external mechanical energy may be input into the transducer in some manner via one or more mechanical transmission coupling mechanisms. For example, the transmission mechanism may be designed or configured to receive flow-generated mechanical energy and to transfer a portion of the flow-generated mechanical energy to a portion of a polymer where the transferred portion of the flow generated mechanical energy results in a deflection in the transducer. The flow-generated mechanical energy may produce an inertial force or a direct force where a portion of the inertial force or a portion of the direct force is received by the transmission mechanism.

Conditioning Electronics

Devices of the present invention may also rely on conditioning electronics that provide or receive electrical energy from electrodes of an active area for one of the electroactive polymer functions mentioned above. Conditioning electronics in electrical communication with one or more active areas may include functions such as stiffness control, energy dissipation, electrical energy generation, polymer actuation, polymer deflection sensing, control logic, etc.

For actuation, electronic drivers may be connected to the electrodes. The voltage provided to electrodes of an active area will depend upon specifics of an application. In one embodiment, an active area of the present invention is driven electrically by modulating an applied voltage about a DC bias voltage. Modulation about a bias voltage allows for improved sensitivity and linearity of the transducer to the applied voltage. For example, a transducer used in an audio application may be driven by a signal of up to 200 to 100 volts peak to peak on top of a bias voltage ranging from about 750 to 2000 volts DC.

Suitable actuation voltages for electroactive polymers, or portions thereof, may vary based on the material properties of the electroactive polymer, such as the dielectric constant, as well as the dimensions of the polymer, such as the thickness of the polymer film For example, actuation electric fields used to actuate polymer 12 in FIG. 2A may range in magnitude from about 0 V/m to about 440 MV/m. Actuation electric fields in this range may produce a pressure in the range of about 0 Pa to about 10 MPa. In order for the transducer to produce greater forces, the thickness of the polymer layer may be increased. Actuation voltages for a particular polymer may be reduced by increasing the dielectric constant, decreasing the polymer thickness, and decreasing the modulus of elasticity, for example.

Figure 4N:
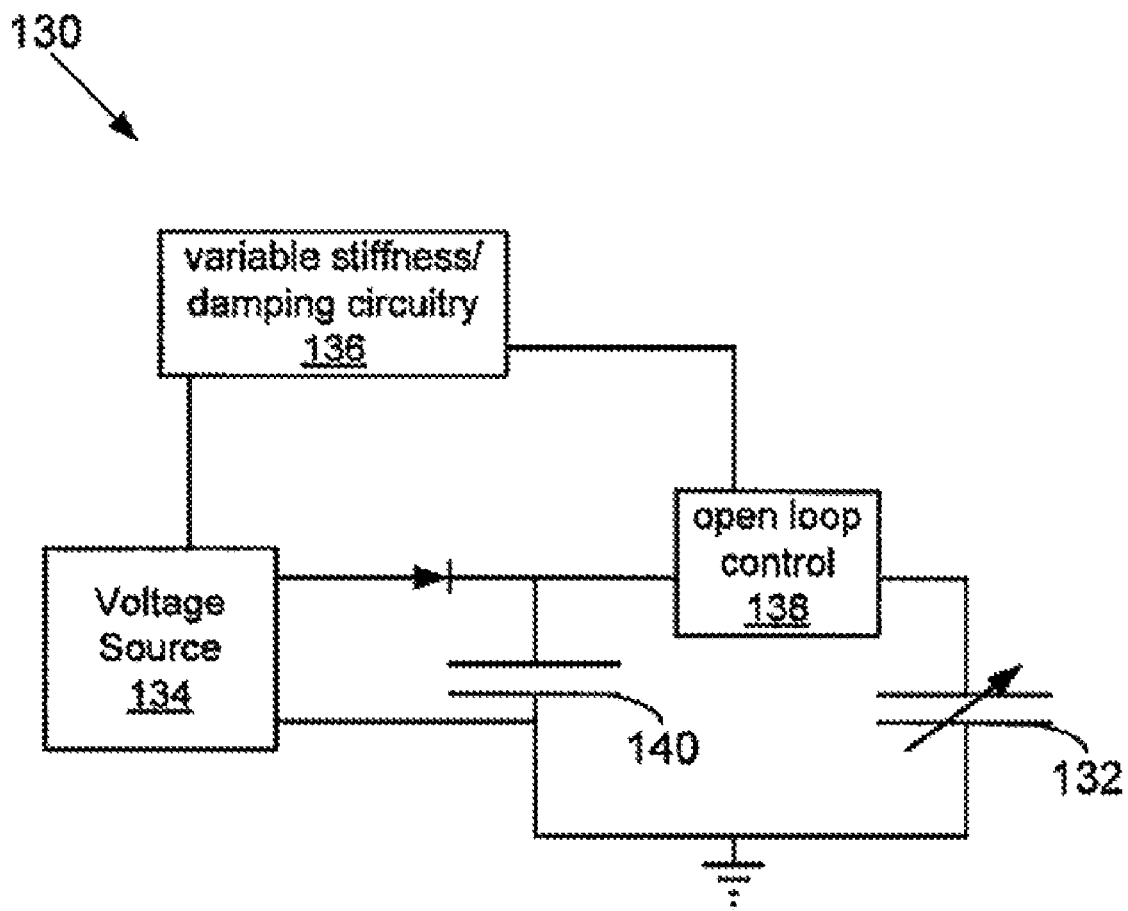
FIG. 4N illustrates an electrical schematic of an open loop variable stiffness/damping system in accordance with one embodiment of the present invention.

FIG. 4N illustrates an electrical schematic of an open loop variable stiffness/damping system in accordance with one embodiment of the present invention. System 130 comprises an electroactive polymer transducer 132, voltage source 134, control electronics comprising variable stiffness/damping circuitry 136 and open loop control 138, and buffer capacitor 140.

Voltage source 134 provides the voltage used in system 130. In this case, voltage source 134 sets the minimum voltage for transducer 132. Adjusting this minimum voltage, together with open loop control 138, adjusts the stiffness provided by transducer 132. Voltage source 134 also supplies charge to system 130. Voltage source 134 may include a commercially available voltage supply, such as a low-voltage battery that supplies a voltage in the range of about 1-15 Volts, and step-up circuitry that raises the voltage of the battery. In this case, voltage step-down performed by step-down circuitry in electrical communication with the electrodes of transducer 132 may be used to adjust an electrical output voltage from transducer 132. Alternately, voltage source 134 may include a variable step-up circuit that can produce a variable high voltage output from the battery. As will be described in further detail below, voltage source 134 may be used to apply a threshold electric field as described below to operate the polymer in a particular stiffness regime.

The desired stiffness or damping for system 130 is controlled by variable stiffness/damping circuitry 136, which sets and changes an electrical state provided by control electronics in system 130 to provide the desired stiffness/damping applied by transducer 132. In this case, stiffness/damping circuitry 36 inputs a desired voltage to voltage source 134 and/or inputs a parameter to open loop control 138. Alternately, if step-up circuitry is used to raise the voltage source 134, circuitry 136 may input a signal to the step-up circuitry to permit voltage control.

As transducer 132 deflects, its changing voltage causes charge to move between transducer 132 and buffer capacitor 140. Thus, externally induced expansion and contraction of transducer 132, e.g., from a vibrating mechanical interface, causes charge to flow back and forth between transducer 132 and buffer capacitor 140 through open loop control 138. The rate and amount of charge moved to or from transducer 132 depends on the properties of buffer capacitor 140, the voltage applied to transducer 132, any additional electrical components in the electrical circuit (such as a resistor used as open loop control 138 to provide damping functionality as current passes there through), the mechanical configuration of transducer 132, and the forces applied to or by transducer 132. In one embodiment, buffer capacitor 140 has a voltage substantially equal to that of transducer 132 for zero displacement of transducer 132, the voltage of system 130 is set by voltage source 134, and open loop control 138 is a wire; resulting in substantially free flow of charge between transducer 132 and buffer capacitor 140 for deflection of transducer 132.

Open loop control 138 provides a passive (no external energy supplied) dynamic response for stiffness applied by transducer 132. Namely, the stiffness provided by transducer 132 may beset by the electrical components included in system 130, such as the control electronics and voltage source 134, or by a signal from control circuitry 136 acting upon one of the electrical components. Either way, the response of transducer 132 is passive to the external mechanical deflections imposed on it. In one embodiment, open loop control 138 is a resistor. One can also set the resistance of the resistor to provide an RC time constant relative to a time of interest, e.g., a period of oscillation in the mechanical system that the transducer is implemented in. In one embodiment, the resistor has a high resistance such that the RC time constant of open loop control 138 and transducer 132 connected in series is long compared to a frequency of interest. In this case, the transducer 132 has a substantially constant charge during the time of interest. A resistance that produces an RC time constant for the resistor and the transducer in the range of about 5 to about 30 times the period of a frequency of interest may be suitable for some applications. For applications including cyclic motion, increasing the RC time constant much greater than the mechanical periods of interest allows the amount of charge on electrodes of transducer 132 to remain substantially constant during one cycle. In cases where the transducer is used for damping, a resistance that produces an RC time constant for the resistor and the transducer in the range of about 0.1 to about 4 times the period of a frequency of interest may be suitable. As one of skill in the art will appreciate, resistances used for the resistor may vary based on application, particularly with respect to the frequency of interest and the size (and therefore capacitance C) of the transducer 132.

In one embodiment of a suitable electrical state used to control stiffness and/or damping using open loop techniques, the control electronics apply a substantially constant charge to electrodes of transducer 132, aside from any electrical imperfections or circuit details that minimally affect current flow. The substantially constant charge results in an increased stiffness for the polymer that resists deflection of transducer 132. One electrical configuration suitable for achieving substantially constant charge is one that has a high RC time constant, as described. When the value of the RC time constant of open loop control 138 and transducer 132 is long compared to the frequency of interest, the charge on the electrodes for transducer 132 is substantially constant. Further description of stiffness and/or damping control is further described in commonly owned U.S. Pat. No. 6,882,086, which is described herein for all purposes.

For generation, mechanical energy may be applied to the polymer or active area in a manner that allows electrical energy changes to be removed from electrodes in contact with the polymer. Many methods for applying mechanical energy and removing an electrical energy change from the active area are possible. Rolled devices may be designed that utilize one or more of these methods to receive an electrical energy change. For generation and sensing, the generation and utilization of electrical energy may require conditioning electronics of some type. For instance, at the very least, a minimum amount of circuitry is needed to remove electrical energy from the active area. Further, as another example, circuitry of varying degrees of complexity may be used to increase the efficiency or quantity of electrical generation in a particular active area or to convert an output voltage to a more useful value.

Figure 5A:
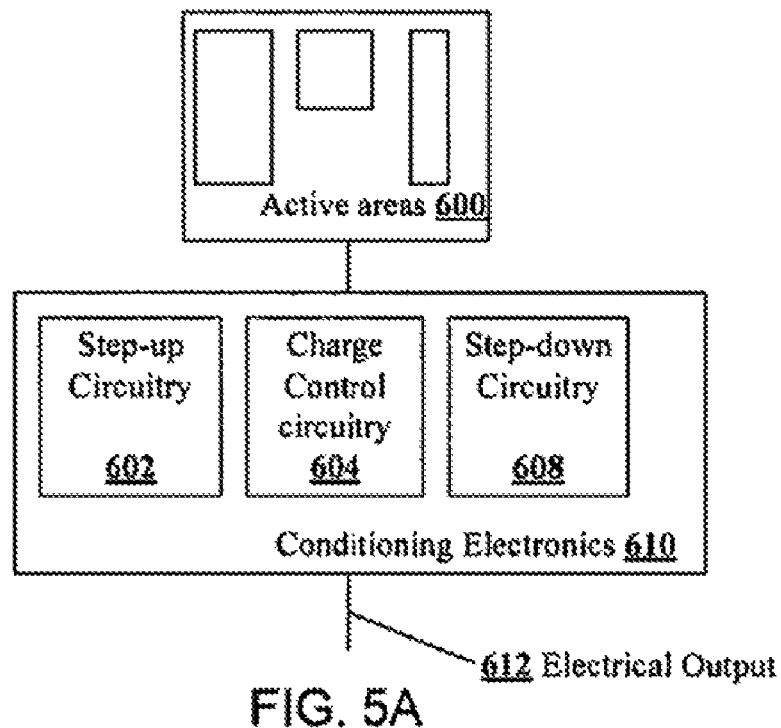
FIG. 5A is block diagram of one or more active areas connected to power conditioning electronics.

FIG. 5A is block diagram of one or more active areas 600 on a transducer that connected to power conditioning electronics 610. Potential functions that may be performed by the power conditioning electronics 610 include but are not limited to 1) voltage step-up performed by step-up circuitry 602, which may be used when applying a voltage to active areas 600, 2) charge control performed by the charge control circuitry 604 which may be used to add or to remove charge from the active areas 600 at certain times, 3) voltage step-down performed by the step-down circuitry 608 which may be used to adjust an electrical output voltage to a transducer. All of these functions may not be required in the conditioning electronics 610. For instance, some transducer devices may not use step-up circuitry 602, other transducer devices may not use step-down circuitry 608, or some transducer devices may not use step-up circuitry and step-down circuitry. Also, some of the circuit functions may be integrated. For instance, one integrated circuit may perform the functions of both the step-up circuitry 602 and the charge control circuitry 608.

Figure 5B:
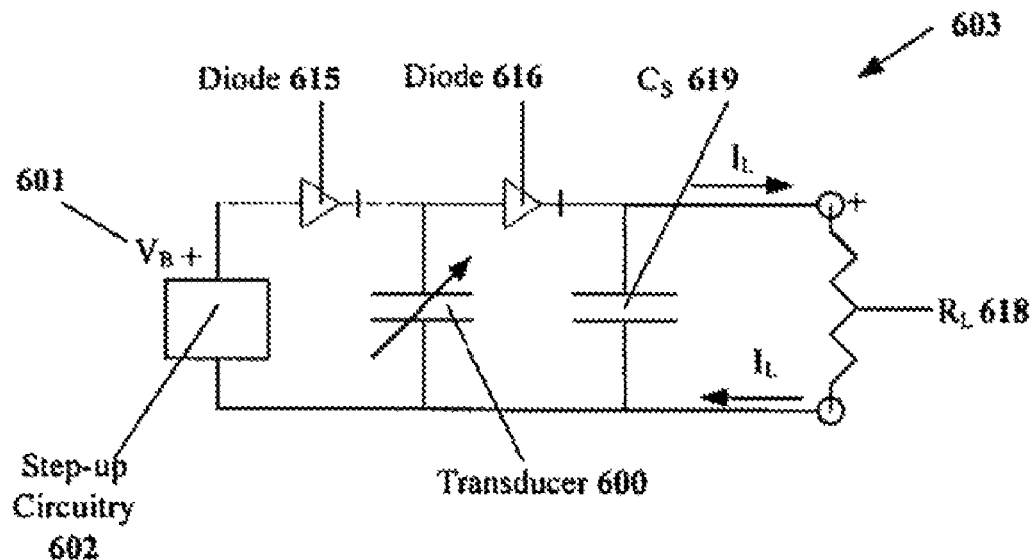
FIG. 5B is a circuit schematic of a device employing a rolled electroactive polymer transducer for one embodiment of the present invention.

FIG. 5B is a circuit schematic of an rolled device 603 employing a transducer 600 for one embodiment of the present invention. As described above, transducers of the present invention may behave electrically as variable capacitors. To understand the operation of the transducer 603, operational parameters of the rolled transducer 603 at two times, t1 and t2 may be compared. Without wishing to be constrained by any particular theory, a number of theoretical relationships regarding the electrical performance the generator 603 are developed. These relationships are not meant in any manner to limit the manner in which the described devices are operated and are provided for illustrative purposes only.

At a first time, t1, rolled transducer 600 may possess a capacitance, C1, and the voltage across the transducer 600 may be voltage 601, VB. The voltage 601, VB, may be provided by the step-up circuitry 602. At a second time t2, later than time t1, the transducer 600 may posses a capacitance C2 which is lower than the capacitance C1. Generally speaking, the higher capacitance C1 occurs when the polymer transducer 600 is stretched in area, and the lower capacitance C2 occurs when the polymer transducer 600 is contracted or relaxed in area. Without wishing to bound by a particular theory, the change in capacitance of a polymer film with electrodes may be estimated by well known formulas relating the capacitance to the film's area, thickness, and dielectric constant.

The decrease in capacitance of the transducer 600 between t1 and t2 will increase the voltage across the transducer 600. The increased voltage may be used to drive current through diode 616. The diode 615 may be used to prevent charge from flowing back into the step-up circuitry at such time. The two diodes, 615 and 616, function as charge control circuitry 604 for transducer 600 which is part of the power conditioning electronics 610 (see FIG. 5A). More complex charge control circuits may be developed depending on the configuration of the generator 603 and the one or more transducers 600 and are not limited to the design in FIG. 5B.

A transducer may also be used as an electroactive polymer sensor to measure a change in a parameter of an object being sensed. Typically, the parameter change induces deflection in the transducer, which is converted to an electrical change output by electrodes attached to the transducer. Many methods for applying mechanical or electrical energy to deflect the polymer are possible. Typically, the sensing of electrical energy from a transducer uses electronics of some type. For instance, a minimum amount of circuitry is needed to detect a change in the electrical state across the electrodes.

Figure 6:
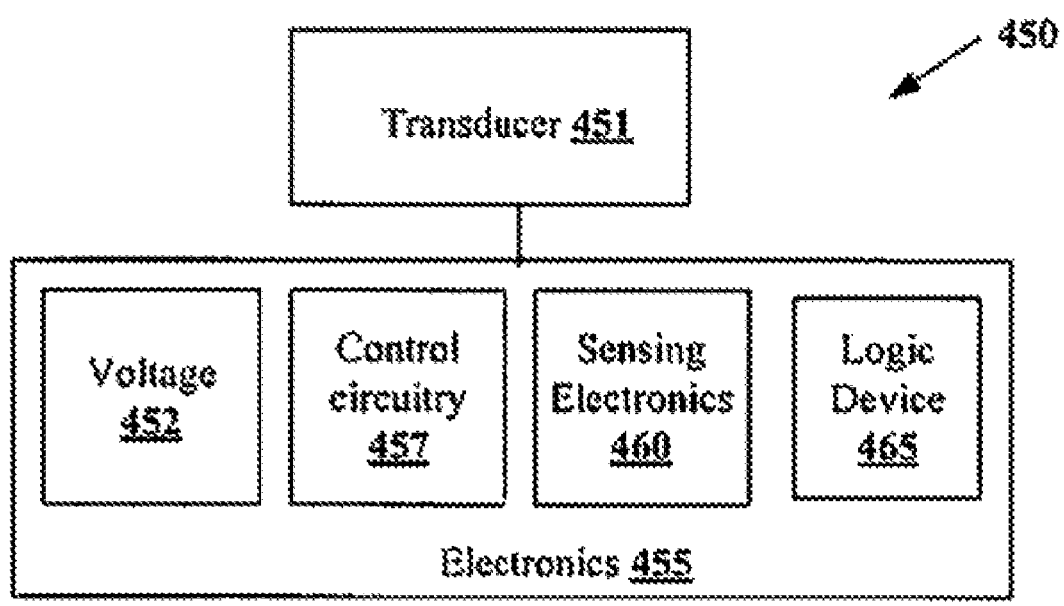
FIG. 6 is a schematic of a sensor employing an electroactive polymer transducer according to one embodiment of the present invention.

FIG. 6 is a schematic of a sensor 450 employing a transducer 451 according to one embodiment of the present invention. As shown in FIG. 7, sensor 450 comprises transducer 451 and various electronics 455 in electrical communication with the electrodes included in the transducer 451. Electronics 455 are designed or configured to add, remove, and/or detect electrical energy from transducer 451. While many of the elements of electronics 455 are described as discrete units, it is understood that some of the circuit functions may be integrated. For instance, one integrated circuit may perform the functions of both the logic device 465 and the charge control circuitry 457.

In one embodiment, the transducer 451 is prepared for sensing by initially applying a voltage between its electrodes. In this case, a voltage, VI, is provided by the voltage 452. Generally, VI is less than the voltage required to actuate transducer 451. In some embodiments, a low-voltage battery may supply voltage, VI, in the range of about 1-15 Volts. In any particular embodiment, choice of the voltage, VI may depend on a number of factors such as the polymer dielectric constant, the size of the polymer, the polymer thickness, environmental noise and electromagnetic interference, compatibility with electronic circuits that might use or process the sensor information, etc. The initial charge is placed on transducer 451 using electronics control sub-circuit 457. The electronics control sub-circuit 457 may typically include a logic device such as single chip computer or microcontroller to perform voltage and/or charge control functions on transducer 451. The electronics control sub-circuit 457 is then responsible for altering the voltage provided by voltage 452 to initially apply the relatively low voltage on transducer 451.

Sensing electronics 460 are in electrical communication with the electrodes of transducer 451 and detect the change in electrical energy or characteristics of transducer 451. In addition to detection, sensing electronics 460 may include circuits configured to detect, measure, process, propagate, and/or record the change in electrical energy or characteristics of transducer 451. Electroactive polymer transducers of the present invention may behave electrically in several ways in response to deflection of the electroactive polymer transducer. Correspondingly, numerous simple electrical measurement circuits and systems may be implemented within sensing electronics 460 to detect a change in electrical energy of transducer 451. For example, if transducer 451 operates in capacitance mode, then a simple capacitance bridge may be used to detect changes in transducer 451 capacitance. In another embodiment, a high resistance resistor is disposed in series with transducer 451 and the voltage drop across the high resistance resistor is measured as the transducer 451 deflects. More specifically, changes in transducer 451 voltage induced by deflection of the electroactive polymer are used to drive current across the high resistance resistor. The polarity of the voltage change across resistor then determines the direction of current flow and whether the polymer is expanding or contracting. Resistance sensing techniques may also be used to measure changes in resistance of the polymer included or changes in resistance of the electrodes. Some examples of these techniques are described in commonly owned U.S. Pat. No. 6,809,462, which was previously incorporated by reference.

CONCLUSION

While this invention has been described in terms of several preferred embodiments, there are alterations, permutations, and equivalents that fall within the scope of this invention which have been omitted for brevity's sake. For example, although the present invention has been described in terms of several specific electrode materials, the present invention is not limited to these materials and in some cases may include air as an electrode. In addition, although the present invention has been described in terms of circular rolled geometries, the present invention is not limited to these geometries and may include rolled devices with square, rectangular, or oval cross sections and profiles. It is therefore intended that the scope of the invention should be determined with reference to the appended claims.

We claim:

1. A device for controlling fluid flow, the device comprising:
   at least one transducer comprising an electroactive polymer having at least a first and second electroactive polymer portion comprising respectively a first and second active area, the first and second active areas, each having a first and a second electrode in electrical communication with the respective portion of the electroactive polymer, wherein at least the first electroactive polymer portion is arranged to deflect from a first position to a second position in response to a change in electric field; and
   at least one surface in contact with a fluid and operatively coupled to the transducer, wherein the deflection of at least the first electroactive polymer portion causes a change in a characteristic of the fluid that is transmitted to the fluid via the one surface, wherein the electroactive polymer has an elastic modulus below about 100 MPa.

2. The device according to claim 1, wherein the characteristic of the fluid is selected from the group consisting of 1) a flow rate, 2) a flow direction, 3) a flow vorticity, 4) a flow momentum, 5) mixing, 6) flow turbulence, 7) fluid energy, 8) a fluid thermodynamic property, 9) a fluid rheological property.

3. The device according to claim 1, wherein the deflection of at least the first portion of the electroactive polymer changes the one surface from a first shape to a second shape.

4. The device according to claim 1, wherein the one surface is operatively coupled to the transducer via a mechanical linkage.

5. The device according to claim 1, wherein the one surface includes at least the first portion of the electroactive polymer.

6. The device according to claim 5, wherein the one surface expands to form one of a balloon-like shape, a hemispherical shape, a cylinder shape, or a half-cylinder shape.

7. The device according to claim 1, wherein the fluid is a compressible fluid.

8. The device according to claim 1, wherein the fluid is a Newtonian fluid.

9. The device according to claim 1, wherein the fluid is selected from the group consisting of a gas, a plasma, a liquid, a mixture of two or more immiscible liquids, a supercritical fluid, a slurry, a suspension, and combinations thereof.

10. The device according to claim 1, wherein the device is a valve.

11. The device according to claim 1, wherein the fluid flows over the one surface.

12. The device according to claim 11, wherein the deflection of at least the first portion of the electroactive polymer changes a shape of the one surface to alter a property of a viscous flow layer of the fluid.

13. The device according to claim 11, wherein the deflection of at least the first portion of the electroactive polymer changes a shape of the one surface to alter a property of an inviscid flow layer of the fluid.

14. The device according to claim 11, wherein the deflection of at least the first portion of the electroactive polymer changes a shape of the one surface to promote mixing of constituents in the fluid.

15. The device according to claim 1, wherein the deflection of at least the first portion of the electroactive polymer changes a shape of the one surface to block the fluid flow.

16. The device according to claim 1, wherein the deflection of at least the first portion of the electroactive polymer results in a change in temperature of the one surface.

17. The device according to claim 1, further comprising a fluid conduit configured to allow fluid to flow from an inlet of the fluid conduit to an exit of the fluid conduit and pass over the one surface between the inlet and the exit and wherein a bounding surface of the fluid conduit separates the fluid from an outer environment.

18. The device according to claim 17, wherein the one surface includes at least the first portion of the electroactive polymer and wherein the one surface is a portion of the bounding surface of the fluid conduit.

19. The device according to claim 17, wherein the deflection in at least the first portion of the electroactive polymer causes the one surface to expand to one of block, increase or decrease the flow in the fluid conduit.

20. The device according to claim 17, wherein the deflection in at least the first portion of the electroactive polymer causes the one surface to expand to divert flow in the fluid conduit from a first channel to a second channel connected to the fluid conduit.

21. The device according to claim 1, further comprising one or more sensors connected to the device for measuring property of the fluid.

22. The device according to claim 21, wherein the property of the fluid is selected from the group consisting of a temperature, a pressure, a density, a viscosity, a thermal conductivity, a flow rate, and a concentration of a constituent of the fluid.

23. The device according to claim 1, further comprising one or more sensors connected to the device for monitoring one or more of the deflection of at least the first portion of the electroactive polymer, a charge on at least the first portion of the electroactive polymer, and a voltage across at least the first portion of the electroactive polymer.

24. The device according to claim 1, further comprising a logic device for at least one of: 1) controlling operation of the transducer, 2) monitoring one or more sensors, 3) communicating with other devices, and 4) combinations thereof.

25. The device according to claim 1, further comprising conditioning electronics designed or configured to perform one or more of the following functions for the one or more transducers selected from the group consisting of: voltage step-up, voltage step-down and charge control.

26. The device according to claim 1, wherein the electroactive polymer comprises a material selected from the group consisting of a silicone elastomer, an acrylic elastomer, a polyurethane, a copolymer comprising PVDF, and combinations thereof.

27. The device according to claim 1, further comprising an insulation barrier designed or configured to protect the one surface from constituents of the fluid in contact with the one surface.

28. The device according to claim 1, further comprising one or more support structures designed or configured to attach to the one or more transducers.

29. The device according to claim 1, wherein the electroactive polymer is elastically pre-strained at the first position to improve a mechanical response of the electroactive polymer between the first position and second position.

30. The device according to claim 1, wherein the electroactive polymer has an elastic modulus between about 0.05 MPa and about 10 MPa.

31. The device according to claim 1, wherein the electroactive polymer has an elastic area strain of at least about 10 percent between the first position and the second position.

32. The device according to claim 1, wherein the electroactive polymer comprises a multilayer structure.

33. The device according to claim 32, wherein the multilayer structure comprises two or more layers of electroactive polymers.

34. The device according to claim 1, wherein the device is a MEMS device.

35. The device according to claim 1, wherein the one surface is part of a surface of a vane for controlling a direction of the fluid flow.

36. The device according to claim 35, wherein the deflection of the portion of the electroactive polymer changes an orientation of the vane.

* * * * *